(12) United States Patent  (10) Patent No.: US 7,036,620 B2
Miller et al.  (45) Date of Patent: May 2, 2006

(54) CONTINUOUSLY VARIABLE TRANSMISSION

(75) Inventors: Donald C. Miller, Fallbrook, CA (US); David J. Allen, Santa Cruz, CA (US); Robert A. Smithson, Cedar Park, TX (US)

(73) Assignee: Fallbrook Technologies Inc., San Diego, CA (US)

( * ) Notice: Subject to any disclaimer, the term of this patent is extended or adjusted under 35 U.S.C. 154(b) by 5 days.

(21) Appl. No.: 11/030,361

(22) Filed: Jan. 5, 2005

(65) Prior Publication Data

US 2005/0130784 A1 Jun. 16, 2005

Related U.S. Application Data

(63) Continuation of application No. 10/788,736, filed on Feb. 26, 2004.

(60) Provisional application No. 60/537,938, filed on Jan. 21, 2004, provisional application No. 60/512,600, filed on Oct. 16, 2003, provisional application No. 60/494,376, filed on Aug. 11, 2003, provisional application No. 60/450,965, filed on Feb. 28, 2003.

(51) Int. Cl.
*B60K 17/00* (2006.01)

(52) U.S. Cl. .................. 180/219; 475/189; 476/37

(58) Field of Classification Search ............... 180/218, 180/219, 908; 475/214, 215, 189; 476/36–38
See application file for complete search history.

(56) References Cited

U.S. PATENT DOCUMENTS

| | | | |
|---|---|---|---|
| 1,175,677 A | 3/1916 | Barnes | |
| 1,858,696 A | 5/1932 | Weiss | |
| 1,930,228 A | 3/1933 | Thomson | |
| 2,209,254 A | 7/1940 | Ahnger | |
| 2,469,653 A | 5/1949 | Kopp | |
| 2,596,538 A | 5/1952 | Dicke | |
| 2,675,713 A | 4/1954 | Acker | |
| 2,931,234 A | 4/1960 | Hayward | |
| 2,931,235 A | 4/1960 | Hayward | |
| 3,248,960 A | 5/1966 | Schottler | |
| 3,273,468 A | 9/1966 | Allen | |
| 3,280,646 A | 10/1966 | Lemieux | |
| 3,487,727 A | 1/1970 | Gustafsson | |
| 3,695,120 A * | 10/1972 | Titt | ............ 475/186 |
| 3,707,888 A | 1/1973 | Schottler | |
| 3,736,803 A * | 6/1973 | Horowitz et al. | ............ 476/1 |
| 3,996,807 A | 12/1976 | Adams | |
| 4,177,683 A | 12/1979 | Moses | |
| 4,391,156 A | 7/1983 | Tibbals | |
| 4,700,581 A | 10/1987 | Tibbals, Jr. | |
| 4,735,430 A | 4/1988 | Tomkinson | |
| 4,756,211 A | 7/1988 | Fellows | |

(Continued)

FOREIGN PATENT DOCUMENTS

CN 1157379 A 8/1997

(Continued)

*Primary Examiner*—Lesley D. Morris
*Assistant Examiner*—L. Lum
(74) *Attorney, Agent, or Firm*—Knobbe, Martens Olson & Bear, LLP

(57) ABSTRACT

A variable speed transmission having a plurality of tilting balls and opposing input and output discs is illustrated and described that provides an infinite number of speed combinations over its transmission ratio range. The use of a planetary gear set allows minimum speeds to be in reverse and the unique geometry of the transmission allows all of the power paths to be coaxial, thereby reducing overall size and complexity of the transmission in comparison to transmissions achieving similar transmission ratio ranges.

20 Claims, 40 Drawing Sheets

U.S. PATENT DOCUMENTS

| | | |
|---|---|---|
| 4,856,374 A | 8/1989 | Kreuzer |
| 4,869,130 A | 9/1989 | Wiecko |
| 4,900,046 A | 2/1990 | Aranceta-Angoitia |
| 4,909,101 A | 3/1990 | Terry |
| 5,020,384 A | 6/1991 | Kraus |
| 5,069,655 A | 12/1991 | Schievelbusch |
| 5,236,403 A | 8/1993 | Schievelbusch |
| 5,318,486 A | 6/1994 | Lutz |
| 6,241,636 B1 | 6/2001 | Miller |
| 6,322,475 B1 | 11/2001 | Miller |
| 6,419,608 B1 | 7/2002 | Miller |

FOREIGN PATENT DOCUMENTS

| | | |
|---|---|---|
| DE | 498 701 | 5/1930 |
| DE | 2 310 880 | 9/1974 |
| DE | 21 36 243 | 1/1975 |
| DE | 39 40 919 A1 | 6/1991 |
| EP | 0 432 742 A1 | 12/1990 |
| GB | 592320 | 9/1947 |
| GB | 906 002 | 9/1962 |
| GB | 1 376 057 | 12/1974 |
| GB | 2 035 482 | 6/1980 |
| GB | 2 080 452 | 8/1982 |
| JP | 53048166 A | 5/1978 |
| JP | 55-135259 | 4/1979 |
| WO | WO99/20918 | 4/1999 |
| WO | WO138758 A1 | 5/2001 |

* cited by examiner

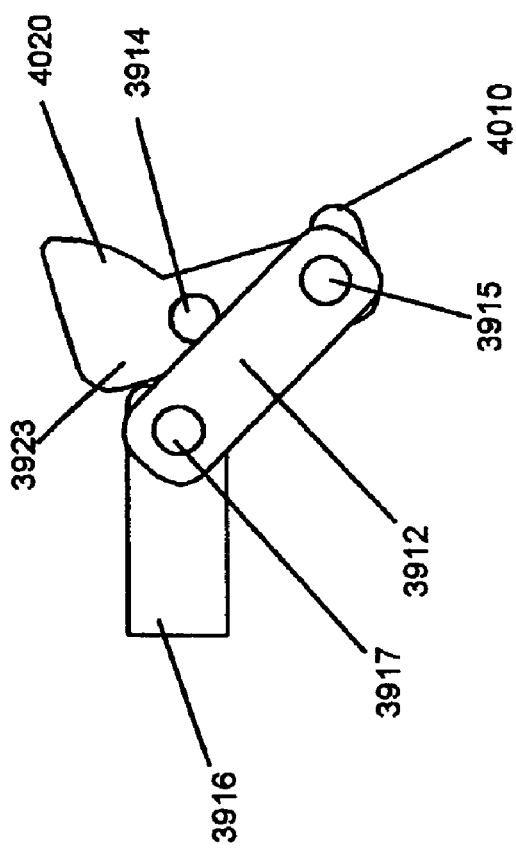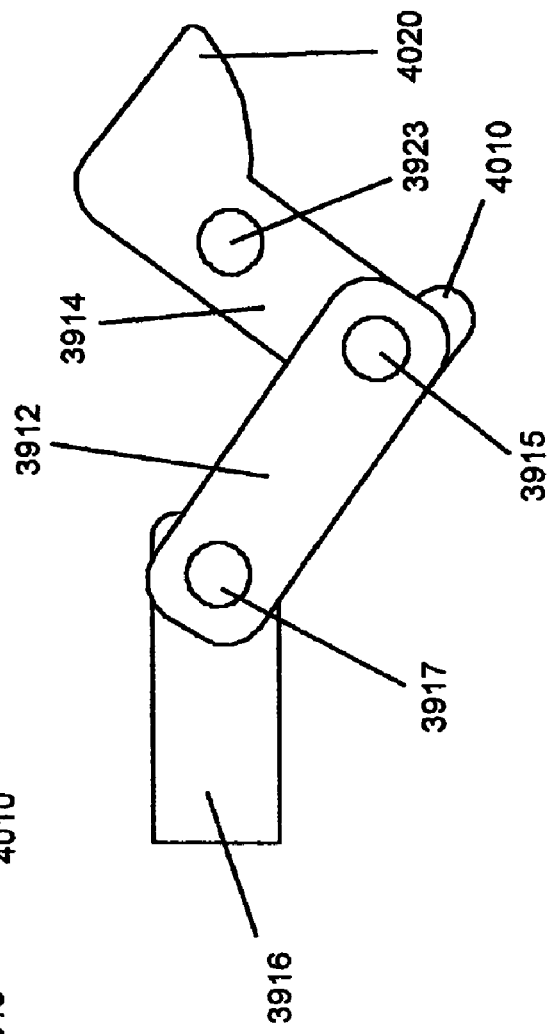
FIG. 40a
FIG. 40b

CONTINUOUSLY VARIABLE TRANSMISSION

RELATED APPLICATIONS

This application is a continuation of, and incorporates by reference in its entirety, U.S. patent application Ser. No. 10/788,736, filed on Feb. 26, 2004, which claims priority from U.S. Provisional Application No. 60/450,965 filed Feb. 28, 2003, U.S. Provisional Application No. 60/494,376 filed Aug. 11, 2003, U.S. Provisional Application No. 60/512,600 filed Oct. 16, 2003 and U.S. Provisional Application 60/537,938 filed Jan. 21, 2004. The entire disclosure of each of these applications is hereby incorporated by reference.

BACKGROUND OF THE INVENTION

1. Field of the Invention

The field of the invention relates generally to transmissions, and more particularly the invention relates to continuously variable transmissions.

2. Description of the Related Art

In order to provide a continuously variable transmission, various traction roller transmissions in which power is transmitted through traction rollers supported in a housing between torque input and output discs have been developed. In such transmissions, the traction rollers are mounted on support structures which, when pivoted, cause the engagement of traction rollers with the torque discs in circles of varying diameters depending on the desired transmission ratio.

However, the success of these traditional solutions has been limited. For example, in one solution, a driving hub for a vehicle with a variable adjustable transmission ratio is disclosed. This method teaches the use of two iris plates, one on each side of the traction rollers, to tilt the axis of rotation of each of the rollers. However, the use of iris plates can be very complicated due to the large number of parts that are required to adjust the iris plates during transmission shifting. Another difficulty with this transmission is that it has a guide ring that is configured to be predominantly stationary in relation to each of the rollers. Since the guide ring is stationary, shifting the axis of rotation of each of the traction rollers is difficult.

One improvement over this earlier design includes a shaft about which an input disc and an output disc rotate. The input disc and output disc are both mounted on the shaft and contact a plurality of balls disposed equidistantly and radially about the shaft. The balls are in frictional contact with both discs and transmit power from the input disc to the output disc. An idler located concentrically over the shaft and between the balls applies a force to keep the balls separate so as to make frictional contact against the input disc and output disc. A key limitation of this design is the absence of means for generating and adequately controlling the axial force acting as normal contact force to keep the input disc and output disc in sufficient frictional contact against the balls as the speed ratio of the transmission changes. Due to the fact that rolling traction continuously variable transmissions require more axial force at low speed to prevent the driving and driven rotating members from slipping on the speed changing friction balls, excessive force is applied in high speed and at a 1:1 ratio, when the input and output speeds are equal. This excessive axial force lowers efficiency and causes the transmission to fail significantly faster than if the proper amount of force was applied for any particular gear ratio. The excessive force also makes it more difficult to shift the transmission.

Therefore, there is a need for a continuously variable transmission with an improved axial load generating system that changes the force produced as a function of the transmission ratio.

SUMMARY OF THE INVENTION

The systems and methods illustrated and described herein have several features, no single one of which is solely responsible for its desirable attributes. Without limiting the scope as expressed by the description that follows, its more prominent features will now be discussed briefly. After considering this discussion, and particularly after reading the section entitled "Detailed Description of the Preferred Embodiments" one will understand how the features of the system and methods provide several advantages over traditional systems and methods.

In a first aspect, a variable speed transmission is disclosed, comprising a longitudinal axis, a plurality of balls distributed radially about the longitudinal axis, each ball having a tiltable axis about which it rotates, a rotatable input disc positioned adjacent to the balls and in contact with each of the balls, a rotatable output disc positioned adjacent to the balls opposite the input disc and in contact with each of the balls, a rotatable idler having a substantially constant outer diameter coaxial about the longitudinal axis and positioned radially inward of and in contact with each of the balls, and a planetary gear set mounted coaxially about the longitudinal axis of the transmission.

Embodiments of the variable speed transmission are also disclosed wherein the balls sum a torque component transmitted from at least two power paths, which power paths are provided by the planetary gear set and wherein the at least two power paths are coaxial. In another embodiment, the at least one of the idler and the output disc provide a torque input to the planetary gearset.

In another aspect, a variable speed transmission is disclosed wherein the planetary gearset further comprises; a ring gear mounted coaxially about the longitudinal axis and having teeth that face radially inward towards, a plurality of planet gears distributed coaxially about the longitudinal axis within the ring gear and in engagement with the ring gear, each planet gear having a respective planet axis about which it rotates, and wherein the planet axes are located radially away from the longitudinal axis, a plurality of planet shafts, one for each planet, about which the planet gears rotate, a sun gear mounted coaxially about the longitudinal axis and radially within and in engagement with each of the plurality of planet gears, and a planet carrier mounted coaxially about the longitudinal axis and adapted to support and position the planet shafts.

Some of these embodiments further comprise a cage adapted to align the tiltable axes of the balls and further adapted to maintain the angular and radial positions of the balls. In some embodiments, an input torque is supplied to the planet carrier and the planet carrier is coupled to the input disc, wherein the sun gear is coupled to the cage, wherein the ring gear is fixed and does not rotate, and wherein an output torque is supplied from the transmission by the output disc.

In another aspect an axial force generator is disclosed for use with transmission embodiments described herein that is adapted to generate an axial force that increases the traction between the input disc, the balls, the idler and the output disc. In some embodiments, an amount of axial force generated by the axial force generator is a function of the transmission ratio of the transmission. In other embodiments, each of the input disc, the balls, the output disc, and the idler have contact surfaces that are coated with a friction increasing coating material. The coating material of certain embodiments is a ceramic or a cermet. In yet other embodiments, the coating is a material selected from the group consisting of silicon nitride, silicon carbide, electroless nickel, electroplated nickel, or any combination thereof.

In yet another aspect, a variable speed transmission is disclosed comprising; a longitudinal axis, a plurality of balls distributed radially about the longitudinal axis, each ball having a tiltable axis about which it rotates, a rotatable input disc positioned adjacent to the balls and in contact with each of the balls, a fixed output disc positioned adjacent to the balls opposite the input disc and in contact with each of the balls, a rotatable idler having a constant outside diameter and positioned radially inward of and in contact with each of the balls, a cage, adapted to maintain the radial position and axial alignment of the balls and that is rotatable about the longitudinal axis, and an idler shaft connected to the idler adapted to receive a torque output from the idler and transmit the torque output out of the transmission.

In still another aspect, a variable speed transmission is described comprising; first and second pluralities of balls distributed radially about the longitudinal axis, first and second rotatable input discs, an input shaft coaxial with the longitudinal axis and connected to the first and second input discs, a rotatable output disc positioned between the first and second pluralities of balls and in contact with each of the first and second pluralities of balls, a first generally cylindrical idler positioned radially inward of and in contact with each of the first plurality of balls, and a second generally cylindrical idler positioned radially inward of and in contact with each of the second plurality of balls.

For use with many embodiments described herein there is also disclosed an axial force generator adapted to apply an axial force to increase contact force between the input disc, the output disc and the plurality of speed adjusters, the axial force generator further comprising, a bearing disc coaxial with and rotatable about the longitudinal axis having an outer diameter and an inner diameter and having a threaded bore formed in its inner diameter, a plurality of perimeter ramps attached to a first side of the bearing disc near its outer diameter, a plurality of bearings adapted to engage the plurality of bearing disc ramps, a plurality of input disc perimeter ramps mounted on the input disc on a side opposite of the speed adjusters adapted to engage the bearings, a generally cylindrical screw coaxial with and rotatable about the longitudinal axis and having male threads formed along its outer surface, which male threads are adapted to engage the threaded bore of the bearing disc, a plurality of central screw ramps attached to the screw, and a plurality of central input disc ramps affixed to the input disc and adapted to engage the plurality of central screw ramps.

In another aspect, a support cage is disclosed that supports and positions a plurality of speed adjusting tiltable balls in a rolling traction transmission, which utilizes an input disc and an output disc on either side of the plurality of balls, the cage comprising; first and second flat support discs that are each a generally circular sheet having a plurality of slots extending radially inward from an outer edge, each slot having two sides, and a plurality of flat supporting spacers extending between said first and second support discs each spacer having a front side, a back side, a first end and a second end, wherein the first and second ends each have a mounting surface, wherein each mounting surface has a curved surface, and wherein the spacers are positioned angularly about the support discs between the grooves in the support discs such that the curved surfaces are aligned with the sides of the grooves.

In yet another aspect, a support leg for a ratio changing mechanism, which changes the transmission ratio in a rolling traction transmission by tilting an axle that forms the axis of rotation of a ratio-determining ball, is disclosed that comprises; an elongated body, an axle-connecting end, a cam end opposite the axle-connecting end, a front side that faces the ball and a backside that faces away from the ball, and a central support portion between the axle-connecting end and the cam end, wherein the axle-connecting end has a bore formed through it adapted to receive the axle, and wherein a convexly curved camming surface is formed on the front side of the cam end that is adapted to assist in controlling the alignment of the bore.

Another aspect is disclosed for a fluid pumping ball for use in a variable speed rolling traction transmission utilizing a plurality of balls rotatable about their respective tiltable axes, an input disc on one side of and in contact with each of the plurality of balls, and an output disc on another side of and in contact with each of the plurality of balls, the fluid pumping ball comprising; a spherical ball having a bore formed through a diameter of the ball creating a cylindrical inner surface through the ball, and at least one helical groove formed in the inner surface of the ball and extending through the ball.

In still another aspect a fluid pumping axle is disclosed for use in a variable speed rolling traction transmission utilizing a plurality of balls having respective axes formed by diametrical bores formed therethrough, an input disc on one side of and in contact with each of the plurality of balls, and an output disc on another side of and in contact with each of the plurality of balls, the fluid pumping axle comprising a generally cylindrical axle of a diameter smaller than that of the bore through the balls and having first and second ends and a middle region, wherein when the axle is positioned properly within the bore of its respective ball, the first and second ends extend out of opposite sides of the ball and the middle region resides within the ball, and at least one helical groove formed on an outside surface of the axle, wherein the helical groove begins at a point outside of the ball and extends into at least a portion of the middle region.

In another embodiment, a shifting mechanism is disclosed for a variable speed rolling traction transmission having a longitudinal axis and that utilizes a plurality of tilting balls distributed in planar alignment about the longitudinal axis and each ball contacted on opposing sides by an input disc and an output disc, in order to control a transmission ratio of the transmission, the shifting mechanism comprising a tubular transmission axle running along the longitudinal axis, a plurality of ball axles each extending through a bore formed through a corresponding one of the plurality of balls and forming a tiltable axis of the corresponding ball about which that ball spins, and each ball axle having two ends that each extend out of the ball, a plurality of legs, one leg connected to each of the ends the ball axles, the legs extending radially inward toward the transmission axle, an idler having a substantially constant outside diameter that is positioned coaxially about the transmission axle and radially inward of and in contact with each of the balls, two disc-shaped shift guides, one on each end of the idler, and each having a flat side facing the idler and a convex curved side facing away from the idler, wherein shift guides extend radially to contact all of the respective legs on the corresponding side of the balls, a plurality of roller pulleys, one for each leg, wherein each roller pulley is attached to a side of its respective leg facing away from the balls, a generally cylindrical pulley stand extending axially from at least one of the shift guides, a plurality of guide pulleys, one for each roller pulley, distributed radially about and attached to the pulley stand, and a flexible tether having first and second ends with the first end extending through the axle and out a slot, which is formed in the axle proximate to the pulley stand, the first end of the tether further wrapping around each of the roller pulleys and each of the guide pulleys, wherein the second end extends out of the axle to a shifter, wherein the guide pulleys are each mounted upon one or more pivot joints to maintain alignment of each guide pulley with its respective roller pulley and wherein when the tether is pulled by the shifter, the second end draws each of the roller pulleys in to shift the transmission.

In another embodiment, a shifting mechanism is disclosed for a variable speed transmission having a longitudinal axis and that utilizes a plurality of tilting balls, each having a ball radius from respective ball centers, in order to control a transmission ratio of the transmission, comprising a plurality of ball axles each extending through a bore formed through a corresponding ball and forming the tiltable axis of the corresponding ball, and each ball axle having two ends that each extend out of the ball, a plurality of legs, one leg connected to each of ends the ball axles, the legs extending radially inward toward the transmission axle, a generally cylindrical idler with a substantially constant radius positioned coaxially and radially inward of and in contact with each of the balls, first and second disc-shaped shift guides, one on each end of the idler, and each having a flat side facing the idler and a convex curved side facing away from the idler, wherein shift guides extend radially to contact all of the respective legs on the corresponding side of the balls, and a plurality of guide wheels each having a guide wheel radius, one guide wheel for each leg, each guide wheel rotatably mounted at a radially inward end of its respective leg, wherein the guide wheels contact the curved surface of its respective shift guide, wherein a shapes of the convex curves are determined by a set of two-dimensional coordinates, the origin of is centered at the intersection of the longitudinal axis and a line drawn through the centers of any two diametrically opposing balls, wherein the coordinates represent the location of the point of contact between the guide wheel surface and the shift guide surface as a function of the axial movement of the idler and shift guide, assuming that the convex curve is substantially tangent to the guide wheel at the point of contact.

In still another embodiment, an automobile is disclosed, comprising an engine, a drivetrain; and a variable speed transmission comprising a longitudinal axis, a plurality of balls distributed radially about the longitudinal axis, each ball having a tiltable axis about which it rotates, a rotatable input disc positioned adjacent to the balls and in contact with each of the balls, a rotatable output disc positioned adjacent to the balls opposite the input disc and in contact with each of the balls, a rotatable idler having a substantially constant outer diameter coaxial about the longitudinal axis and positioned radially inward of and in contact with each of the balls, and a planetary gear set mounted coaxially about the longitudinal axis of the transmission.

These and other improvements will become apparent to those skilled in the art as they read the following detailed description and view the enclosed figures.

BRIEF DESCRIPTION OF THE DRAWINGS

FIG. 40a is a side elevation view of an alternate linkage assembly for use with the alternate axial force generator of FIG. 39.

FIG. 40b is a side elevation view of the alternate linkage assembly of FIG. 40a in an extended configuration.

DETAILED DESCRIPTION OF THE PREFERRED EMBODIMENT

Embodiments of the invention will now be described with reference to the accompanying figures, wherein like numerals refer to like elements throughout. The terminology used in the description presented herein is not intended to be interpreted in any limited or restrictive manner simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

The transmissions described herein are of the type that utilize speed adjuster balls with axes that tilt as described in U.S. Pat. Nos. 6,241,636, 6,322,475, and 6,419,608. The embodiments described in these patents and those described herein typically have two sides generally separated by a variator portion, to be described below, an input side and an output side. The driving side of the transmission, that is the side that receives the torque or the rotational force into the transmission is termed the input side, and the driven side of the transmission or the side that transfers the torque from the transmission out of the transmission is termed the output side. An input disc and an output disc are in contact with the speed adjuster balls. As the balls tilt on their axes, the point of rolling contact on one disc moves toward the pole or axis of the ball, where it contacts the ball at a circle of decreasing diameter, and the point of rolling contact on the other disc moves toward the equator of the ball, thus contacting the disc at a circle of increasing diameter. If the axis of the ball is tilted in the opposite direction, the input and output discs respectively experience the converse relationship. In this manner, the ratio of rotational speed of the input disc to that of the output disc, or the transmission ratio, can be changed over a wide range by simply tilting the axes of the speed adjuster balls. The centers of the balls define the border between the input side and the output side of the transmission and similar components that are located on both the input side of the balls and the output side of the balls are generally described herein with the same reference numbers. Similar components located on both the input and output sides of the transmission generally have the suffix "a" attached at the end of the reference number if they are located on the input side, and the components located on the output side of the transmission generally have the suffix "b" attached at the end of their respective reference numbers.

Figure 1:
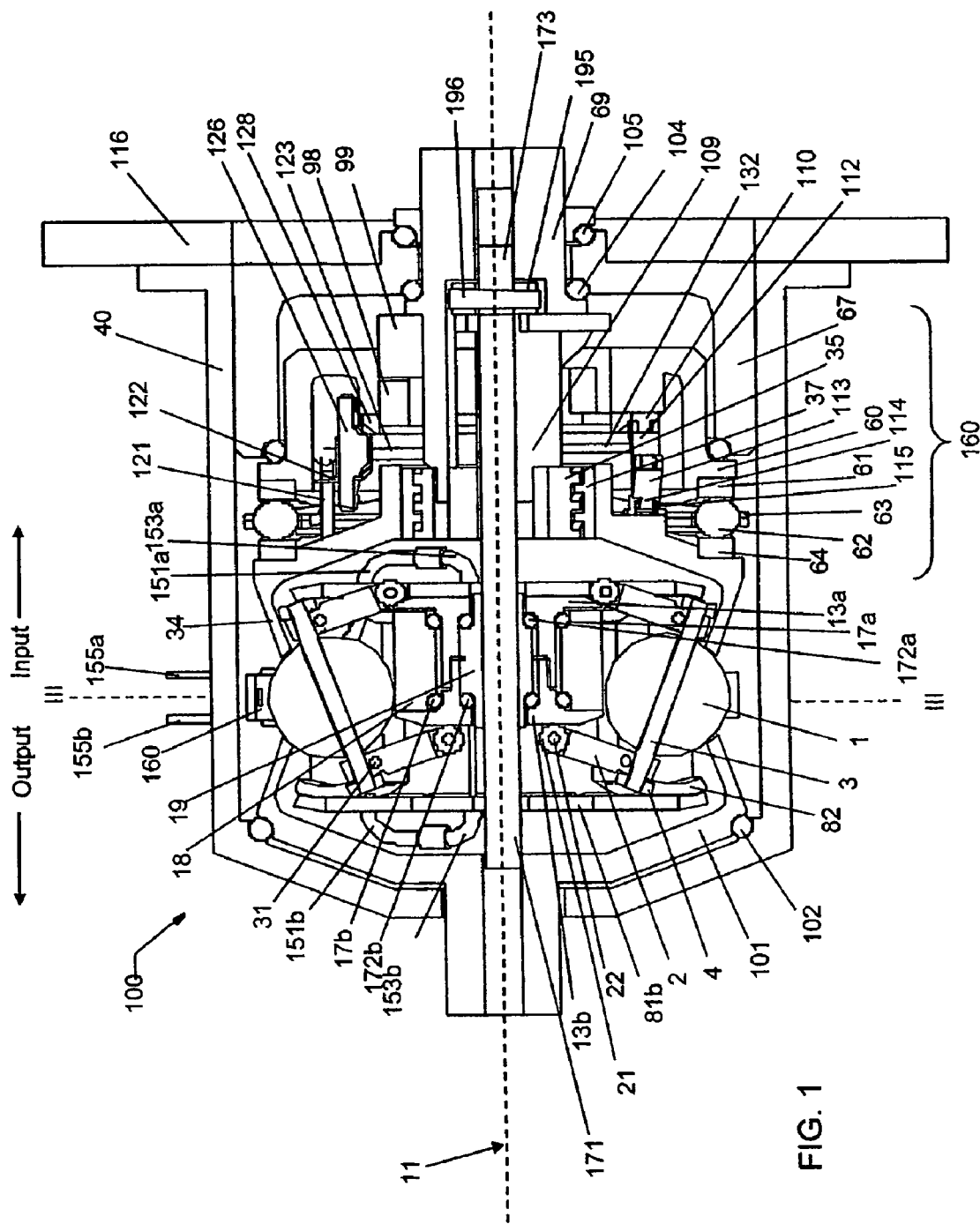
FIG. 1 is a cutaway side view of an embodiment of the transmission shifted into high.

Referring to FIG. 1, an embodiment of a transmission 100 is illustrated having a longitudinal axis 11 about which multiple speed adjusting balls 1 are radially distributed. The speed adjusting balls 1 of some embodiments stay in their angular positions about the longitudinal axis 11, while in other embodiments the balls 1 are free to orbit about the longitudinal axis 11. The balls 1 are contacted on their input side by an input disc 34 and on their output side by an output disc 101. The input and out put discs 34, 101 are annular discs extending from an inner bore near the longitudinal axis on their respective input and output sides of the balls 1 to a radial point at which they each make contact with the balls 1. The input and output discs 34, 101 each have a contact surface that forms the contact area between each disc 34 and 101, and the balls 1. In general, as the input disc 34 rotates about the longitudinal axis 11, each portion of the contact area of the input disc 34 rotates and sequentially contacts each of the balls 1 during each rotation. This is similar for the output disc 101 as well. The input disc 34 and the output disc 101 can be shaped as simple discs or can be concave, convex, cylindrical or any other shape, depending on the configuration of the input and output desired. In one embodiment the input and output discs are spoked to make them lighter for weight sensitive applications. The rolling contact surfaces of the discs where they engage the speed adjuster balls can have a flat, concave, convex or other shaped profile, depending on the torque and efficiency requirements of the application. A concave profile where the discs contact the balls decreases the amount of axial force required to prevent slippage while a convex profile increases efficiency. Additionally, the balls 1 all contact an idler 18 on their respective radially innermost point. The idler 18 is a generally cylindrical component that rests coaxially about the longitudinal axis 11 and assists in maintaining the radial position of the balls 1. With reference to the longitudinal axis 11 of many embodiments of the transmission, the contact surfaces of the input disc 34 and the output disc 101 can be located generally radially outward from the center of the balls 1, with the idler 18 located radially inward from the balls 1, so that each ball 1 makes three-point contact with the idler 18, the input disc 34, and the output disc 101. The input disc 34, the output disc 101, and the idler 18 can all rotate about the same longitudinal axis 11 in many embodiments, and are described in fuller detail below.

Due to the fact that the embodiments of transmissions 100 described herein are rolling traction transmissions, in some embodiments, high axial forces are required to prevent slippage of the input disc 34 and output disc 101 at the ball 1 contacts. As axial force increases during periods of high torque transfer, deformation of the contact patches where the input disc 34, the output disc 101, and the idler 18 contact the balls 1 becomes a significant problem, reducing efficiency and the life of these components. The amount of torque that can be transferred through these contact patches is finite and is is a function of the yield strength of the material from which the balls 1, the input disc, 34, the output disc 101, and the idler 18 are made. The friction coefficient of the balls 1, the input disc, 34, the output disc 101, and the idler 18 has a dramatic effect on the amount of axial force required to transfer a given amount of torque and thus greatly affects the efficiency and life of the transmission. The friction coefficient of the rolling elements in a traction transmission is a very important variable affecting performance.

Certain coatings may be applied to the surfaces of the balls 1, the input disc, 34, the output disc 101, and the idler 18 to improve their performance. In fact, such coatings can be used advantageously on the rolling contacting elements of any rolling traction transmission to achieve the same added benefits that are achieved for the embodiments of transmissions described herein. Some coatings have the beneficial effect of increasing the friction coefficient of the surfaces of these rolling elements. Some coatings have a high friction coefficient and also display a variable coefficient of friction, which increases as axial force increases. A high friction coefficient allows less axial force to be required for a given torque, thereby increasing efficiency and life of the transmission. A variable coefficient of friction increases the maximum torque rating of the transmission by decreasing the amount of axial force required to transfer this maximum torque.

Some coatings, such as ceramics and cermets, possess excellent hardness and wear properties, and can greatly extend the life of the highly loaded rolling elements in a rolling traction transmission. A ceramic coating such as silicon nitride can have a high friction coefficient, a variable coefficient of friction which increases as axial force increases, and can also increase the life of the balls 1, the input disc, 34, the output disc 101, and the idler 18 when applied to the surfaces of these components in a very thin layer. The coating thickness depends on the material used for the coating and can vary from application to application but typically is in the range of 0.5 microns to 2 microns for a ceramic and 0.75 microns to 4 microns for a cermet.

The process used to apply the coating is important to consider when the balls 1, the input disc, 34, the output disc 101, and the idler 18 are made from hardened steel, which is the material used in many embodiments of the transmissions described herein. Some processes used to apply ceramics and cermets require high temperatures and will lower the hardness of the balls 1, the input disc, 34, the output disc 101, and the idler 18, harming performance and contributing to premature failure. A low temperature application process is desirable and several are available, including low temperature vacuum plasma, DC pulsed reactive magnetron sputtering, plasma-enhanced chemical vapor deposition (PE-CVD), unbalanced magnetron physical vapor deposition, and plating. The plating process is attractive due to its low cost and because a custom bath can be created to achieve desired coating properties. Immersing the rolling elements in a bath of silicon carbide or silicon nitride with co-deposited electroless nickel or electroplated nickel with silicon carbide or silicon nitride is a low temperature solution that is well suited for high volume production. It should be noted that other materials can be used in addition to those mentioned. With this application process, the parts are contained in a cage, immersed in the bath, and shaken so that the solution contacts all surfaces. Thickness of the coating is controlled by the length of time that the components are immersed in the bath. For instance, some embodiments will soak the components using silicon nitride with co-deposited electroless nickel for four (4) hours to achieve the proper coating thickness, although this is just an example and many ways to form the coating and control its thickness are known and can be used taking into account the desired properties, the desired thickness and the substrate or base metal of which the components are made.

Figure 2:
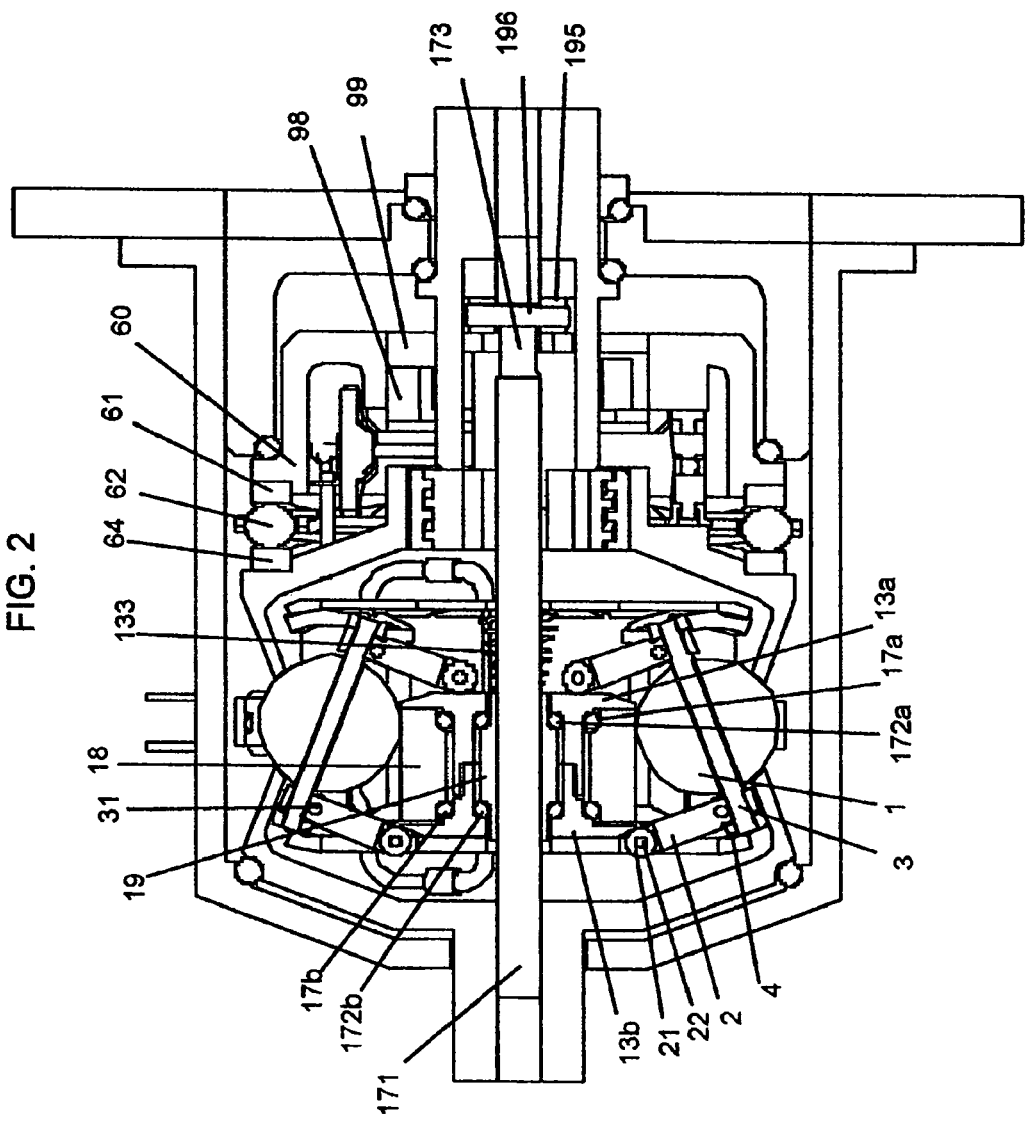
FIG. 2 is a cutaway side view of the transmission of FIG. 1 shifted into low.
Figure 3:
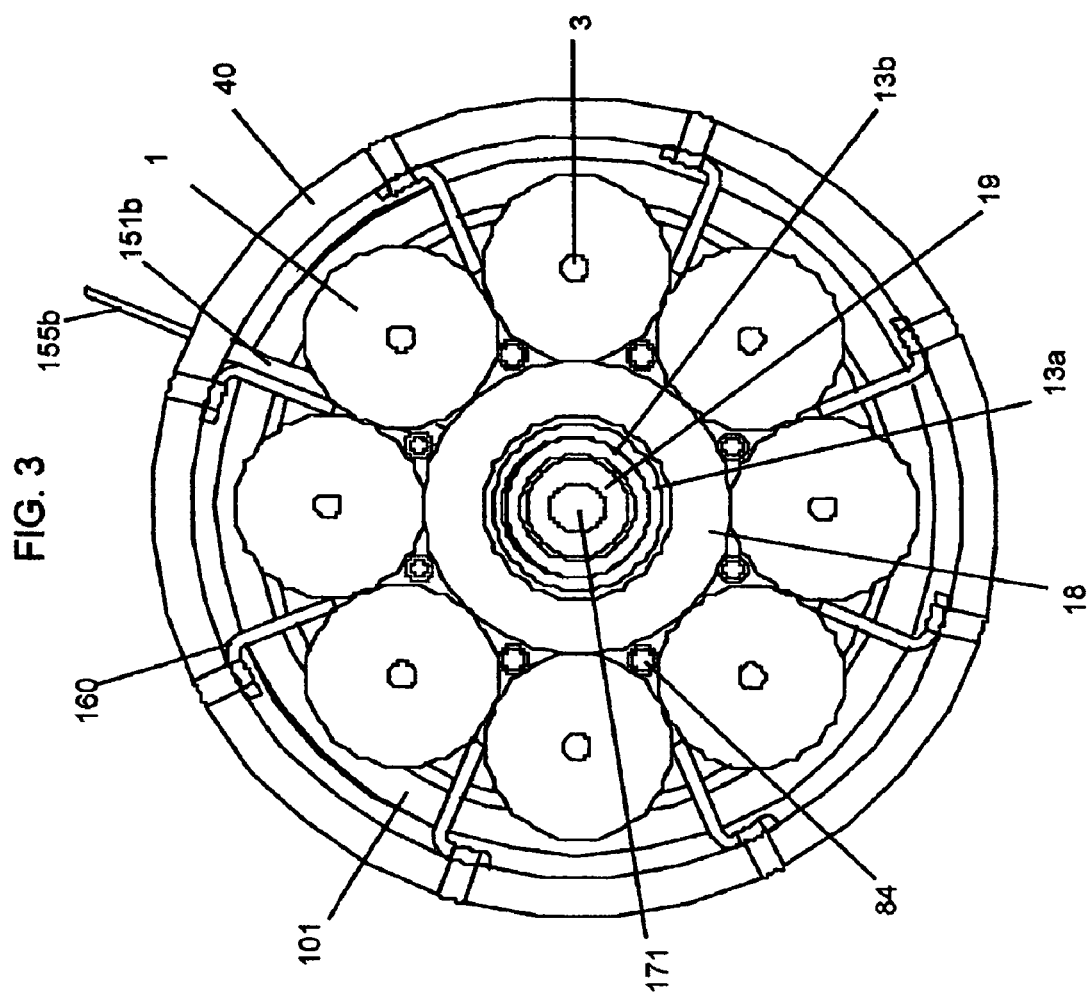
FIG. 3 is a partial end cross-sectional view of the transmission taken on line III—III of FIG. 1.

FIGS. 1, 2, and 3 illustrate an embodiment of a continuously variable transmission 100 that is shrouded in a case 40 which protects the transmission 100, contains lubricant, aligns components of the transmission 100, and absorbs forces of the transmission 100. A case cap 67 can, in certain embodiments, cover the case 40. The case cap 67 is generally shaped as a disc with a bore, through its center through which an input shaft passes, and that has a set of threads at its outer diameter that thread into a corresponding set of threads on the inner diameter of the case 40. Although in other embodiments, the case cap 67 can be fastened to the case 40 or held in place by a snap ring and corresponding groove in the case 40, and would therefore not need to be threaded at its outer diameter. In embodiments utilizing fasteners to attach the case cap 67, the case cap 67 extends to the inside diameter of the case 40 so that case fasteners (not shown) used to bolt the case 40 to the machinery to which the transmission 100 is attached can be passed through corresponding holes in the case cap 67. The case cap 67 of the illustrated embodiment has a cylindrical portion extending from an area near its outer diameter toward the output side of the transmission 100 for additional support of other components of the transmission 100. At the heart of the illustrated transmission 100 embodiment is a plurality of balls 1 that are typically spherical in shape and are radially distributed substantially evenly or symmetrically about the centerline, or longitudinal axis 11 of rotation of the transmission 100. In the illustrated embodiment, eight balls 1 are used. However, it should be noted that more or fewer balls 1 could be used depending on the use of the transmission 100. For example, the transmission may include 3, 4, 5, 6, 7, 8, 9, 10, 11, 12, 13, 14, 15 or more balls. The provision for more than 3, 4, or 5 balls can more widely distribute the forces exerted on the individual balls 1 and their points of contact with other components of the transmission 100 and can also reduce the force necessary to prevent the transmission 100 from slipping at the ball 1 contact patches. Certain embodiments in applications with low torque but a high transmission ratio use few balls 1 of relatively larger diameters, while certain embodiments in applications with high torque and a high transmission ratio can use more balls 1 or relatively larger diameters. Other embodiments, in applications with high torque and a low transmission ratio and where high efficiency is not important, use more balls 1 of relatively smaller diameters. Finally, certain embodiments, in applications with low torque and where high efficiency is not important, use few balls 1 of relatively smaller diameters.

Ball axles 3 are inserted through holes that run through the center of each of the balls 1 to define an axis of rotation for each of the balls 1. The ball axles 3 are generally elongated shafts over which the balls 1 rotate, and have two ends that extend out of either side of the hole through the balls 1. Certain embodiments have cylindrically shaped ball axles 3, although any shape can be used. The balls 1 are mounted to freely rotate about the ball axles 3.

In certain embodiments, bearings (not separately illustrated) are utilized to reduce the friction between the outer surface of the ball axles 3 and the surface of the bore through the corresponding ball 1. These bearings can be any type of bearings situated anywhere along the contacting surfaces of the balls 1 and their corresponding ball axles 3, and many embodiments will maximize the life and utility of such bearings through standard mechanical principles common in the design of dynamic mechanical systems. In some of these embodiments, radial bearings are located at each end of the bore through the balls 1. These bearings can incorporate the inner surface of the bore or the outer surface of the ball axles 3 as their races, or the bearings can include separate races that fit in appropriate cavities formed in the bore of each ball 1 and on each ball axle 3. In one embodiment, a cavity (not shown) for a bearing is formed by expanding the bore through each ball 1 at least at both ends an appropriate diameter such that a radial bearing, roller, ball or other type, can be fitted into and held within the cavity thus formed. In another embodiment, the ball axles 3 are coated with a friction reducing material such as babbit, Teflon or other such material.

Many embodiments also minimize the friction between the ball axles 3 and the balls 1 by introducing lubrication in the bore of the ball axles 3. The lubrication can be injected into the bore around the ball axles 3 by a pressure source, or it can be drawn into the bore by the rifling or helical grooves formed on the ball axles 3 themselves. Further discussion of the lubrication of the ball axles 3 is provided below.

In FIG. 1, the axes of rotation of the balls 1 are shown tilted in a direction that puts the transmission in a high ratio, wherein the output speed is greater than the input speed. If the ball axles 3 are horizontal, that is parallel to the main axis of the transmission 100, the transmission 100 is in a 1:1 input rotation rate to output rotation rate ratio, wherein the input and output rotation speeds are equal. In FIG. 2, the axes of rotation of the balls 1 are shown tilted in a direction where the transmission 100 is in a low ratio, meaning the output rotation speed is slower than the input rotation speed. For the purpose of simplicity, only the parts that change position or orientation when the transmission 100 is shifted are numbered in FIG. 2.

Figure 4:
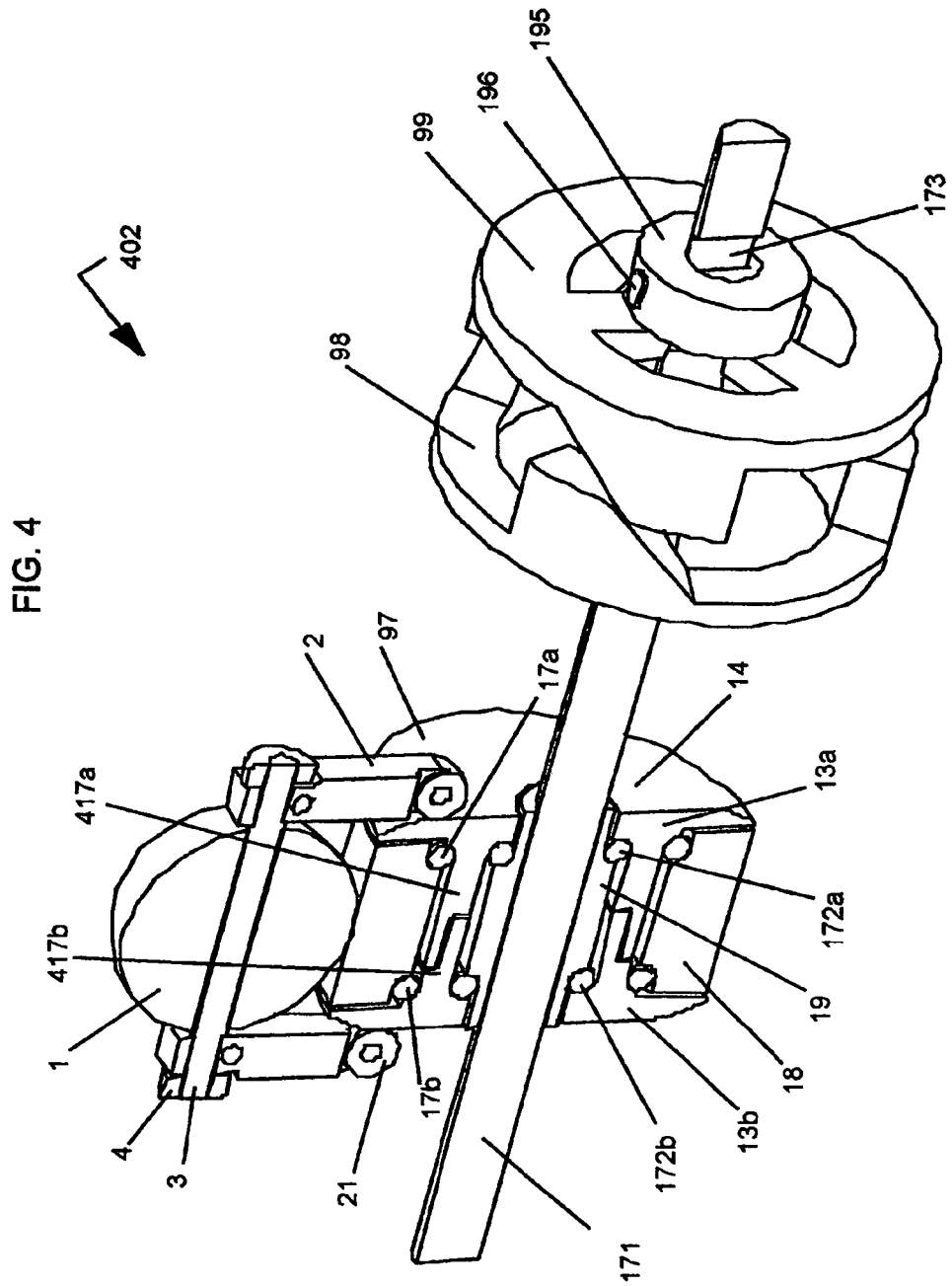
FIG. 4 is a schematic cutaway side view of the idler and ramp sub-assembly of the transmission of FIG. 1.
Figure 5:
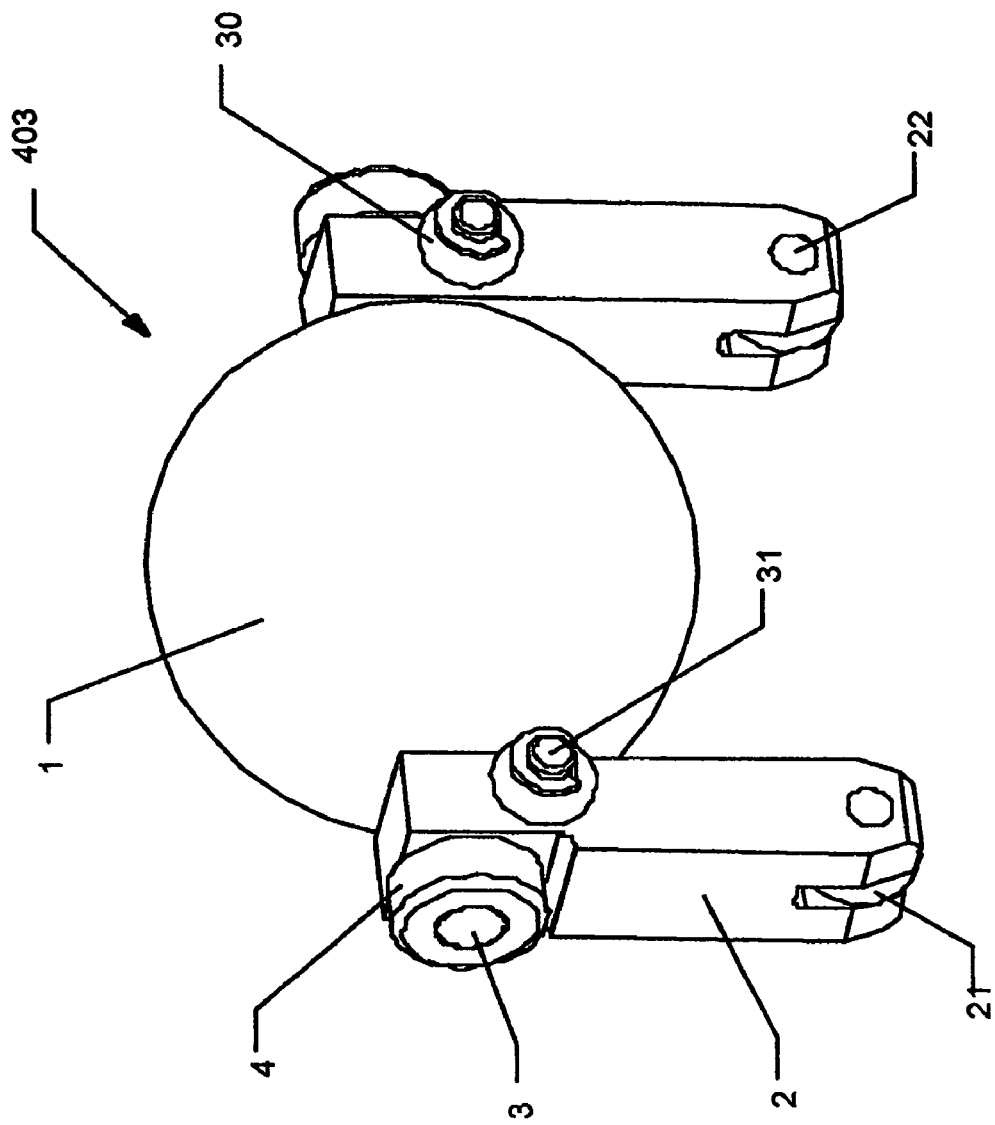
FIG. 5 is a schematic perspective view of the ball sub-assembly of the transmission of FIG. 1.

FIGS. 1, 2, 4, and 5 illustrate how the axes of the balls 1 can be tilted in operation to shift the transmission 100. Referring to FIG. 5, a plurality of legs 2, which in most embodiments are generally struts, are attached to the ball axles 3 near each of the ends of the ball axles 3 that extend beyond the ends of the holes bored through the balls 1. Each leg 2 extends from its point of attachment to its respective ball axle 3 radially inward toward the axis of the transmission 100. In one embodiment, each of the legs 2 has a through bore that receives a respective end of one of the ball axles 3. The ball axles 3 preferably extend through the legs 2 such that they have an end exposed beyond each leg 2. In the illustrated embodiments, the ball axles 3 advantageously have rollers 4 coaxially and slidingly positioned over the exposed ends of the ball axles 3. The rollers 4 are generally cylindrical wheels fitted over the ball axles 3 outside of and beyond the legs 2 and rotate freely about the ball axles 3.

Figure 7:
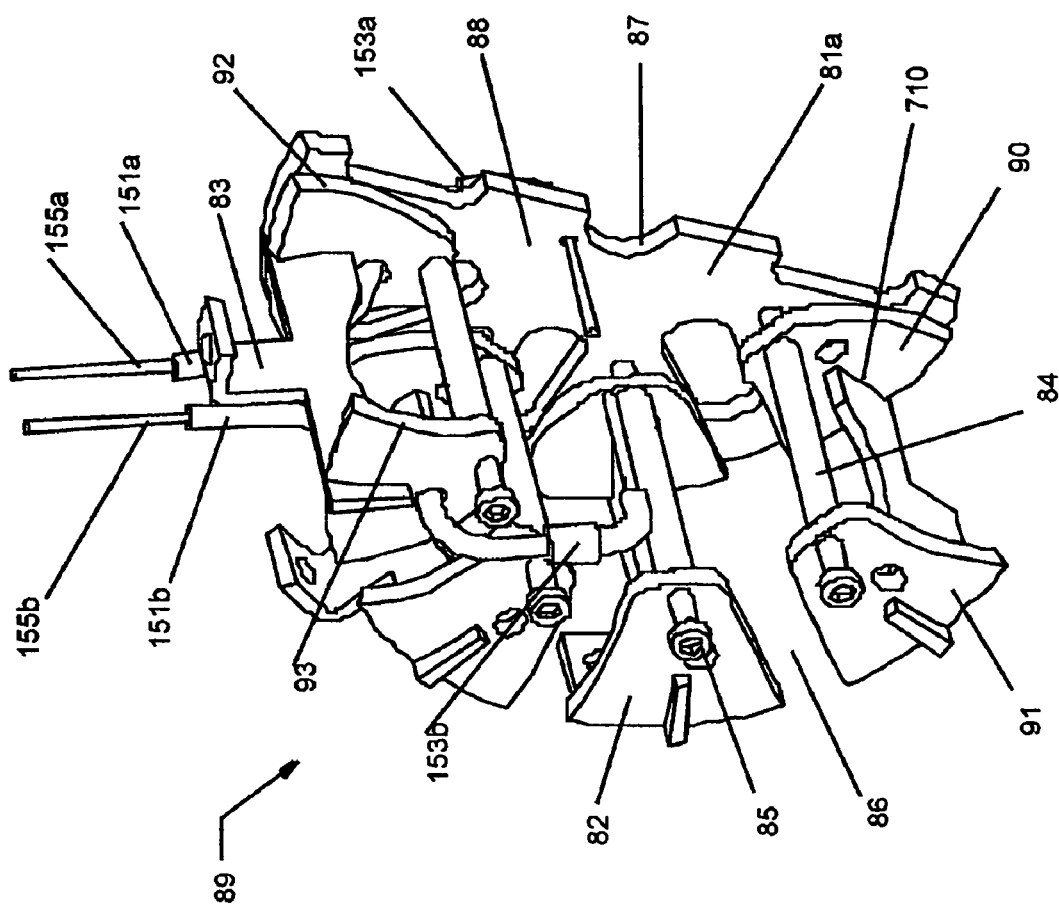
FIG. 7 is a schematic cutaway side view of the cage sub-assembly of the transmission of FIG. 1.

The rollers 4 can be attached to the ball axles 3 via spring clips or other such mechanism, or they can ride freely over the ball axles 3. The rollers 4 can be radial bearings for instance, where the outer races of the bearings form the wheel or rolling surface. As illustrated in FIGS. 1 and 7, the rollers 4 and the ends of the ball axles 3 fit inside grooves 86 formed by or in a pair of stators 80a, 80b.

The stators 80a, 80b of one embodiment are illustrated in FIGS. 5 and 7. The illustrated input stator 80a and output stator 80b are generally in the form of parallel discs annularly located about the longitudinal axis 11 of the transmission on either side of the balls 1. The stators 80a, 80b of many embodiments are comprised of input stator discs 81a and output stator discs 81b, respectively, which are generally annular discs of substantially uniform thickness with multiple apertures to be discussed further below. Each input and output stator disc 81a, 81b has a first side that faces the balls 1 and a second side that faces away from the balls 1. Multiple stator curves 82 are attached to the first side of the stator discs 81a, 81b. The stator curves 82 are curved surfaces attached or affixed to the stator discs 81a, 81b that each have a concave face 90 facing toward the balls 1 and a convex face 91 facing away from the balls 1 and contacting their respective stator discs 81. In some embodiments, the stator curves 82 are integral with the stator discs 81a, 81b. The stator curves 82 of many embodiments have a substantially uniform thickness and have at least one aperture (not separately shown) used to align and attach the stator curves 82 to each other and to the stator discs 81. The stator curves 82 of many embodiments, or the stator discs 81a, 81b where integral parts are used, include a slot 710 that accepts a flat spacer 83, which allows further positioning and alignment of the stator curves 82 and stator discs 81a, 81b. The flat spacers 83 are generally flat and generally rectangular pieces of rigid material that extend between and interconnect the input stator 80a and the output stator 80b. The flat spacers 83 fit within the slots 710 formed in the stator curves 82. In the illustrated embodiment, the flat spacers 83 are not fastened or otherwise connected to the stator curves 82, however, in some embodiments the flat spacers 83 are attached to the stator curves 82 by welding, adhesive, or fastening.

Also illustrated in FIG. 7, multiple cylindrical spacers 84, of a generally cylindrical shape with bores at least in each end, are radially positioned inside of the flat spacers 83 and also connect and position the stator discs 81 and stator curves 82. The bores of the cylindrical spacers 84 accept one spacer fastener 85 at each end. The spacer fasteners 85 are designed to clamp and hold the stator discs 81a, 81b, the stator curves 82, the flat spacers 83, and the cylindrical spacers 84 together, which collectively form the cage 89. The cage 89 maintains the radial and angular positions of the balls 1 and aligns the balls 1 with respect to one another.

The rotational axes of the balls 1 are changed by moving either the input-side or output-side legs 2 radially out from the axis of the transmission 100, which tilts the ball axles 3. As this occurs, each roller 4 fits into and follows a groove 86, which is slightly larger than the diameter of the roller 4, and is formed by the space between each pair of adjacent stator curves 82. The rollers 4 therefore roll along the surface of the sides 92, 93 of the stator curves 82, a first side 92 and a second side 93 for each stator curve 82, in order to maintain the plane of movement of the ball axles 3 in line with the longitudinal axis 11 of the transmission 100. In many embodiments, each roller 4 rolls on a first side 92 of the stator curve 82 on the input side of the transmission 100 and on the corresponding first side 92 of the corresponding output stator curve 82. Typically in such embodiments, the forces of the transmission 100 prevent the rollers 4 from contacting the second side 93 of the stator curves 82 in normal operation. The rollers 4 are slightly smaller in diameter than the width of the grooves 86 formed between the stator curves 82, forming a small gap between the edges of the grooves 86 and the circumference of each corresponding roller. If the opposing sets of stator curves 82 on the input stator 80a and output stator 80b were in perfect alignment, the small gap between the circumferences of the rollers 4 and the grooves 86 would allow the ball axles to slightly tilt and become misaligned with the longitudinal axis 11 of the transmission 100. This condition produces sideslip, a situation where the balls axles 3 are allowed to slightly move laterally, which lowers overall transmission efficiency. In some embodiments, the stator curves 82 on the input and output sides of the transmission 100 may be slightly offset from each other so that the ball axles 3 remain parallel with the axis of the transmission 100. Any tangential force, mainly a transaxial force, the balls 1 may apply to the ball axles 3 is absorbed by the ball axles 3, the rollers 4 and the first sides 92, 93 of the stator curves 82. As the transmission 100 is shifted to a lower or higher transmission ratio by changing the rotational axes of the balls 1, each one of the pairs of rollers 4, located on the opposite ends of a single ball axle 3, move in opposite directions along their respective corresponding grooves 86 by rolling up or down a respective side of the groove 86.

Referring to FIGS. 1 and 7, the cage 89 can be rigidly attached to the case 40 with one or more case connectors 160. The case connectors 160 extend generally perpendicularly from the radial outermost part of the flat spacers 83. The case connectors 160 can be fastened to the flat spacers 83 or can be formed integrally with the flat spacers 83. The outside diameter formed roughly by the outsides of the case connectors 160 is substantially the same dimension as the inside diameter of the case 40 and holes in both the case 40 and case connectors 160 provide for the use of standard or specialty fasteners, which rigidly attach the case connectors 160 to the case 40, thus bracing and preventing the cage 40 from moving. The case 40 has mounting holes providing for the attachment of the case 40 to a frame or other structural body. In other embodiments, the case connectors 160 can be formed as part of the case 40 and provide a location for attachment of the flat spacers 83 or other cage 89 component in order to mobilize the cage 89.

FIGS. 1, 5, and 7 illustrate an embodiment including a pair of stator wheels 30 attached to each of the legs 2 that roll on the concave face 90 of the curved surfaces 82 along a path near the edge of the sides 92, 93. The stator wheels 30 are attached to the legs 2 generally in the area where the ball axles 3 pass through the legs 2. The stator wheels 30 can be attached to the legs 2 with stator wheel pins 31, which pass through a bore through the legs 2 that is generally perpendicular to the ball axles 3, or by any other attachment method. The stator wheels 30 are coaxially and slidingly mounted over the stator wheel pins 31 and secured with standard fasteners, such as snap rings for example. In some embodiments, the stator wheels 30 are radial bearings with the inner race mounted to the stator wheel pins 31 and the outer race forming the rolling surface. In certain embodiments, one stator wheel 30 is positioned on each side of a leg 2 with enough clearance from the leg 2 to allow the stator wheels 30 to roll radially along the concave faces 90, with respect to the longitudinal axis 11 of the transmission 100, when the transmission 100 is shifted. In certain embodiments, the concave faces 90 are shaped such that they are concentric about a radius from the longitudinal axis 11 of the transmission 100 formed by the center of the balls 1.

Still referring to FIGS. 1, 5, and 7, guide wheels 21 are illustrated that can be attached to the end of the legs 2 that are nearest the longitudinal axis 11 of the transmission 100. In the illustrated embodiment, the guide wheels 21 are inserted into a slot formed in the end of the legs 2. The guide wheels 21 are held in place in the slots of the legs 21 with guide wheel pins 22, or by any other attachment method. The guide wheels 21 are coaxially and slidingly mounted over the guide wheel pins 22, which are inserted into bores formed in the legs 2 on each side of the guide wheels 21 and perpendicular to the plane of the slot. In some embodiments, the legs 2 are designed to elastically deflect relatively slightly in order to allow for manufacturing tolerances of the parts of the transmission 100. The ball 1, the legs 2, the ball axle 3, the rollers 4, the stator wheels 30, the stator wheel pins 31, the guide wheels 21, and the guide wheel pins 22 collectively form the ball/leg assembly 403 seen in FIG. 5.

Figure 6:
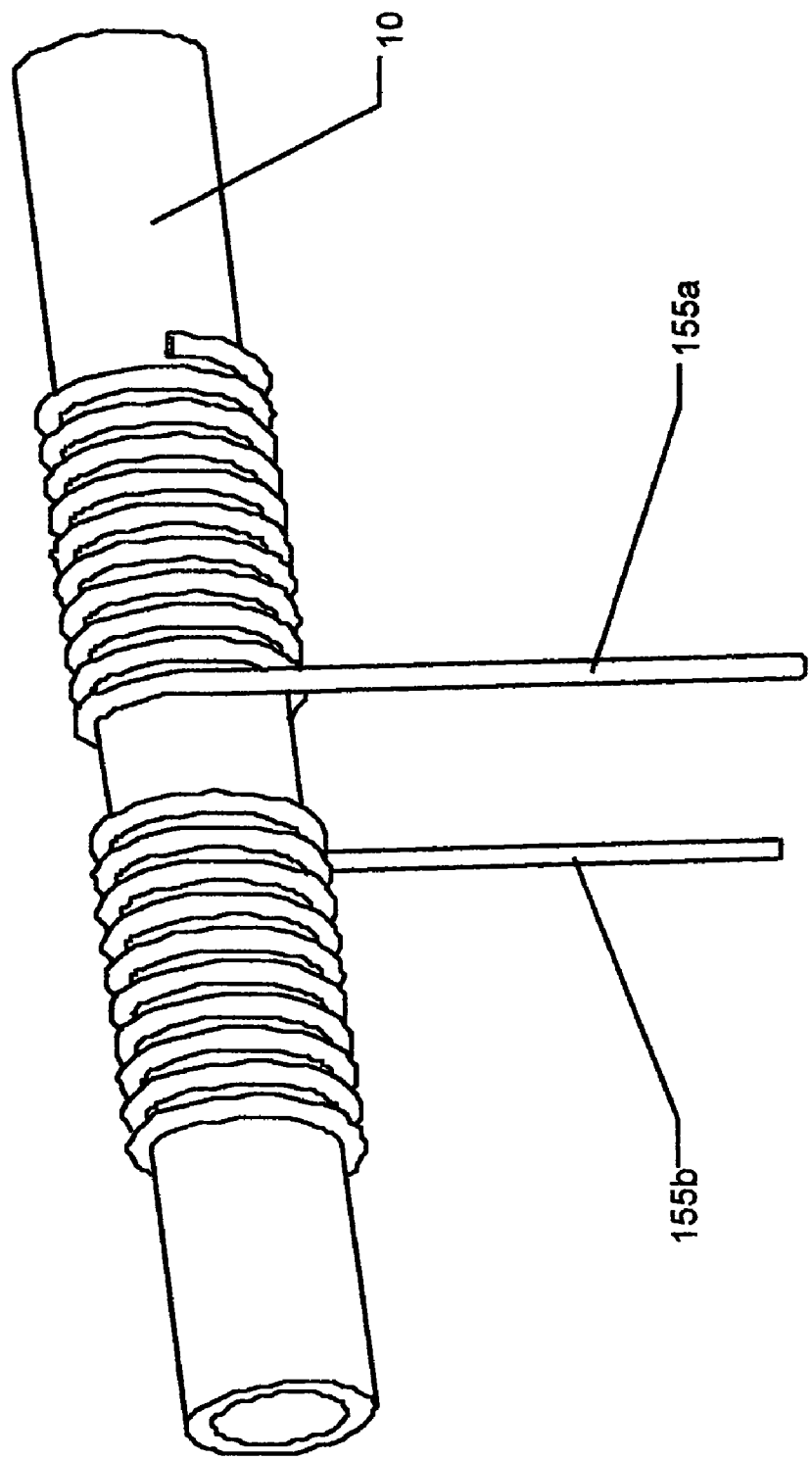
FIG. 6 is a schematic view of the shift rod sub-assembly of the transmission of FIG. 1.

Referring to the embodiment illustrated in FIGS. 4, 6, and 7, shifting is actuated by rotating a rod 10 that is positioned outside of the case 40. The rod 10 is utilized to wrap an unwrap a flexible input cable 155a and a flexible output cable 155b that are attached to, at their respective first ends, and wrapped around the rod 10, in opposite respective directions. In some embodiments, the input cable 155a is wrapped counter-clockwise around the rod 10 and the output cable 155b is wrapped clockwise around the rod 10, when looking from right to left as the rod 10 is illustrated in FIG. 6. Both the input cable 155a and the output cable 155b extend through holes in the case 40 and then through the first end of an input flexible cable housing 151a, and an output flexible cable housing 151b. The input flexible cable housing 151a and the output flexible cable housing 151b of the illustrated embodiment are flexible elongated tubes that guide the input cable 155a and output cable 155b radially inward toward the longitudinal axis 11 then longitudinally out through holes in the stator discs 81a, b and then again radially inward where the second end of the input and output flexible cable housings 151a, b are inserted into and attach to the first end of input and output rigid cable housings 153a, b, respectively. The input and output rigid cable housings 153a, b, are inflexible tubes through which the cables 155a, b, pass and are guided radially inward from the second ends of the flexible cable housings 151a, b and then direct the cables 155a, b longitudinally through holes in the stator discs 81a, b and toward a second end of the rigid cable housings 153a, b near the idler 18. In many embodiments, the cables 155a, b are attached at their second ends to an input shift guide 13a, and an output shift guide 13b (described further below) with conventional cable fasteners, or other suitable attachment means. As will be discussed further below, the shift guides 13a, 13b position the idler 18 axially along the longitudinal axis 11 and position the legs 3 radially, thereby changing the axes of the balls 1 and the ratio of the transmission 100.

If the rod 10 is rotated counter-clockwise, relative to the axis of the rod 10 from right to left as illustrated in FIG. 6, by the user, either manually or by or assisted with a power source, the input cable 155a unwinds from the rod 10 and the output cable 155b winds onto the rod 10. Therefore, the second end of the output cable 155b applies a tension force to the output shift guide 13b and the input cable 155a is unwinding a commensurate amount from the rod 10. This moves the idler 18 axially toward the output side of the transmission 100 and shifts the transmission 100 toward low.

Still referring to FIGS. 4, 5, and 7, the illustrated shift guides 13a, b, are each generally of the form of an annular ring with inside and outside diameters, and are shaped so as to have two sides. The first side is a generally straight surface that dynamically contacts and axially supports the idler 18 via two sets of idler bearings 17a, 17b, which are each associated with a respective shift guide 13a, b. The second side of each shift guide 13a, b, the side facing away from the idler 18, is a cam side that transitions from a straight or flat radial surface 14, towards the inner diameter of the shift guides 13a, b, to a convex curve 97 towards the outer diameter of the shift guides 13a, b. At the inner diameter of the shift guides 13a, b a longitudinal tubular sleeve 417a, b extends axially toward the opposing shift guide 13a, b in order to mate with the tubular sleeve 417a, b from that shift guide 13a, b. In some embodiments, as illustrated in FIG. 4, the tubular sleeve of the input side shift guide 13a has part of its inner diameter bored out to accept the tubular sleeve of the output shift guide 13b. Correspondingly, a portion of the outer diameter of the tubular sleeve of the output shift guide 13b has been removed to allow a portion of that tubular sleeve 417a, b to be inserted into the tubular sleeve 417a, b of the input shift guide 13a. This provides additional stability to the shift guides 13a, b of such embodiments.

The cross section side view of the shift guides 13a, b illustrated in FIG. 4 shows that, in this embodiment, the flat surface 14 profile of the side facing away from the is perpendicular to the longitudinal axis 11 up to a radial point where the guide wheels 21 contact the shift guides 13a, b, if the ball axles 3 are parallel with the longitudinal axis 11 of the transmission 100. From this point moving out toward the perimeter of the shift guide 13a, b the profile of the shift guides 13a, b curves in a convex shape. In some embodiments, the convex curve 97 of a shift guide 13a, b is not a radius but is composed of multiple radii, or is shaped hyperbolically, asymptotically or otherwise. As the transmission 100 is shifted toward low, the input guide wheels 21a, roll toward the longitudinal axis 11 on the flat 14 portion of shift guide 13a, and the output guide wheels 21b roll on the convex curved 97 portion of the shift guide 13b away from the longitudinal axis 11. The shift guides 13a, b, can be attached to each other by either threading the tubular sleeve of the input shift guide 13a with male threads and the tubular sleeve of the output sleeve 13b with female threads, or vice versa, and threading the shift guides 13a, b, together. One shift guide 13a, b, either the input or output, can also be pressed into the other shift guide 13a, b. The shift guides 13a, b can also be attached by other methods such as glue, metal adhesive, welding or any other means.

The convex curves 97 of the two shift guides 13a, b, act as cam surfaces, each contacting and pushing the multiple guide wheels 21. The flat surface 14 and convex curve 97 of each shift guide 13a, b contact the guide wheels 21 so that as the shift guides 13a, b, move axially along the longitudinal axis 11, the guide wheels 21 ride along the shift guide 13a, b surface 14, 97 in a generally radial direction forcing the leg 2 radially out from, or in toward, the longitudinal axis 11, thereby changing the angle of the ball axle 3 and the rotational axis of the associated ball 1.

Referring to FIGS. 4 and 7, the idler 18 of some embodiments is located in a trough formed between the first sides and the sleeve portions of the shift guides 13a, b, and thus moves in unison with the shift guides 13a, b. In certain embodiments, the idler 18 is generally tubular and of one outside diameter and is substantially cylindrical along the central portion of its inside diameter with an input and output idler bearing 17a, b, on each end of its inside diameter. In other embodiments, the outer diameter and inside diameters of the idler 18 can be non-uniform and can vary or be any shape, such as ramped or curved. The idler 18 has two sides, one near the input stator 80a, and one near the output stator 80b. The idler bearings 17a, 17b provide rolling contact between the idler 18 and the shift guides 13a, b. The idler bearings 17a, 17b are located coaxially around the sleeve portion of the shift guides 13a, b, allowing the idler 18 to freely rotate about the axis of the transmission 100. A sleeve 19 is fit around the longitudinal axis 11 of the transmission 100 and fitting inside the inside diameters of the shift guides 13a, b. The sleeve 19 is a generally tubular component that is held in operable contact with an inside bearing race surface of each of the shift guides 13a, b by an input sleeve bearing 172a and an output sleeve bearing 172b. The sleeve bearings 172a, b, provide for rotation of the sleeve 19 by rolling along an outer bearing race complimentary to the races of the shift guides 13a, b. The idler 18, the idler bearings 17a, 17b, the sleeve 19, the shift guides 13a, 13b, and the sleeve bearings 172a, 172b collectively form the idler assembly 402, seen in FIG. 4.

Figure 8:
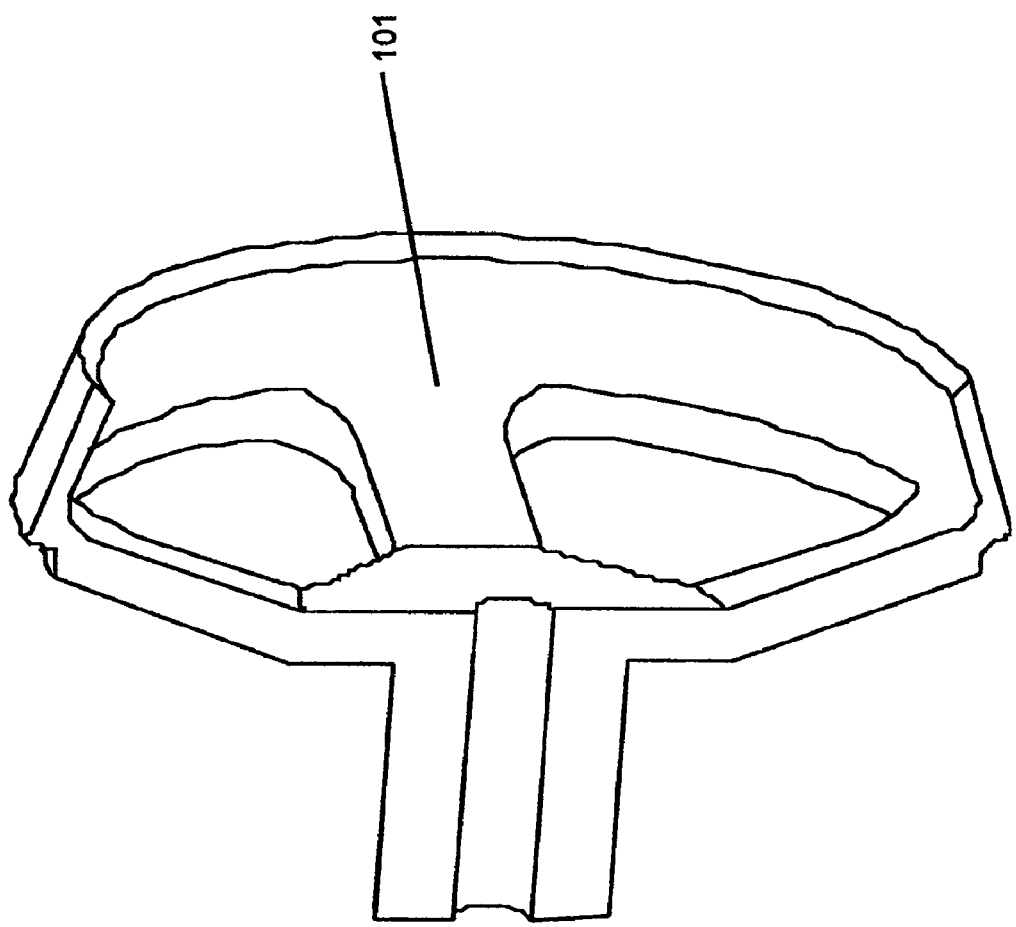
FIG. 8 is a cutaway side view of the output disc of the transmission of FIG. 1.

Referring to FIGS. 4, 7, and 8, the sleeve 19 of some embodiments has its inside diameter threaded to accept the threaded insertion of an idler rod 171. The idler rod 171 is a generally cylindrical rod that lies along the longitudinal axis 11 of the transmission 100. In some embodiments, the idler rod 171 is threaded at least partially along its length to allow insertion into the sleeve 19. The first end of the idler rod 171, which faces the output side of the transmission 100, is preferably threaded through the sleeve 19 and extends out past the output side of the sleeve 19 where it is inserted into the inside diameter of the output disc 101.

As illustrated in FIG. 8, the output disc 101 in some embodiments is generally a conical disc that is spoked to reduce weight and has a tubular sleeve portion extending from its inner diameter axially toward the output side of the transmission 100. The output disc 101 transfers the output torque to a drive shaft, wheel, or other mechanical device. The output disc 101 contacts the balls 1 on their output side and rotates at a speed different than the input rotation of the transmission at ratios other than 1:1. The output disc 101 serves to guide and center the idler rod 171 at its first end so that the sleeve 19, idler 18, and shift guides 13a, b stay concentric with the axis of the transmission 100. Alternately, an annular bearing may be positioned over the idler rod 171, between the idler rod 171 and the inside diameter of the output disc 101, to minimize friction. The idler rod 171, sleeve 19, shift guides 13a, b, and idler 18 are operably connected, and all move axially in unison when the transmission 100 is shifted.

Referring to FIG. 2, a conical spring 133, positioned between the input shift guide 13a and stator 80a biases the shifting of the transmission 100 toward low. Referring to FIG. 1, output disc bearings 102, which contact a bearing race near the perimeter of the output disc 101, absorb and transfer axial force generated by the transmission 100 to the case 40. The case 40 has a corresponding bearing race to guide the output disc bearings 102.

Referring to FIGS. 4, 5, and 7, the limits of the axial movement of the shift guides 13a, b define the shifting range of the transmission 100. Axial movement is limited by inside faces 88a, b, on the stator discs 81a, b, which the shift guides 13a, b, contact. At an extreme high transmission ratio, shift guide 13a contacts the inside face 88a on the input stator discs 81a, and at an extreme low transmission ratio, the shift guide 13b contacts the inside face 88 on the output stator disc 81b. In many embodiments, the curvature of the convex curves 97 of the shift guides 13a, b, is functionally dependent on the distance from the center of a ball 1 to the center of the guide wheel 21, the radius of the guide wheel 21, the angle between lines formed between the two guide wheels 21 and the center of the ball 1, and the angle of tilt of the ball 1 axis. An example of such a relationship is described below, with respect to FIGS. 25, 26 and 27.

Now referring to embodiments illustrated by FIGS. 1, 5, and 7, one or more stator wheels 30 can be attached to each leg 2 with a stator wheel pin 31 that is inserted through a hole in each leg 2. The stator wheel pins 31 are of the proper size and design to allow the stator wheels 30 to rotate freely over each stator wheel pin 31. The stator wheels 30 roll along the concave curved surfaces 90 of the stator curves 82 that face the balls 1. The stator wheels 30 provide axial support to prevent the legs 2 from moving axially and also to ensure that the ball axles 3 tilt easily when the transmission 100 is shifted.

Referring to FIGS. 1 and 7, a spoked input disc 34, located adjacent to the stator 80a, partially encapsulates but generally does not contact the stator 80a. The input disc 34 may have two or more spokes or may be a solid disc. The spokes reduce weight and aid in assembly of the transmission 100. In other embodiments a solid disc can be used. The input disc 34 has two sides, a first side that contacts with the balls 1, and a second side that faces opposite the first side. The input disc 34 is generally an annular disk that fits coaxially over, and extends radially from, a set of female threads or nut 37 at its inner diameter. The outside diameter of the input disc 34 is designed to fit within the case 40, if the case 40 used is the type that encapsulates the balls 1 and the input disc 34 and mounts to a rigid support structure 116 such as a chassis or frame with conventional bolts, which are inserted through bolt holes in a flange on the case 40. As mentioned above, the input disc 34 is in rotating contact with the balls 1 along a circumferential ramped or bearing contact surface on a lip of the first side of the input disc 34, the side facing the balls 1. As also mentioned above, some embodiments of the input disc 34 have a set of female threads 37, or a nut 37, inserted into its inside diameter, and the nut 37 is threaded over a screw 35, thereby engaging the input disc 34 with the screw 35.

Referring to FIGS. 1 and 4, the screw 35 is attached to and rotated by a drive shaft 69. The drive shaft 69 is generally cylindrical and has an inner bore, a first end facing axially towards the output side, a second end facing axially toward the input side, and a generally constant diameter. At the first end, the drive shaft 69 is rigidly attached to and rotated by the input torque device, usually a gear, a sprocket, or a crankshaft from a motor. The drive shaft 69 has axial splines 109 extending from its second end to engage and rotate a corresponding set of splines formed on the inside diameter of the screw 35. A set of central drive shaft ramps 99, which on a first side is generally a set of raised inclined surfaces on an annular disk that is positioned coaxially over the drive shaft 69, have mating prongs that mate with the splines 109 on the drive shaft 99, are rotated by the drive shaft 69, and are capable of moving axially along the drive shaft 69. A pin ring 195 contacts a second side of the central drive shaft ramps 99. The pin ring 195 is a rigid ring that is coaxially positioned over the idler rod 171, is capable of axial movement and has a transverse bore that functions to hold an idler pin 196 in alignment with the idler rod 171. The idler pin 196 is an elongated rigid rod that is slightly longer than the diameter of the pin ring 195 and which is inserted through an elongated slot 173 in the idler rod 171 and extends slightly beyond the pin ring 195 at both its first and second ends when it is inserted into the bore of the pin ring 195. The elongated slot 173 in the idler rod 171 allows for axial movement of the idler rod 171 to the right, when viewed as illustrated in FIG. 1, without contacting the pin 196 when the transmission 100 is shifted from 1:1 toward high. However, when the transmission 100 is shifted from 1:1 toward low, the side on the input end of the elongated slot 173 contacts the pin 196, which then operably contacts the central drive shaft ramps 99 via the pin ring 195. The idler rod 171 is thus operably connected to the central drive shaft ramps 99 when the transmission is between 1:1 and low so that when the idler rod 171 moves axially the central drive shaft ramps 99 also move axially in conjunction with the idler rod 171. The ramp surfaces of the central drive shaft ramps 99 can be helical, curved, linear, or any other shape, and are in operable contact with a set of corresponding central bearing disc ramps 98. The central bearing disc ramps 98 have ramp faces that are complimentary to and oppose the central drive shaft ramps 99. On a first side, facing the output side of the transmission 100, the central bearing disc ramps 98 face the central drive shaft ramps 99 and are contacted and driven by the central drive shaft ramps 99.

The central bearing disc ramps 98 are rigidly attached to a bearing disc 60, a generally annular disc positioned to rotate coaxially about the longitudinal axis 11 of the transmission 100. The bearing disc 60 has a bearing race near its perimeter on its side that faces away from the balls 1 that contacts a bearing disc bearing 66. The bearing disc bearing 66 is an annular thrust bearing at the perimeter of the bearing disc 60 and is positioned between the bearing disc 60 and the input disc 34. The bearing disc bearing 66 provides axial and radial support for the bearing disc 60 and in turn is supported by a bearing race on a case cap 67, which acts with the case 40 to partially encapsulate the inner parts of the transmission 100.

Referring to FIG. 1, the case cap 67 is generally an annular disc extending from the drive shaft 69 having a tubular portion extending toward the output end from at or near its perimeter and also having a bore through its center. The case cap 67 absorbs axial and radial forces produced by the transmission 100, and seals the transmission 100, thereby preventing lubricant from escaping and contamination from entering. The case cap 67 is stationary and, in some embodiments, is rigidly attached to the case 40 with conventional fastening methods or can have male threads on its outside diameter, which mate with corresponding female threads on the inside diameter of the case 40. As was mentioned above, the case cap 67 has a bearing race that contacts the bearing disc bearing 66 near the perimeter of the bearing disc 60 that is located at the inside of the output end of the tubular extension from the case cap 67. The case cap 67 also has a second bearing race facing the output side located near the inside diameter of its annular portion that mates with a drive shaft bearing 104. The drive shaft bearing 104 is a combination thrust and radial bearing that provides axial and radial support to the drive shaft 69. The drive shaft 67 has a bearing race formed on its outside diameter facing the input side that mates with the drive shaft bearing 104, which transfers the axial force produced by the screw 35 to the case cap 67. An input bearing 105, adds support to the drive shaft 69. The input bearing 105 is coaxially positioned over the drive shaft 69 and mates with a third race on the inside diameter of the case cap 67 facing the input side of the transmission 100. A cone nut 106, a generally cylindrical threaded nut with a bearing race designed to provide a running surface for the input bearing 105, is threaded over the drive shaft 69 and supports the input bearing 105.

Referring to the embodiment illustrated in FIG. 1, a set of multiple perimeter ramps 61, generally forming a ring about the longitudinal axis 11, are rigidly attached to the bearing disc 60. The perimeter ramps 61 are multiple inclined surfaces that are positioned radially about the longitudinal axis 11 and are positioned against or formed on the bearing disc 60 and face the output side. The inclined surfaces can be curved, helical, linear, or another shape and each one creates a wedge that produces and axial force that is applied to one of multiple ramp bearings 62. The ramp bearings 62 are spherical but can be cylindrical, conical, or another geometric shape, and are housed in a bearing cage 63. The bearing cage 63 of the illustrated embodiment is generally ring shaped with multiple apertures that contain the individual ramp bearings 62. A set of input disc ramps 64 are rigidly attached to, or formed as part of, the input disc 34. The input disc ramps 64 in some embodiments are complimentary to the perimeter ramps 62 with the ramps facing toward the input side. In another embodiment, the input disc ramps 64 are in the form of a bearing race that aligns and centers the ramp bearings 62 radially. The ramp bearings 62 respond to variations in torque by rolling up or down the inclined faces of the perimeter ramps 61 and the input disc ramps 64.

Referring now to FIGS. 1 and 4, an axial force generator 160 is made up of various components that create an axial force that is generated and is applied to the input disc 34 to increase the normal contact force between the input disc 34 and the balls 1, which is a component in the friction the input disc 34 utilizes in rotating the balls 1. The transmission 100 produces sufficient axial force so that the input disc 34, the balls 1, and the output disc 101 do not slip, or slip only an acceptable amount, at their contact points. As the magnitude of torque applied to the transmission 100 increases, an appropriate amount of additional axial force is required to prevent slippage. Furthermore, more axial force is required to prevent slippage in low than in high or at a 1:1 speed ratio. However, providing too much force in high or at 1:1 will shorten the lifespan of the transmission 100, reduce efficiency, and/or necessitate larger components to absorb the increased axial forces. Ideally, the axial force generator 160 will vary the axial force applied to the balls 1 as the transmission 100 is shifted and also as torque is varied. In some embodiments, the transmission 100 accomplishes both these goals. The screw 35 is designed and configured to provide an axial force that is separate and distinct from that produced by the perimeter ramps 61. In some embodiments the screw 35 produces less axial force than the perimeter ramps 61, although in other versions of the transmission 100, the screw 35 is configured to produce more force than the perimeter ramps 61. Upon an increase in torque, the screw 35 rotates slightly farther into the nut 37 to increase axial force by an amount proportional to the increase in torque. If the transmission 100 is in a 1:1 ratio and the user or vehicle shifts into a lower speed, the idler rod 171, moves axially toward the input side, along with the sleeve 19, sleeve bearings 172, shift guides 13a, b, and idler 18. The idler rod 171 contacts the central drive shaft ramps 99 through the pin 196 and pin ring 195, causing the central drive shaft ramps 99 to move axially toward the output side. The ramped surfaces of the central drive shaft ramps 99 contact the opposing ramped surfaces of the central bearing disc ramps 98, causing the central bearing disc ramps 98 to rotate the bearing disc 67 and engage the perimeter ramps 61 with the ramp bearings 62 and the input disc ramps 64. The central drive shaft ramps 99 and the central bearing disc ramps 98 perform a torque splitting function, shifting some of the torque from the screw 35 to the perimeter ramps 61. This increases the percentage of transmitted torque that is directed through the perimeter ramps 61, and due to the fact the perimeter ramps 61 are torque sensitive as described above, the amount of axial force that is generated increases.

Still referring to FIGS. 1 and 4, when shifting into low, the idler 18 moves axially towards the output side, and is pulled toward low by a reaction of forces in the contact patch. The farther the idler 18 moves toward low, the stronger it is pulled. This "idler pull," which increases with an increase in normal force across the contact as well as shift angle, also occurs when shifting into high. The idler pull occurs due to a collection of transverse forces acting in the contact patch, the effect of which is called spin. Spin occurs at the three contact patches, the points of contact where the balls contact the input disc 34, the output disc 101, and the idler 18. The magnitude of the resultant forces from spin at the contact between the idler 18 and the balls 1 is minimal in comparison to that of the balls 1 and input and output discs 34, 101. Due to the minimal spin produced at the contact patch of the idler 18 and ball 1 interface, this contact patch will be ignored for the following explanation. Spin can be considered an efficiency loss in the contact patches at the input disc 34 and ball 1 and also at the output disc 101 and ball 1. Spin produces a transverse force perpendicular to the rolling direction of the balls 1 and discs 34, 101. At a 1:1 ratio the transverse forces produced by spin, or contact spin, at the input and output contact patches are equal and opposite and are essentially cancelled. There is no axial pull on the idler 18 in this condition. However, as the transmission 100 is shifted toward low for example, the contact patch at the input disc 34 and ball 1 moves farther from the axis or pole of the ball 1. This decreases spin as well as the transverse forces that are produced perpendicular to the rolling direction. Simultaneously the output disc 101 and ball 1 contact patch moves closer to the axis or pole of the ball 1, which increases spin and the resultant transverse force. This creates a situation where the transverse forces produced by spin on the input and output sides of the transmission 100 are not equal and because the transverse force on the output contact is greater, the contact patch between the output disc 101 and ball 1 moves closer to the axis of the ball 1. The farther the transmission 100 is shifted into low the stronger the transverse forces in the contacts become that are exerted on the ball 1. The transverse forces caused by spin on the ball 1 exert a force in the opposite direction when shifting into high. The legs 2 attached to the ball axles 3 transfer the pull to the shift guides 13a, b, and because the shift guides 13a, b, are operably attached to the idler 18 and sleeve 19, an axial force is transferred to the idler rod 171. As the normal force across the contact increases, the influence of contact spin increases at all ratios and efficiency decreases.

Still referring to FIGS. 1 and 4, as the transmission 100 is shifted into low, the pull transferred to the idler rod 171 results in an axial force toward the left, as viewed in FIG. 1, which causes the input torque to shift from the screw 35 to the perimeter ramps 61. As the transmission 100 is shifted into extreme low, the idler rod 171 pulls more strongly, causing relative movement between the central drive shaft ramps 99 and the central bearing disc ramps 98 and shifts even more torque to the perimeter ramps 61. This reduces the torque transmitted through the screw 35 and increases the torque transmitted through the perimeter ramps 61, resulting in an increase in axial force.

Figure 9:
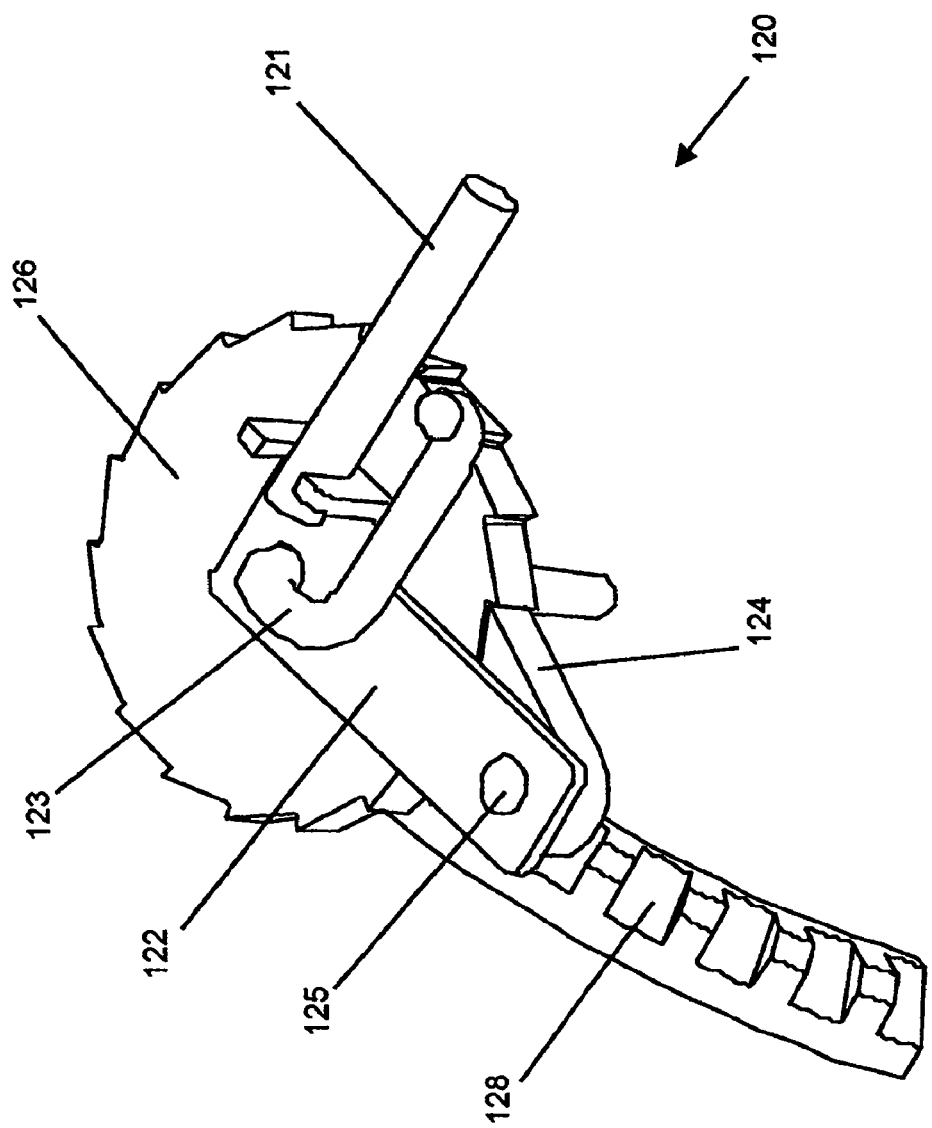
FIG. 9 is a schematic cutaway perspective view of the transmission of FIG. 1.
Figure 11:
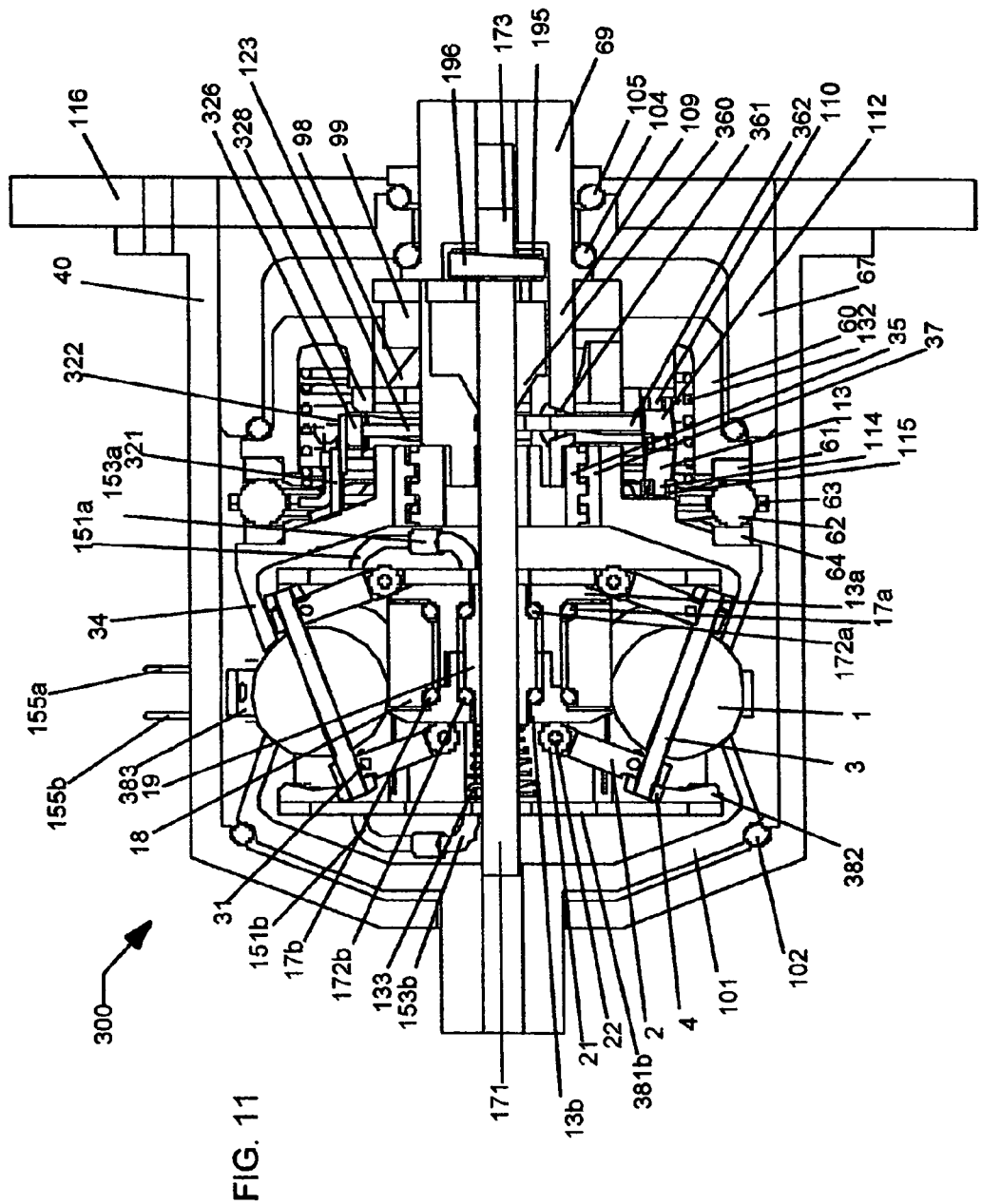
FIG. 11 is a cutaway side view of an alternative embodiment of the transmission of FIG. 1.

Referring to FIGS. 1 and 9, a disengagement mechanism (composed of several parts to be described) is described. The disengagement mechanism is located between the input disc 35 and the bearing disc 60 and disengages the transmission 100 when output rotation is greater than input rotation. The disengagement mechanism is comprised of multiple parts, including an input disc connector 121, a generally cylindrical elongated pin that is rigidly attached to the input disc 34 near its perimeter, which protrudes from the input disc 35 towards the bearing disc 60 in a direction substantially parallel to the longitudinal axis 11 of the transmission 100. The input disc connector 121 engages a clutch lever 122 at a first end. The clutch lever 122 is a generally L-shaped flat piece of rigid material, having its first end extending as its short leg and a second end extending as its long leg, and that pivots on a preloader 123 from a joint at the intersection of its legs. The engagement of the input disc connector 121 and the first end of the clutch lever 122 is sliding engagement and allows relative movement between the input disc connector 121 and the clutch lever 122. The clutch lever 122 joint is formed by a through hole that is positioned over the preloader 123. The preloader 123 is a flexible, elongated rod that can also be square, flat, or of any other cross-sectional shape and is attached at one of its ends to a hub extending radially through the bearing cage 63, and at a second end is rigidly attached to the drive shaft 69. The preloader 123 can bias the ramp bearings 62 up the perimeter ramps 61, it can pull the input disc 34 off of the balls during times when the disengagement mechanism is activated, and it can serve as a means of attachment for other components, such as disengagement mechanism 120 components. A pawl 124 is also attached to the clutch lever 122. The pawl 124 is generally wedge-shaped and at a first end tapers to a point, and at a second end is rounded with a through hole. A pawl pin 125 is inserted into a hole in the second end of the clutch lever 122, thereby attaching the pawl 124 to the clutch lever 122 while allowing for rotation of the pawl 124 about the pawl pin 125. The pawl 124 mates with and contacts a disc shaped ratchet 126, which has teeth around its circumference and lays flat against the back of the clutch lever 122. At the center of the ratchet 126 is a hole through which the preloader 123 passes adjacent to the clutch lever 122 and radially inward toward the longitudinal axis 11 of the transmission 100. The ratchet 126 is held in place by conventional fasteners and is capable of rotation about the preloader 123. A ratchet bevel 127, a gear with beveled teeth around its perimeter, is rigidly and coaxially attached to and made a part of the ratchet 126. The teeth on the ratchet bevel 127 mesh with a bevel gear 128. The bevel gear 128 is a ring that is rigidly attached to the bearing disc 60 in the illustrated embodiment, but which can be attached to other rotating components such as the drive shaft 69 and central drive shaft ramps 99. The bevel gear 128 has teeth around its perimeter that mate with the teeth on the ratchet 126. A main spring 129, a coiled spring with multiple coils as illustrated in FIG. 11, is coaxially positioned around the longitudinal axis 11 of the transmission 100 and is attached at a first end to the input disc 34 and at a second end to the bearing disc 60. The main spring 129 biases the input disc 34 to rotate about or "unwind" from the screw 35 so that the input disc 34 contacts the balls 1.

Still referring to FIGS. 1 and 9, when input rotation to the transmission 100 ceases and the output disc 101 continues to be rotated by one or more wheels, a drive train, or other output rotating mechanism, the balls 1 are driven by the output disc 101. The balls 1 then rotate the input disc 34 in a first direction to "wind" onto the screw 35 and disengage from the balls 1. The input disc connector 121, rotated by the input disc 34 in the same first direction, contacts and rotates the clutch lever 122 and also the pawl 124 in a first direction. The pawl 124 is biased to contact the teeth of the ratchet 126 by a pawl tensioner (not shown), which can be a torsion spring positioned coaxially over the pawl pin 125. As the pawl 124 passes over the teeth of the ratchet 126, the pawl 124 locks onto the teeth of the ratchet 126, preventing the input disc 34 from unwinding off of the screw 35 in a second direction and again contacting the balls 1, as the bias of the main spring 129 would tend to do. The ratchet 126 is prevented from rotating in a second direction because the ratchet bevel 127, a part of the ratchet 126, has teeth that are interlocked with the bevel gear 128 which is not rotating.

When input rotation of the transmission 100 resumes, the bevel gear 127 is rotated by the bearing disc 60 in a first direction, which rotates the ratchet bevel 127 and ratchet 126 in a second direction, thus rotating the pawl 124 in a second direction, allowing the main spring 129 to bias the input disc 34 to unwind from the screw 35 in a second direction and contact the balls 1. It is important to note that the bearing cage 63, attached to the preloader 123 at a first end, causes the preloader 123 to rotate relative to the input disc 34 when the input disc 34 rotates in a first direction. This is due to the ramp bearings 62 rotating relative to the input disc 34 when the input disc 34 is rotating in a first direction. Similarly, when input rotation of the transmission 100 resumes, the bearing disc 60 rotates relative to the preloader 123 due to the same relative rotation. This action provides for the engagement and release of the disengagement mechanism 120.

Figure 15:
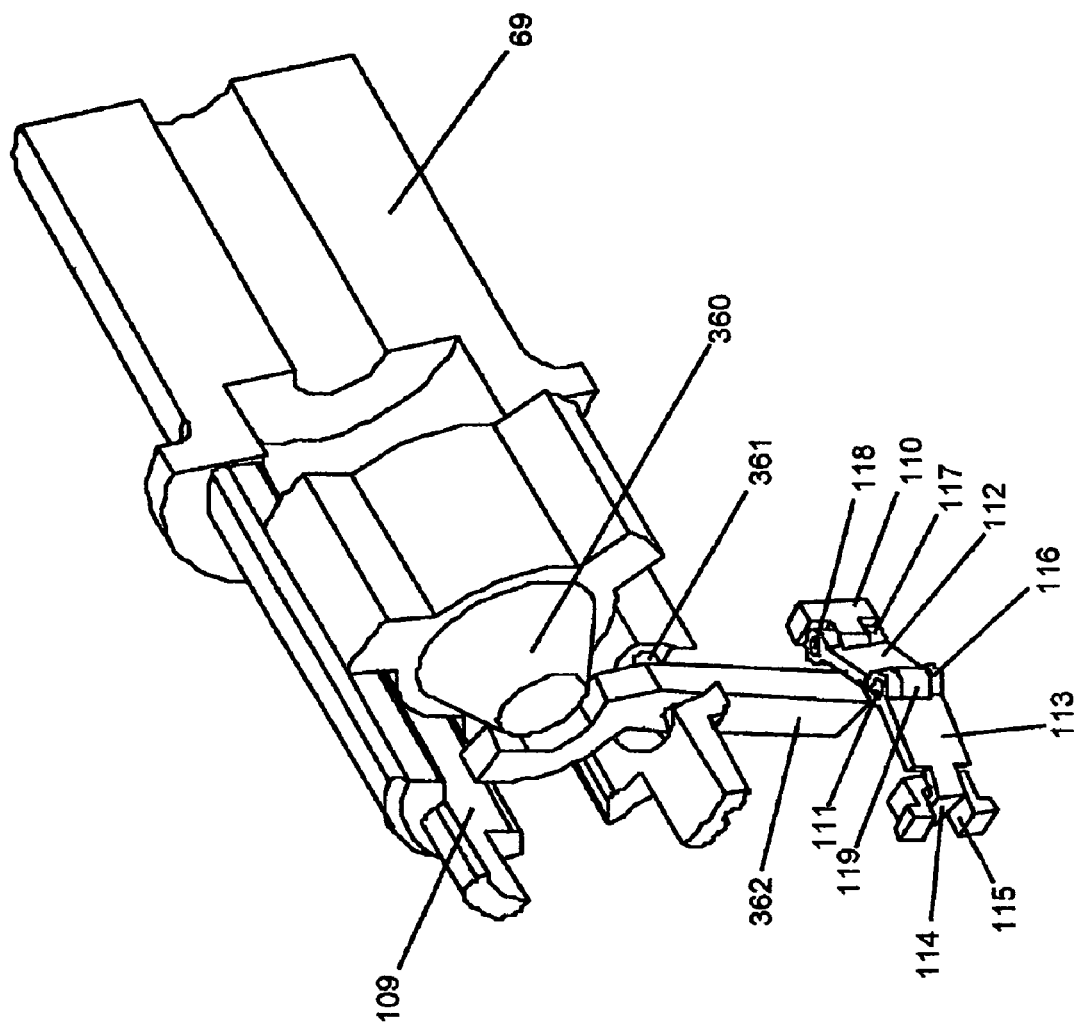
FIG. 15 is a cutaway schematic view of a portion of the axial force generator sub-assembly of the transmission of FIG. 11.

Referring to FIGS. 1 and 15, a latch 115 rigidly attaches to the side of the input disc 34 that faces the bearing disk 60 and engages a hook 114 that is rigidly attached to a first of two ends of a hook lever 113. The hook lever 113 is an elongated strut with the hook 114 at its first end and a hook hinge 116 at its second end. The latch 115 has an engaging area or an opening that is larger than the width of the hook 114 and provides extra room for the hook 114 to move radially, with respect to the longitudinal axis 11, within the confines of the latch 114 when the input disc 34 and the bearing disk 60 move relative to each other. The hood hinge 116 engages a middle hinge 119 and forms a hinge joint with a first hinge pin 111. The middle hinge 119 is integral with a first end of an input disc lever 112, which is a generally elongated strut having two ends. On its second end, the input disc lever 112 has an input disc hinge 117, which engages a hinge brace 110 via the use of a second hinge pin 118. The hinge brace 110 is generally a base to support the hook 114, the hook lever 113, the hook hinge 116, the first hinge pin 111, the middle hinge 119, the input disc lever 112, the second hinge pin 118, and the input disc hinge 117, and it is rigidly attached to the bearing disc 60 on the side facing the input disc 34. When the latch 115 and hook 114 are engaged, the ramp bearings 62 are prevented from rolling to an area on the perimeter ramps 61 that does not provide the correct amount of axial force to the drive disk 34. This positive engagement ensures that all rotational force applied to the ramp bearings 62 by perimeter ramps 61 is transmitted to the input disc 34. A preloader 123 is attached at a first end to the drive shaft 69 and extends radially outward. At a second end the preloader contacts the input disc lever 112, biasing the input disc 34 away from the balls 1, so that on occasions when the input disc 34 disengages from the balls 1, it is biased to remain disconnected.

Figure 10:
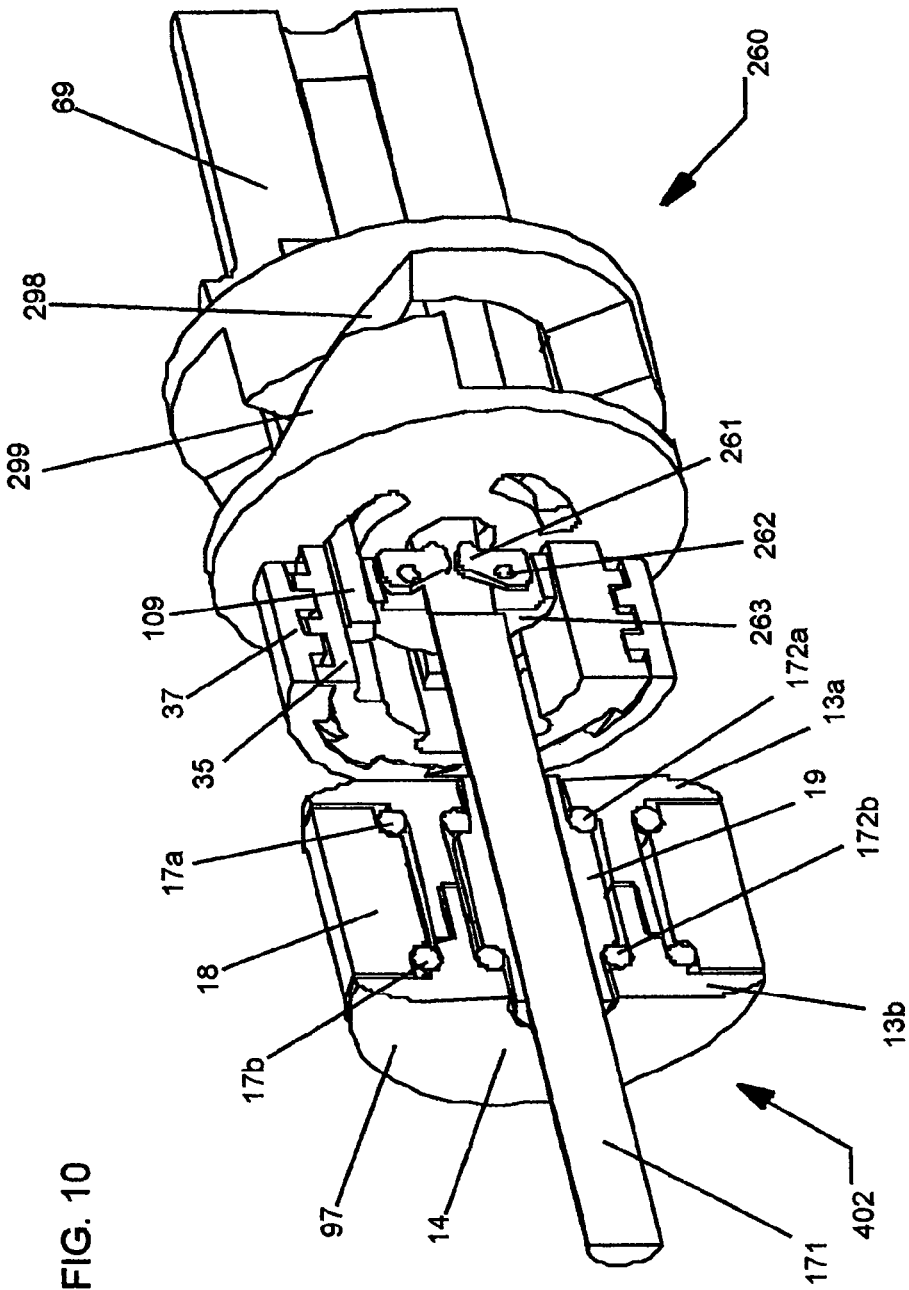
FIG. 10 is a schematic cutaway side view of an alternative embodiment of the axial force generator of the transmission of FIG. 1.

Referring to FIG. 10, a cutaway side view of an alternative axial force generator of the transmission 100 is disclosed. For purposes of simplicity, only the differences between the axial force generator previously described and the axial force generator illustrated in FIG. 10 will be presented. The illustrated axial force generator includes one or more reversing levers 261. The reversing levers 261 are generally flat, irregularly shaped cam pieces each having an off-center mounted pivot hole with a first side radially inward of the pivot hole and a second side radially outside of the pivot hole. The first side of the reversing levers 261 each fit into the elongated slot 173 in the idler rod 171. When the transmission 200 is shifted toward low, the end of the elongated slot 173 contacts the first side of the reversing levers 261 and the reversing levers 261 pivot on an axis produced by a reversing pin 262 that is inserted into the pivot holes of the reversing levers 261. As the first sides are contacted by the end of the elongated slot 173, the first side of each of the reversing levers 261 moves toward the output side of the transmission 100 and the second side of the reversing levers 261 moves toward the input side of the transmission 100 thereby fulfilling the cam function of the reversing levers 261. By increasing and decreasing the length of the first side and second side, the reversing levers 261 can be designed to decrease the distance that they move axially toward the input side and increase the force they produce. The reversing levers 261 can be designed in this manner to create a mechanical advantage to adjust the axial force that they produce. At their second sides, the reversing levers 261 each contact the output side of the central screw ramps 298 when the transmission 100 is shifted toward low. The reversing levers 261 are each attached to a lever ring 263 by the reversing pins 262, which can be pressed or threaded into holes in the lever ring 263 to hold the reversing levers 261 in position. The lever ring 263 is a ring shaped device that fits around, and slides axially along, the idler rod 171 and has one or more rectangular slots cut through it to allow for insertion and positioning of the reversing levers 261.

Still referring to the embodiment illustrated in FIG. 10, a set of central screw ramps 299 is rigidly attached to and can be rotated by the screw 35. The central screw ramps 299 of this embodiment are similar to the central screw ramps 99 illustrated in FIG. 4, in that the central screw ramps 299 are formed as ramps on the second side of a disc having a first side facing the output side and a second side facing the input side. As the transmission 100 is shifted toward low, the second side of the reversing levers 261 pushes against the first side of the central screw ramps 299. The central screw ramps 299, which are splined to the drive shaft 69 via the above-described spline 109, are rotated by the drive shaft 69, are capable of axial movement along the longitudinal axis 11, and are similar to the central drive shaft ramps 99 of the previous embodiment, except that the central screw ramps 299 face the input side of the transmission 100 rather than the output side. The central screw ramps 299 contact an opposing set of central bearing disc ramps 298, which are free to rotate relative to the drive shaft 69 and are similar to the central bearing disc ramps 98 illustrated in FIG. 4, except that the central bearing disc ramps 298 face the output side of the transmission 100 rather than the input side. As the central screw ramps 299 are pushed axially by the reversing levers 261 toward the central bearing disc ramps 298, relative rotation of the ramp faces of the central screw ramps 299 and central bearing disc ramps 298 is developed that causes the bearing disc 60 to rotate to a point such that the perimeter ramps 61 become engaged, thereby shifting torque to the perimeter ramps 61 and increasing the amount of axial force that is generated.

Referring now to FIG. 11, a cutaway side view of an alternative embodiment of the transmission 100 of FIG. 1 is disclosed. For purposes of simplicity, only the differences between the earlier transmission 100 and this transmission 300 will be described. The transmission 300 has an alternative cage 389, an alternative disengagement mechanism (item 320 of FIGS. 13 and 14), and an alternative axial force generator. Furthermore, in the embodiment illustrated in FIG. 11 the conical spring 133 is moved to the output side of the transmission 300, biasing the shifting toward high.

Figure 12:
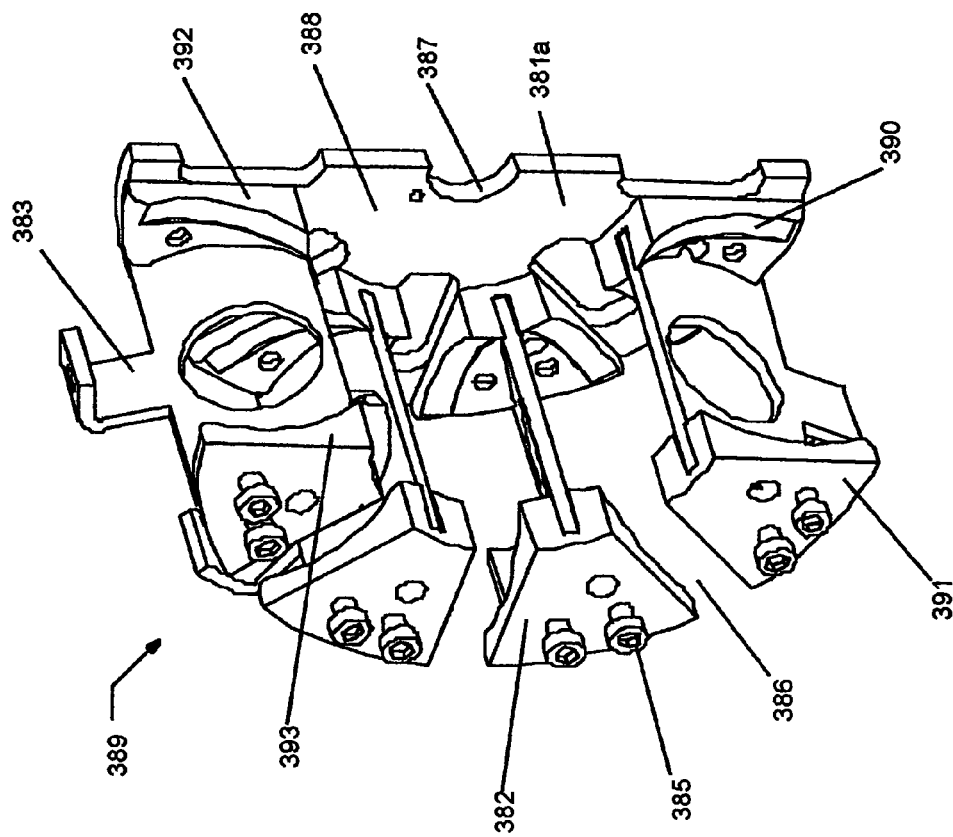
FIG. 12 is a schematic cutaway of the cage sub-assembly of the transmission of FIG. 11.

Referring now to FIGS. 11 and 12, an alternative cage 389 is disclosed. The cage 389 includes input and output stator discs 381*a*, *b*, however for ease of viewing, the output stator disc 381*b* has been removed. The output stator 381*b* of many embodiments is structurally similar to the input stator 381*a*. Multiple stator curves 382 are attached to the stator discs 381*a*, *b* and have first sides facing the balls 1 and second sides facing away from the balls 1. The second side 391 of each of the stator curves 382 is a flat surface that lays flat against a respective one of the stator discs 181*a*, *b*. The stator curves 382 have two through holes that are used to attach the stator curves 382 to the stator discs 381*a*, *b* with conventional fasteners or other type of attachment mechanism. The stator curves 382 have on each of their first sides a rectangular slot into which multiple flat spacers 383 are inserted to connect the stators 381. The flat spacers 383 serve to set the distance between the stators 381, create a strong connection between the stators 381, and ensure that the stators 381 are parallel and in alignment.

The illustrated design incorporates a stator disc 181 that is substantially flat. Therefore, the stator discs 181 can be manufactured utilizing a substantially flat sheet of rigid material. The stator discs 181 can be produced from any of a number of inexpensive manufacturing techniques such as stamping, fine blanking, or any other such technique known in the industry. The stator discs 181 of this design can be made from thin or sheet metal, plastic, ceramic, wood or paper products or any other material. The illustrated design allows for significant reduction in the cost of materials and manufacturing of these otherwise relatively expensive components to a suitably high tolerance.

Figure 14:
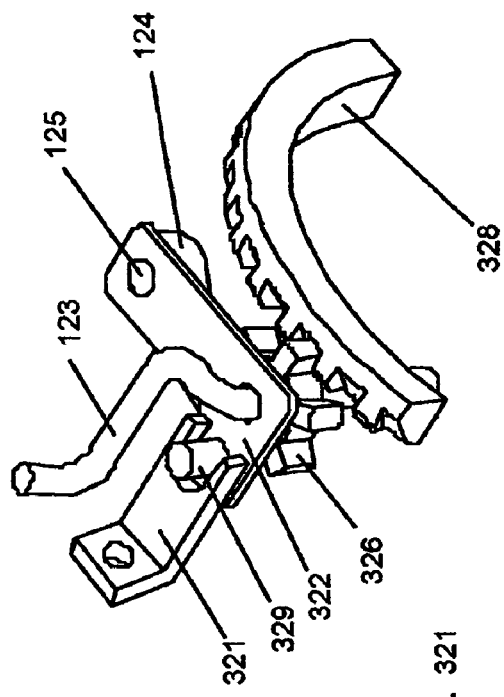
FIG. 14 is a cutaway schematic view of an alternative disengagement mechanism looking from above and outside the transmission of FIG. 11 toward the center.
Figure 13:
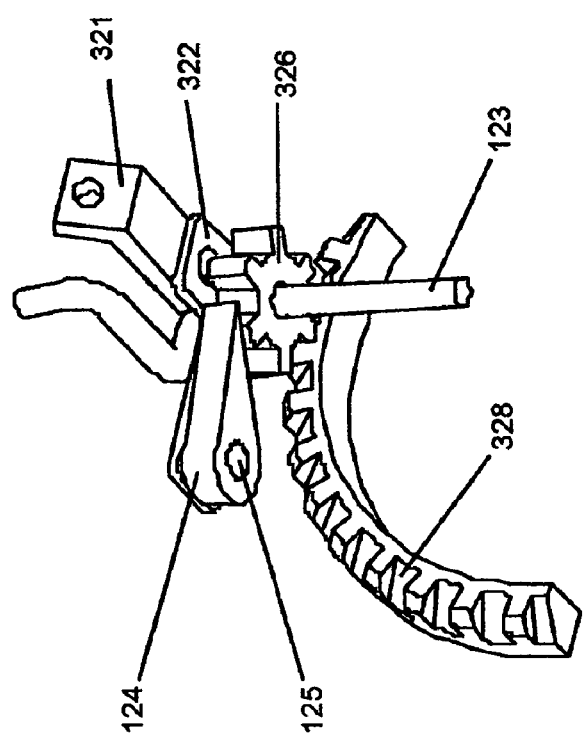
FIG. 13 is a cutaway schematic view of an alternative disengagement mechanism looking from near the axis of the transmission of FIG. 11.

Referring now to FIGS. 11, 13, and 14, an alternative disengagement mechanism 320 is disclosed. FIG. 13 is a cutaway schematic view looking from near the axis of the transmission 300, and FIG. 14 is a cutaway schematic view looking from above and outside the transmission 300 generally radially inward toward the center. The ratchet 126 and the ratchet bevel 127 of the previously described embodiment are merged in the present embodiment into one pawl gear 326 that engages the pawl 124 and has teeth that interlock with the bevel gear 328. The bevel gear 328 in other embodiments may have non-beveled gear teeth. The clutch lever 322 is a rigid, flat L-shaped component having three or more holes. The centermost hole at the joint of the two legs forming the "L" shape positions the clutch lever 322 rotatably and coaxially about the preloader 123. A hole near the end of the long leg of the clutch lever 322 allows for insertion of the pawl pin 125 and attachment to the pawl 124. A hole near the end of the short leg of the clutch lever 322 that mates with the input disc connector 321, accepts and retains a clutch pin 329 which fits into a slot of the input disc connector 321. The input disc connector 321 is rigidly attached to the input disc 34 and has a slot providing for sliding engagement of the clutch pin 329. The operation of the alternative disengagement mechanism 320 is otherwise the same as the coasting mechanism 120 previously described and illustrated in FIGS. 1 and 9.

Referring now to FIGS. 11 and 15, an alternative axial force generator includes a generally conical wedge 360 that is positioned and is capable of axial movement along the central axis of the transmission 300. The conical wedge 360 is also mated with the spline 109. As the transmission 300 is shifted toward low, the conical wedge 360 is engaged by the idler rod 171 and moves axially in the same direction as the idler rod 171. The conical wedge 360 contacts a first end of an AFG (axial force generator) lever 362 near the transmission 300 axis. The AFG lever 362 is a generally elongated part having a first semi-circular end that engages the conical wedge 360 and then extends radially outward from the longitudinal axis 11 to a second end that engages the input disc lever 112. The AFG lever 362 is attached to the spline 109 with a fulcrum pin 361 about which the AFG lever 362 rotates. The fulcrum pin 361 provides for pivoting of the AFG lever 362 so that the second end of the AFG lever 362 engages the input disc lever 112. The input disc lever 112 is operably attached to the bearing disc 60 and rotates the bearing disc 60 so that the perimeter ramps 61 engage, thus shifting input torque from the screw 35 to the perimeter ramps 61. The operation of the alternative axial force generator 360 is otherwise the same as the axial force generator previously described and seen in FIGS. 1 and 4.

Figure 16:
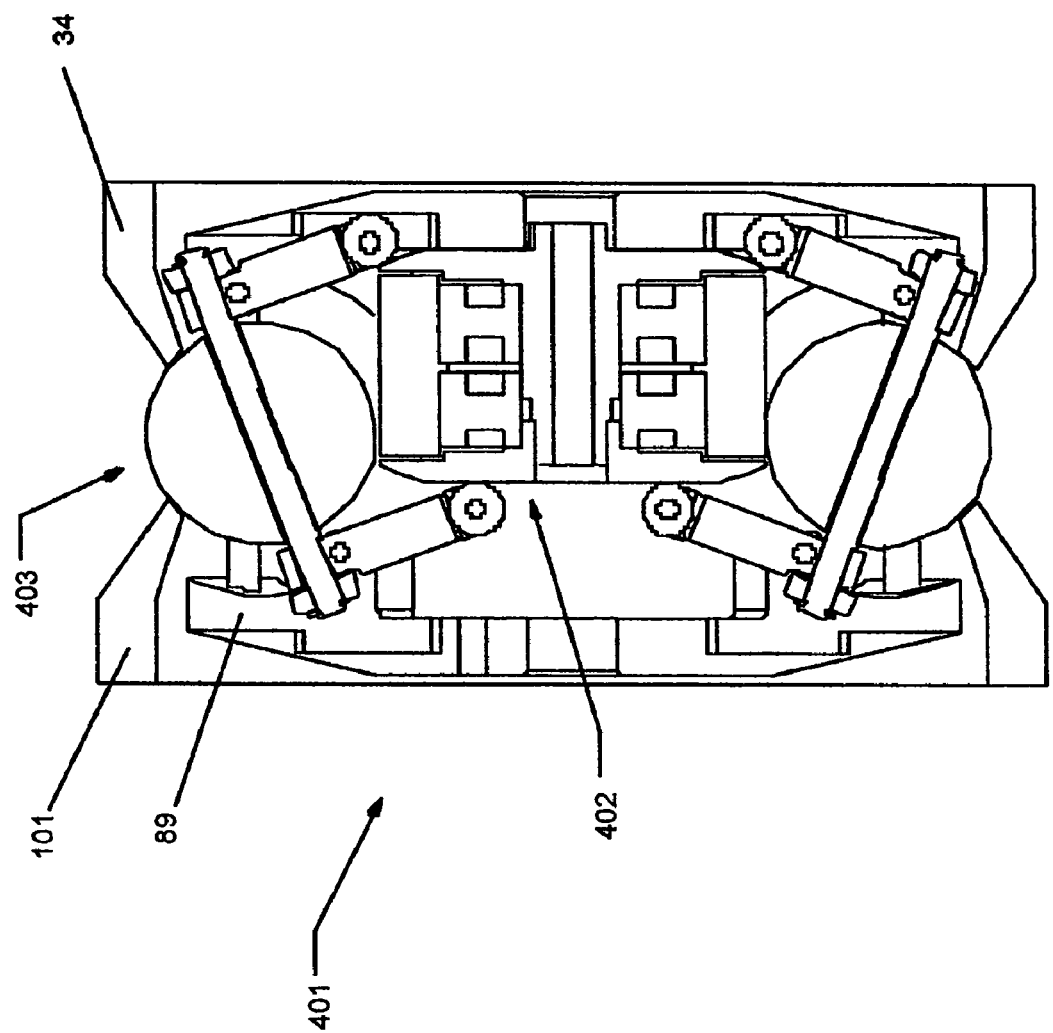
FIG. 16 is a cutaway side view of the variator of the transmission of FIG. 1.
Figure 17:
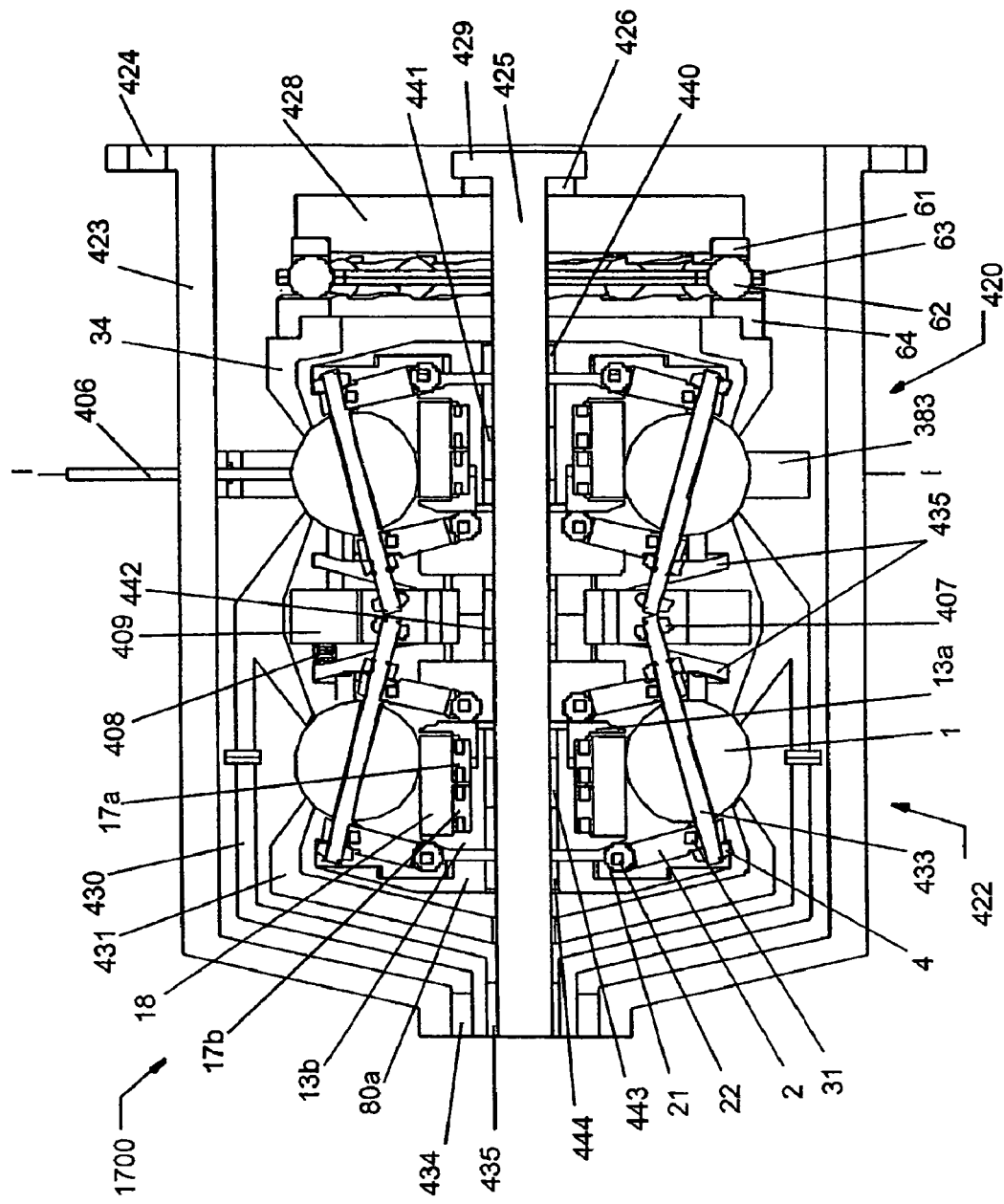
FIG. 17 is a schematic cutaway side view of an alternative embodiment of the transmission of FIG. 1 with two variators.

Referring now to FIGS. 16 and 17, an alternative embodiment of the transmission 100 of FIG. 1 is disclosed. For the purposes of simplicity, only those differences between the transmission 1700 of FIG. 17 and the transmission 100 of FIG. 1 will be explained. The transmission 100 of FIG. 1 includes one variator, The term variator can be used to describe the components of the transmission 100 that vary the input to output speed ratio. The assemblies and components comprising the variator 401 of the present embodiment include the ball/leg assembly 403 of FIG. 5, the input disc 34, the output disc 101, the idler assembly 402 of FIG. 4, and the cage 89 of FIG. 7. It should be noted that all components and assemblies of the variator 401 can change to best fit the specific application of the transmission 1700, and in FIG. 16 generic forms of the assemblies and components comprising the variator 401 are depicted.

The embodiment of the transmission 1700 illustrated in FIG. 17 is similar to the transmission 100 of but includes two variators 401. This configuration is beneficial for applications where high torque capacity is required in a transmission 1700 with a small diameter or overall size. This configuration also eliminates radial bearings needed to support the bearing disc 114 and the output disc 101, thereby increasing overall efficiency. Due to the fact that the transmission 1700 has two variators 401, each variator 401 has an output side and the transmission 1700 also has an output side. Thus there are three output sides and in this configuration the convention or marking like components with an "a" and a "b" to differentiate between the input and output sides is not used. However, as illustrated in FIG. 17, the input side is to the right and the input is to the left.

Figure 18:
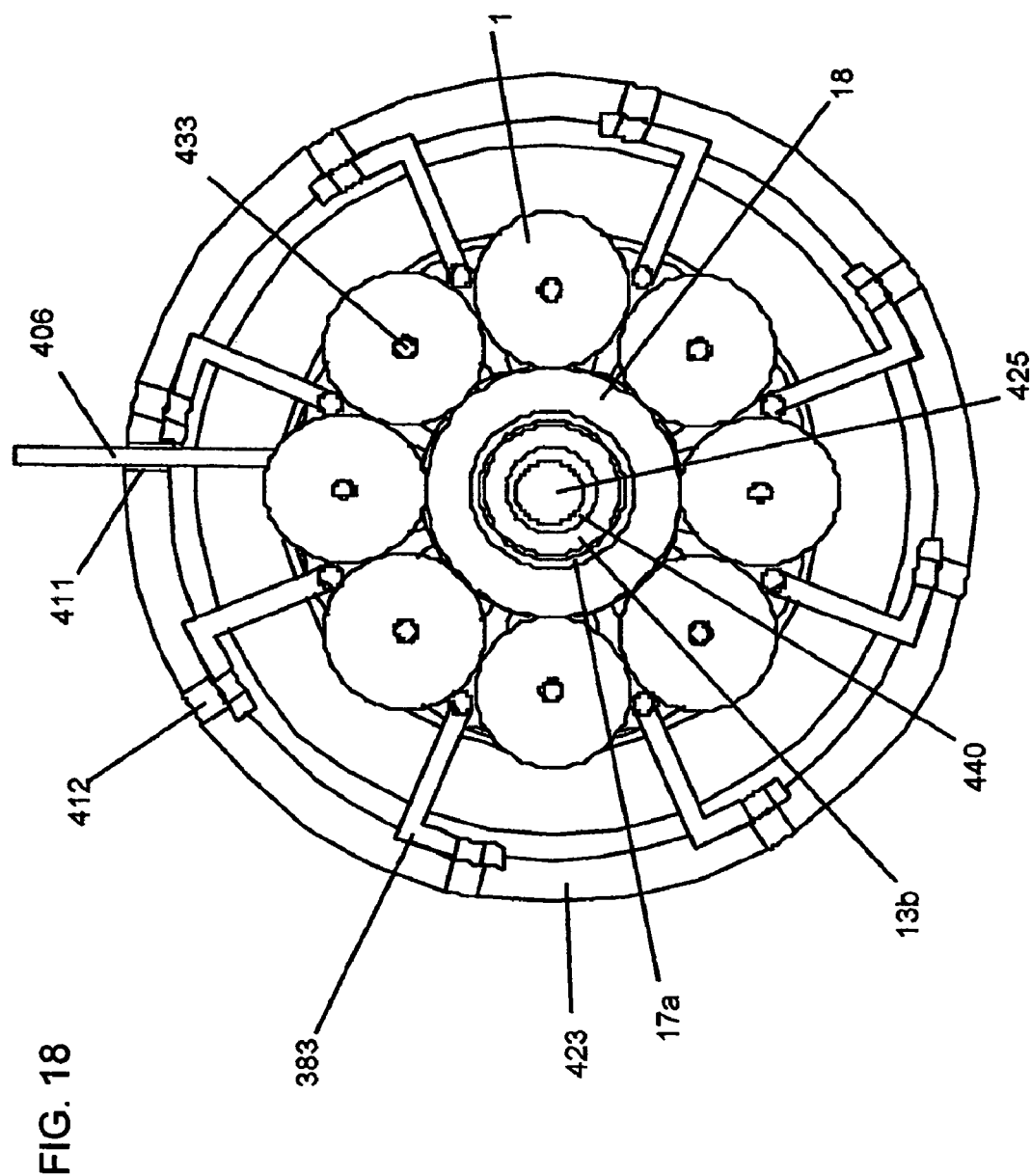
FIG. 18 is a partial end cross-sectional view of the transmission taken on line I—I of FIG. 17.
Figure 19:
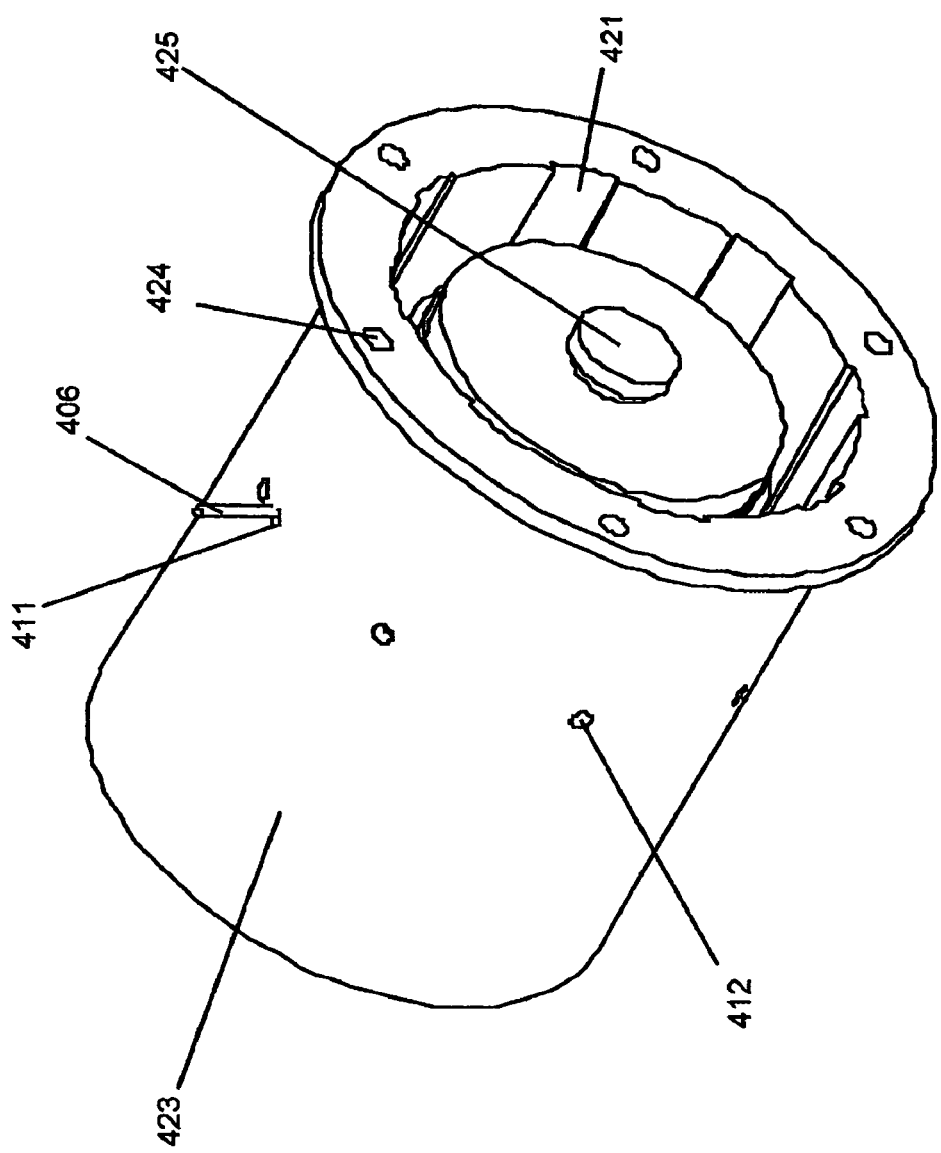
FIG. 19 is a perspective view of the transmission of FIG. 17.

Referring to FIGS. 17–19, a case 423 is illustrated that surrounds and encapsulates the transmission 1700. The case 423 is generally cylindrical and protects the transmission 1700 from outside elements and contamination and additionally contains lubrication for proper operation. The case 423 is attached to an engine, frame, or other rigid body (not shown) with standard fasteners (not shown), which fit through case holes 424. The case 423 is open on the input side, the side with the case holes 424 or to the right as illustrated, to accept an input torque. Input torque is transmitted from an outside source to an input shaft 425, which is a long, rigid, rod or shaft capable of transmitting torque.

The input shaft 425 transmits torque to a bearing disc 428 via splines, keying, or other such manner. The bearing disc 428 is a disc-shaped rigid component capable of absorbing significant axial forces produced by the transmission 1700 and is similar in design to the bearing disc 60 illustrated in FIG. 1. An input shaft bearing 426 is positioned coaxially over the input shaft 425 between a flange 429 on the input end of the input shaft 425 and the bearing disc 428 to allow a small amount of relative movement between the bearing disc 428 and the input shaft 425. When the bearing disc 429 begins rotating, the perimeter ramps 61, ramp bearings 62, bearing cage 63, input disc ramps 64, and input disc 34 rotate as previously described. This rotates the balls 1 in the first variator 420, is the one on the input side.

Simultaneously, as the input shaft 425 rotates a second input disc 431 is rotated. The second input disc 431 is rigidly attached to the input shaft 425, and can be keyed with a backing nut, pressed over the input shaft 425, welded, pinned, or attached by other methods. The second input disc 431 is located on the output side of the transmission 1700, opposite the bearing disc 428. The second input disc 431 and the bearing disc 428 absorb the considerable axial forces created by the perimeter ramps 61, ramp bearings 62, and input disc ramps 64 that act as normal forces to prevent slippage at the ball/disc contact patches as previously described. The second input disc 431 is similar in shape to the input disc 34 previously described and upon rotation of the input shaft 425; it rotates the balls 1 in the second variator 422. The second variator 422 is generally a mirror image of the first variator 420 and is positioned farther from the input side of the transmission 1700 so that the first variator 420 is situated between it and the input side.

As previously described, the balls 1 in the first variator 420 rotate the output disc 430 through their rolling contact with that component. The output disc 430, although serving the same function as the output disc 101 previously described, has two opposing contact surfaces and contacts balls 1 on both variators 420, 422. From the cross sectional view illustrated in FIG. 17, the output disc 430 can be shaped in a shallow arch or upside down shallow "V," the ends of which have a contact surface to contact the balls 1 of the two variators 420, 422. The output disc 430 surrounds the second variator 422 and extends toward the output side in a generally cylindrical shape. In the illustrated embodiment, the cylindrical shape of the output disc 430 continues toward the output side of the transmission 1700 surrounding the second input disc 431 after which the diameter of the output disc 430 decreases and then again becomes a generally cylindrical shape of a smaller diameter as it exits the case 423. To hold the output disc 430 concentric and align it with the first and second input discs 34, 431, annular bearings 434, 435, may be used to radially align the output disc 431. A case bearing 434 is positioned in the bore of the case 423 and over the output disc 430 and an output disc bearing 435 is positioned in the bore of the output disc 430 and over the input shaft 425 to provide additional support. The output disc 430 can be made of two pieces that are connected together to form the illustrated output disc 430. This allows for assembly of the second variator 422 inside the cylindrical shell of the output disc 430.

Figure 20:
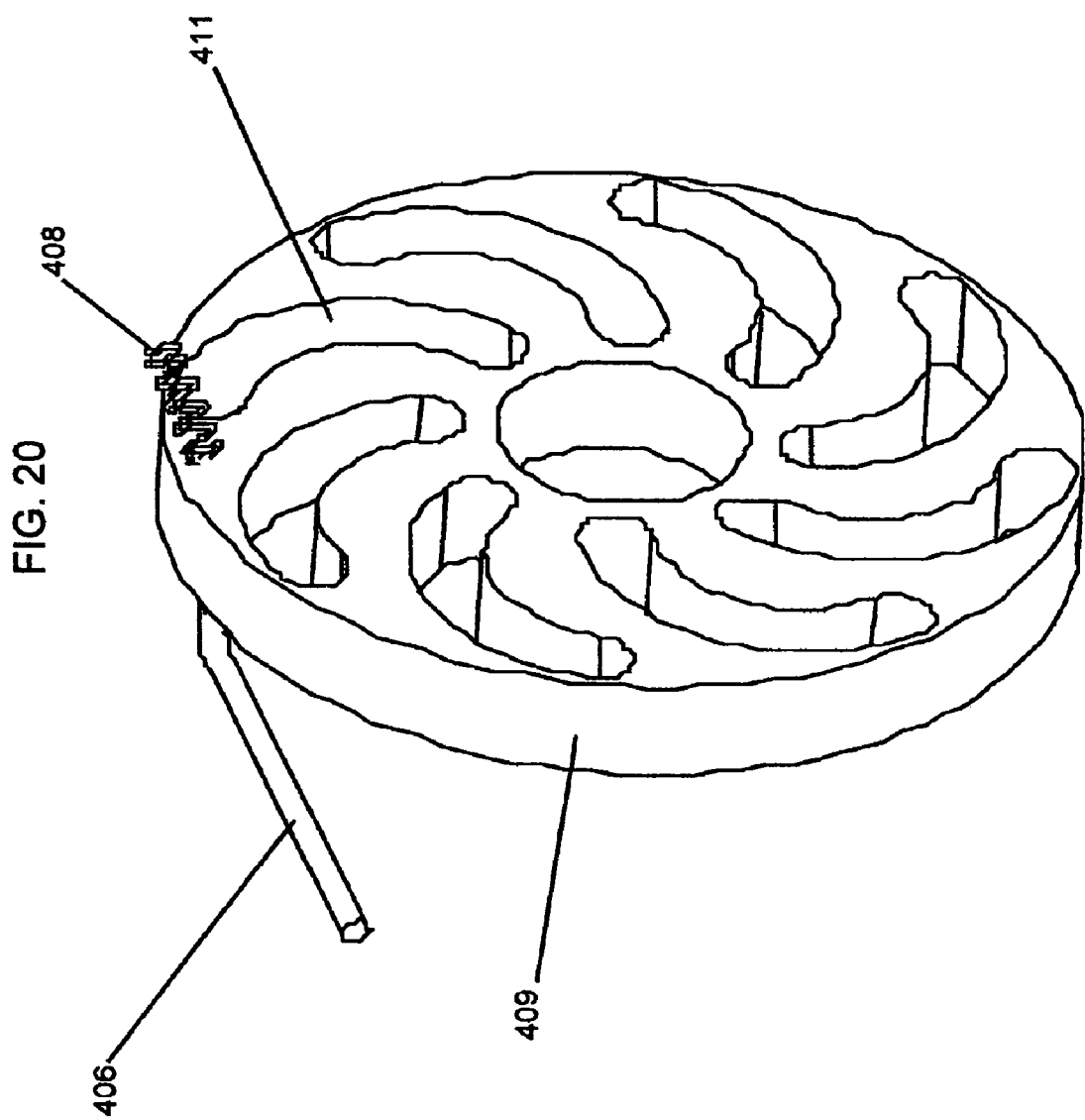
FIG. 20 is a perspective view of the iris plate of the transmission of FIG. 17.
Figure 21:
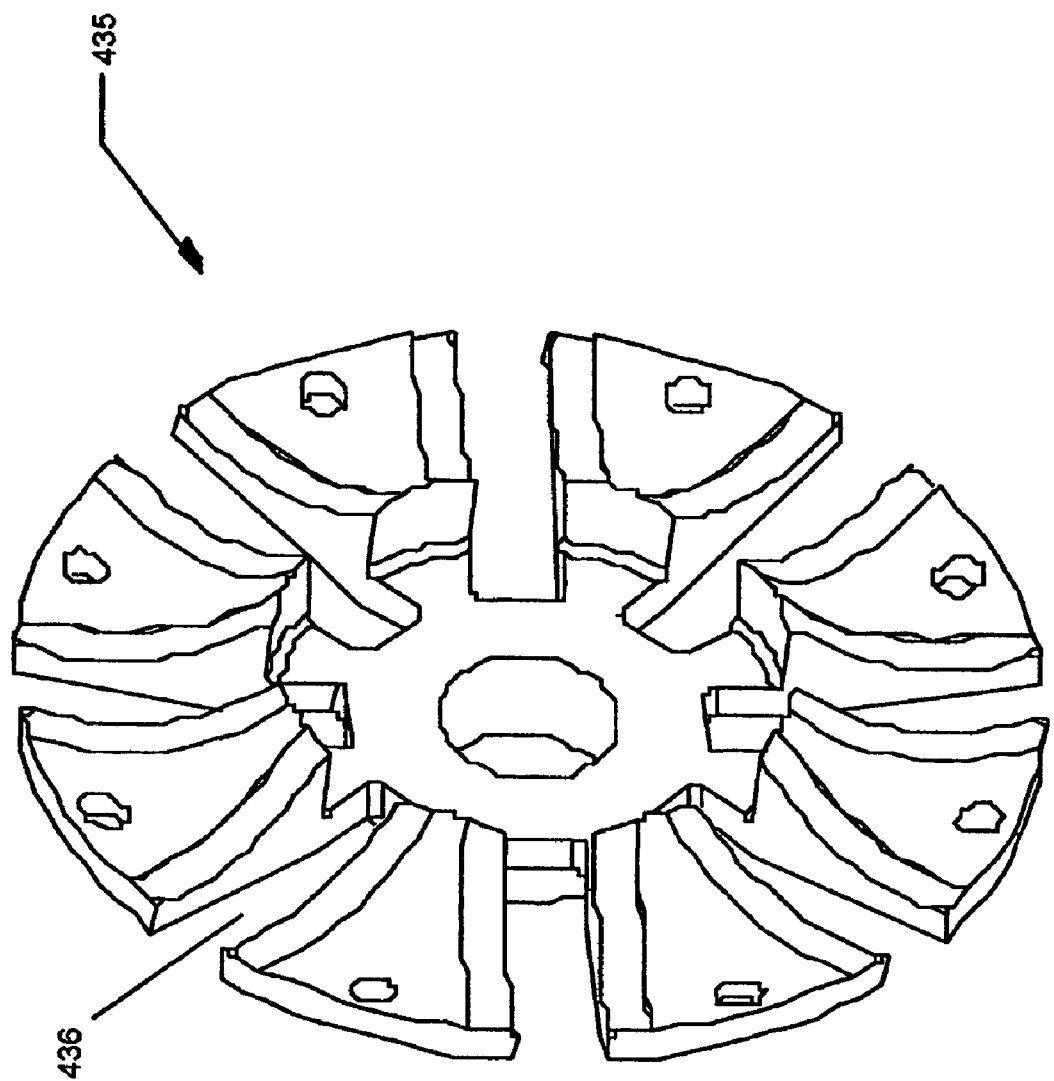
FIG. 21 is a perspective view of a stator of the transmission of FIG. 17.

As illustrated in FIG. 17, this can be accomplished by use of two annular flanges along the large diameter of the output disc 430. In some embodiments, the annular flanges are located generally midway along the large diameter of the output disc 430. Referring now to FIGS. 17, 20, and 21, the ball axles 433 of the transmission 1700 are similar to the ball axles 3 previously described and perform the same function.

In addition, the ball axles 433 serve as the mechanism by which the balls 1 are tilted to vary the speed ratio of the transmission 1700. The ball axles 433 are elongated on each of their respective output sides and extend through the walls of the output stators 435. The output stators 435 are similar to the output stators 80b previously described, but the multiple radial grooves 436 penetrate all the way through the walls of the output stators 435. The grooves 436 of the output stators 435 continue all the way through the output stator 435 walls so that a series of equally spaced radial grooves 436 extend radially from near the bore at the center of the output stator 435 to the perimeter. The ball axles 433 have iris rollers 407 positioned coaxially over their elongated output ends. The iris rollers 407 are generally cylindrical wheels that are capable of rotating over the ball axles 433 and are designed to fit inside the grooves 411 of an iris plate 409. The iris plate 409 is an annular disc or plate with a bore through its center that fits coaxially about the longitudinal axis 11 of the transmission 1700. The iris plate 409 is of a thickness that is greater than twice the thickness of each iris roller 407 and has a number of iris grooves 411 extending radially outward from near the bore to near the perimeter of the iris plate 409. As the iris grooves 411 extend radially, their angular position changes as well, so that as the iris plate 409 is rotated angularly about the longitudinal axis 11, the iris grooves 411 provide a camming function along their respective lengths. In other words, the grooves 411 spiral out from near the bore in the center of the iris plate 409 to respective points near its perimeter.

The iris rollers 407 are radiused along their outside diameters, or have fillets on their outer corners, so that their diameters remain unchanged inside the grooves 411 of the iris plate 409 when the ball axles 433 are tilted. The iris plate 409 is of a thickness sufficient to allow iris rollers 407 from both variators 420, 422, to remain inside the grooves 411 of the iris plate 433 at all shifting ratios. The iris grooves 411 operate in traditional iris plate fashion and cause the ball axles 433 to move radially inward or outward when the iris plate 409 is rotated. The iris plate 409 has a first side facing the first variator and a second side facing the second variator and is coaxially positioned about the longitudinal axis 11 of the transmission 1700 and over abutting bosses on, tubular extensions extending from, the two output stators 435. The two output stators 435 can be attached to each other with conventional fasteners through axial holes (not illustrated) in the bosses of the output stators 435. The output stator 435 bosses have a hole through their centers and multiple holes positioned radially outward from the center. In some embodiments, the bosses on the output stators 435 form a space slightly wider than the iris plate 409 to provide freedom of rotation for the iris plate 433 and some embodiments utilize bearings between the bosses and the iris plate 409 to accurately control the position of the iris plate 409 between the output stators 435. An iris cable 406 is attached to the first side of the iris plate 409 near the outside diameter of the iris plate 409 and extends longitudinally from the point of connection. The iris cable 406 is routed through the output stator 435 of the first variator 420 in an orientation so that when it is pulled, it rotates the iris plate 409. The iris cable 406, after passing through an aperture near the perimeter of the output stator 435 is routed through the case 423 to the outside of the transmission 1700 where it allows for control of the transmission ratio. An iris spring 408 is attached to the second side of the iris plate 409 near its outside diameter. The iris spring 408 is also attached to the output stator 435 of the second variator 422. The iris spring 408 applies a resilient force that resists rotation of the iris plate 409 from tension applied by the iris cable 406. When tension from the iris cable 406 is released, the iris spring 408 returns the iris plate 409 to its at rest position. Depending upon the application of the transmission 1700, the iris plate 409 can be configured so that when the iris cable 406 is pulled the iris plate 409 shifts the transmission 1700 to a higher transmission ratio, and when tension on the iris cable 406 is released the iris spring 408 shifts the transmission 1700 to a low ratio. Alternatively, the iris plate 409 can be configured so that when the iris cable 406 is pulled the iris plate 409 shifts the transmission 1700 to a lower ratio, and when tension on the iris cable 406 is released the iris spring 408 shifts the transmission 1700 to a high ratio.

Referring to FIGS. 16 and 17, embodiments of the transmission 1700 having two variators 420, 422 require a high degree of accuracy in the alignment of the additional rolling elements of the transmission 1700. All of the rolling elements must be aligned with one another or efficiency will suffer and the lifespan of the transmission 1700 will be reduced. During assembly, the input disc 34, the output disc 430, the second input disc 431, and the idler assemblies 402 are aligned on the same longitudinal axis. Additionally, the cage 410, which in these embodiments consist of two cages 89 joined by the output stators 435 as previously described, must also be aligned on the longitudinal axis to accurately position the ball/leg assemblies 403. To accomplish this simply and accurately, all rolling elements are positioned relative to the input shaft 425. A first input stator bearing 440 and a second input stator bearing 444 are positioned in the bores of the input stators 440, 444 and over the input shaft 425 to help align the cage 410. An output stator bearing 442 positioned in the bore of the output stators 435 and over the input shaft 425 also aligns the cage 410. A first guide bearing 441 is positioned in the bore of the first shift guide 13b and over the input shaft 425 and a second guide bearing 443 is positioned in the bore of the second shift guide 13b and over the input shaft 425 to align the first and second idler assemblies 402.

Referring to FIGS. 18 and 19, the cage 410 is attached to the case 423 with the previously described case connectors 383 that fit into case slots 421. The case slots 421 are longitudinal grooves in the case 423 that extend to the input side of the case 423, the side of the case 423 that is open. In the illustrated embodiment, the case is mostly closed on the output side, which is not shown in FIG. 19, but is open on the input side and has a mounting flange extending radially from the other wise cylindrical body of the case 423 that case holes 424 for mounting the case 423. During assembly, the transmission 1700 can be inserted into the case 423 where the case connecters 383 are aligned in the case slots 421 in order to resist torque applied to the cage 410 and prevent the cage 410 from rotating. Case connector holes 412 in the case 423 allow fasteners to be inserted into corresponding holes in the case connectors 383 to fasten the cage 410 to the case 423.

Figure 22:
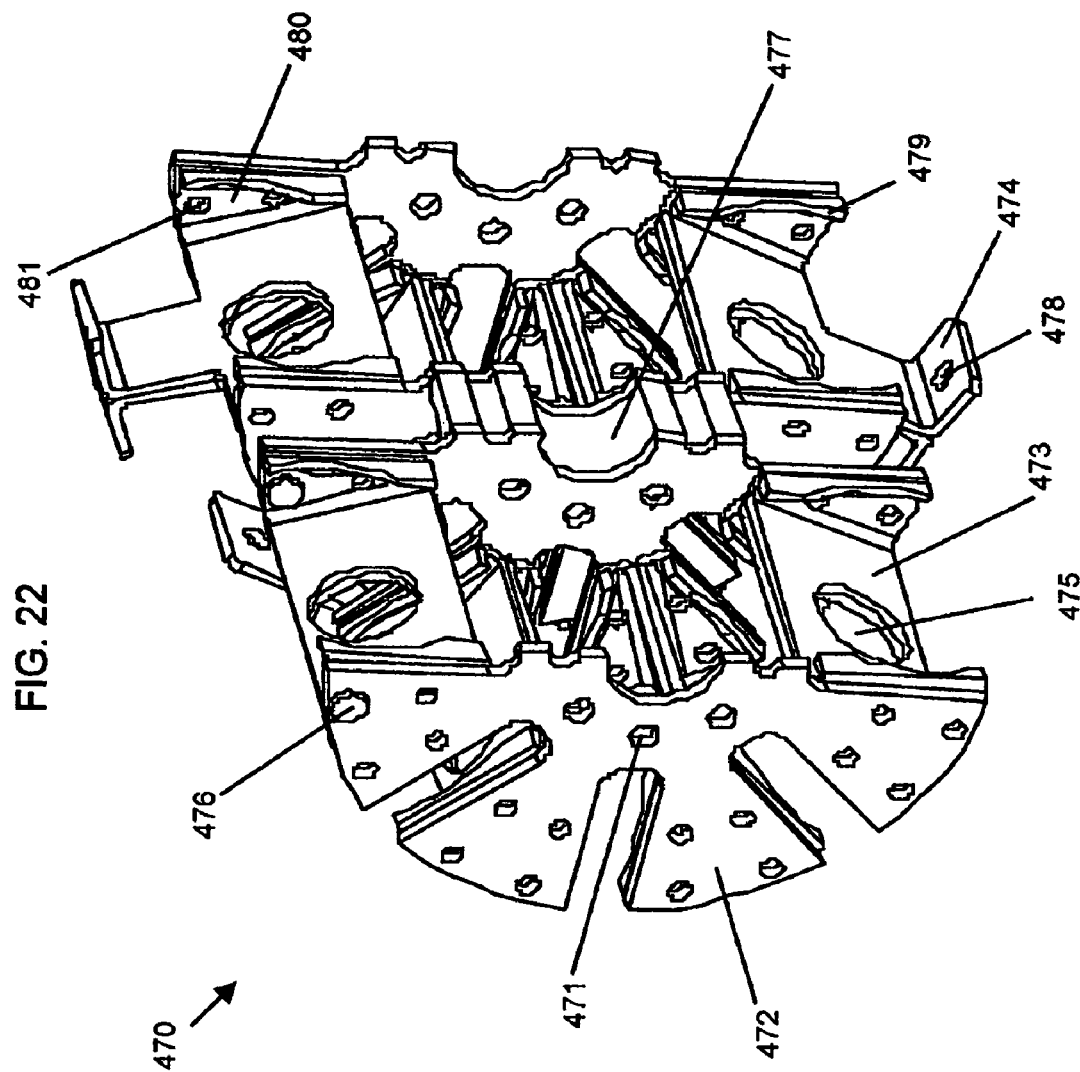
FIG. 22 is a cutaway side view of an alternate cage of the transmission of FIG. 17.

FIG. 22 illustrates an alternate embodiment of the cage 470 of the transmission 1700. To reduce manufacturing costs, it is sometimes preferable to minimize the number of different parts that are manufactured and to design parts that can be inexpensively produced using mass production techniques. The illustrated cage 470 uses four different parts of low cost design and common fasteners to assemble the various components. The stators 472 are generally flat disc shaped pieces with multiple radial grooves extending radially outward from near a central bore through which the input shaft 425 rotates. The ball axles (item 433 of FIG. 17) extend through the grooves on the stators 472. Multiple holes 471 surrounding the central bore of the stators 472 provide for fastening the stators 472 to other components. There are four stators 472, which in this embodiment are all similar to one another, forming part of the cage 470. Two input stators 472 are at each end of the cage 470 and two output stators 472 are near the center of the cage 472, which are rigidly attached to each other with a stator bridge 477.

Still referring to the embodiment illustrated in FIG. 22, the stator bridge 477 is a disc shaped part with a central bore and through holes positioned between the inside diameter and the outside diameter of the stator bridge 477. The holes in the stator bridge 477 are complimentary to the holes on the stators 472 to allow fastening of the stators 472 to the stator bridge 477. The iris plate 409 (not shown) is located radially outside of the stator bridge 477 and axially between the output stators 472. In some embodiments, the stator bridge 477 is slightly thicker than the iris plate 409 to allow freedom of rotation of the iris plate 409, while in yet other embodiments, bearings are located between the output stators 472 and the iris plate 409, as well as between the stator bridge 477 and the iris plate 409. The outside diameter of the stator bridge 477, therefore serves to locate the inside diameter and set the axis of the iris plate 409.

Spacers 473 join the input stators 472 to the output stators 472. In one embodiment, the spacers 473 are made from a flat material, such as sheet or plate metal, and are then formed to produce their unique shape, which serves several purposes. The spacers 473, in general, are flat rectangular sheets with holes 475 formed in their centers and having perpendicular extensions on each end. The spacers 473 set the correct distance between the stators 472, form the structural frame of the cage 470 to prevent the balls 1 from orbiting the longitudinal axis of the transmission 1700, align the stator holes with respect to one another so that the centers of the stators 472 are in alignment and the angular orientation of the stators 472 is the same, prevent the cage 470 from twisting or cocking, and provide rolling concave surfaces 479 on which the stator wheels 30 roll. Each spacer 473 is formed with its two ends bent out of plane with the rest of the spacer to form the mounting areas 480 and curved surfaces 479 of the cage 470. The spacers 473 have mounting holes 481 on the sides where they contact the stators 472 which line up with corresponding holes on the stators 472 to allow fastening of the spacers 473 to the stators 472. The hole 475 near the center of the spacer 473 provides clearance for the ball 1.

In one embodiment, there are two spacers 473 for each ball 1 although more or fewer spacers 473 can be used. Each spacer 473 is paired back to back with another in a mirror image to form an I-beam shape. In one embodiment, rivets 476 may be used to connect the spacers 473 to the stators 472 and to connect the stators 472 to the stator bridge 477. The rivets 476 are tightly pressed into the holes of the stators 472, the spacers 473 and the stator bridge 477 during assembly. Only two rivets 476 are illustrated in FIG. 22, but all can use the same design. The spacers 473 used in the first variator 420 also have case connectors 474, which generally extend radially outward from the spacers 473 and then bend generally perpendicularly. The case connectors 474, of some embodiments are made from a flat material such as sheet metal, which is stamped and then formed into the final shape. The case connectors 474 can be made integral with or rigidly attached to the spacers 473 and extend radially to the case 423 between the input disc 34 and the output disc 430. In some embodiments, the case connectors 474 are formed as part of the spacers 473 during the manufacturing process of the spacers 473. Case connector holes 478 in the perpendicular ends of the case connectors 474 line up with corresponding case connector holes (item 412 of FIG. 19) so the cage 470 can be anchored to the case 423 with standard fasteners.

The design illustrated in FIG. 22 incorporates stator discs 472 that are substantially flat and that can be manufactured utilizing a substantially flat sheet of rigid material. Additionally, the spacers 473 with and without the case connectors 474 are also substantially flat and can be formed from flat sheets of material, although in many embodiments the perpendicular ends of the case connectors 474, the mounting areas 480 and the curved surfaces 480 are formed in subsequent bending steps. The stator discs 472 and spacers can be produced from any of a number of inexpensive manufacturing techniques such as stamping, fine blanking, or any other such technique known in the industry. The stator discs 472 and spacers 473 of this design can be made from thin or sheet metal, plastic, ceramic, wood or paper products or any other material. As described above with respect to FIG. 12, the illustrated design allows for significant reduction in the cost of materials and manufacturing of these otherwise relatively expensive components to a suitably high tolerance. Additionally, although the embodiment illustrated in FIG. 22 represents a dual-cavity design for a transmission, the components manufactured through these inexpensive manufacturing processes can be used for a single cavity design of the cage 470 as well. As an example, two illustrated stators discs 472 can be attached to the spacers 473 having the case connectors 474 to the right of FIG. 22 to produce a single cavity design for use with the embodiments described herein.

Figure 23:
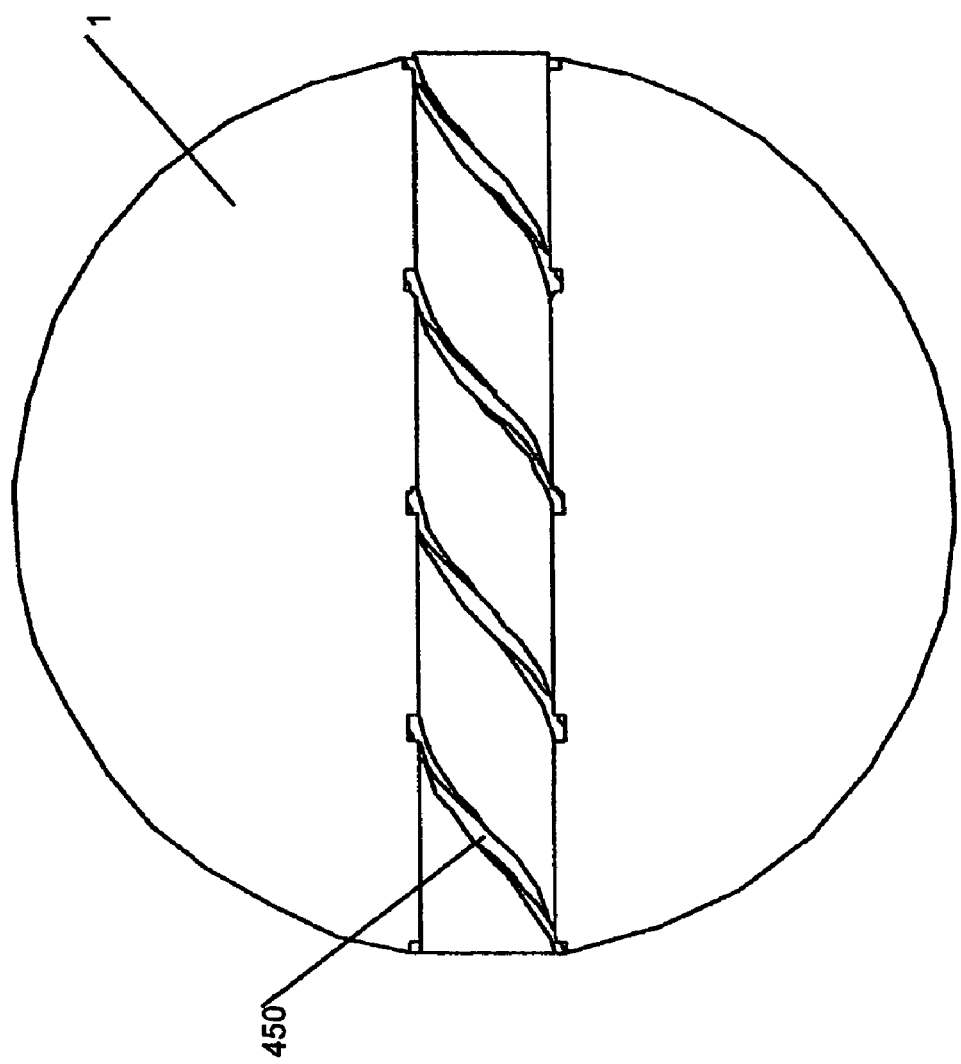
FIG. 23 is a cutaway side view of a ball with grooves of the ball/leg assembly of FIG. 5.

FIG. 23 illustrates an embodiment of a ball 1 for use with the transmissions 100, 1700 of FIG. 1 and FIG. 17. This ball 1 has helical grooves 450 that pump lubricant through the ball 1. In one embodiment, two helical grooves 450 are used that begin at one end of the hole in the ball 1 and continue through to the other end of the hole. The helical grooves 450 transport lubricant through the ball 1 to remove heat and provide lubrication between the ball 1 and the ball axles 3, 433 in order to improve efficiency and to improve the lifespan of the transmission 100, 1700.

Figure 24:
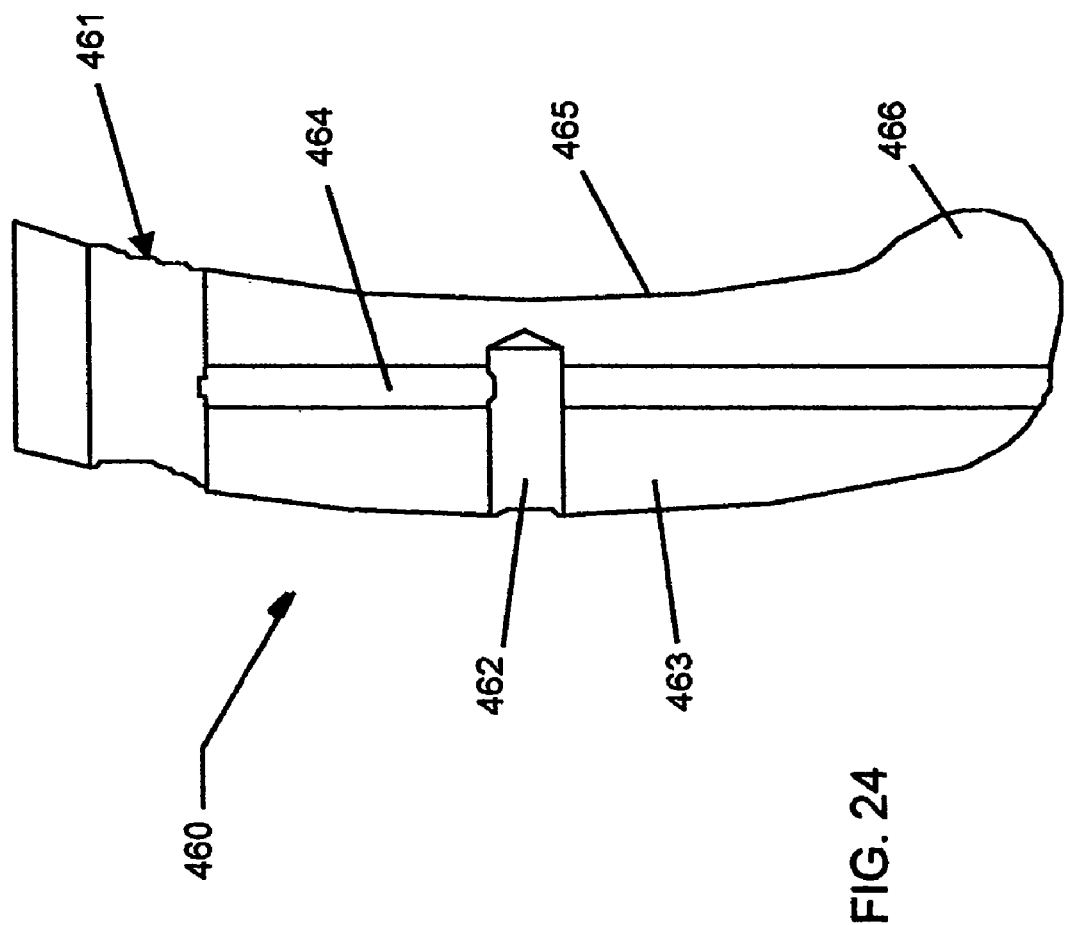
FIG. 24 is a cutaway side view of an alternate leg of the ball/leg assembly of FIG. 5.

FIG. 24 illustrates an alternate leg 460 of the ball/leg assembly 403 of FIG. 5. The leg 460 is simplified, as compared to the leg 2 illustrated in FIG. 5, and does not have stator wheels 30, a stator wheel pin 31, a guide wheel 21, or a guide wheel pin 22. The leg 460 has a convex surface on a first leg side 463 that faces away from the ball 1, which fits into a corresponding concave groove (not shown) on a respective stator 80. On a second leg side 465 that faces the ball 1, the leg 460 is concaved and has a convex curve near its radially inward end that forms a leg cam 466, which contacts and is positioned axially and radially by the surfaces of the shift guides 13. Transverse and longitudinal lubrication ports 462, 464, respectively, allow for lubrication to be fed into the leg and transported to different areas. Lubrication is used to cool the leg and other parts of the transmission 100, 1700 and also to minimize friction where the leg contacts the shift guide 13 and the stator 80. It should be noted that additional ports can be drilled or formed in the leg 460 to direct lubrication to other areas and that any of the port openings may be used as an inlet for the lubrication. The longitudinal port 464 is an aperture running through the length of the leg 460, generally in the center and extending through the bottom and also through the ball axle bore 461 at the top of each leg 460. The transverse port 462 is a blind hole formed approximately perpendicular to the longitudinal port 464 and extends out and beyond the first leg side 463.

In some embodiments, as illustrated, the transverse port 462 intersects with longitudinal port 464 and terminates and does not penetrate the second leg side 465. In some embodiments where the transverse port 462 intersects with the longitudinal port 464, lubricant can enter at the opening of the transverse port 462 and then be transported through port 464.

In some embodiments, the ball axles 3, 433 are press fit in the ball 1 and rotate with the ball 1. The ball axles 3, 433 rotate inside the ball axle bores 461 and in the rollers 4. Lubricant flows through the top of the leg 460 into the ball axle bore 461 where it provides a fluid layer to reduce friction.

Figure 26:
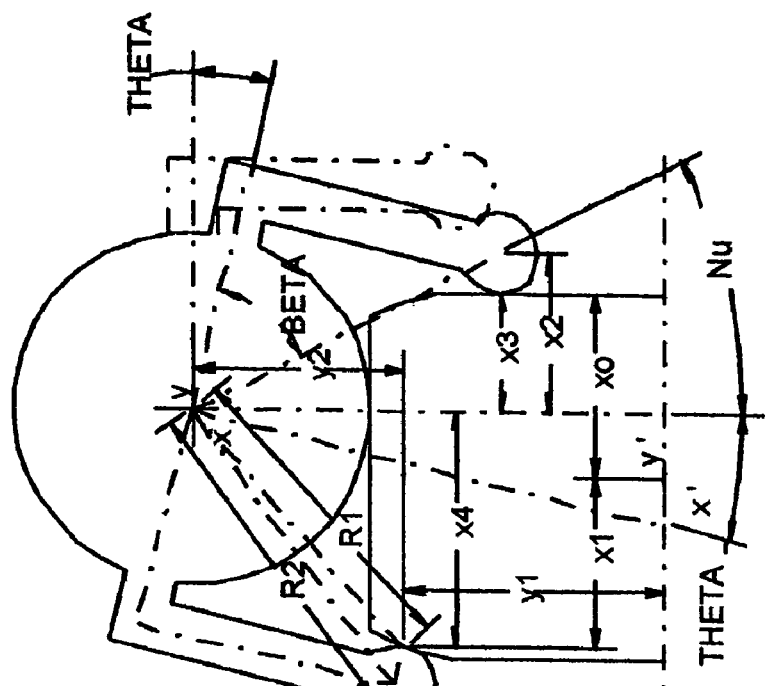
FIG. 26 is a schematic illustration of the ball and leg assembly in a tilted orientation showing applicable geometric relations used to create the convex curves for the shift guides of the transmissions of FIGS. 1 and 17.
Figure 25:
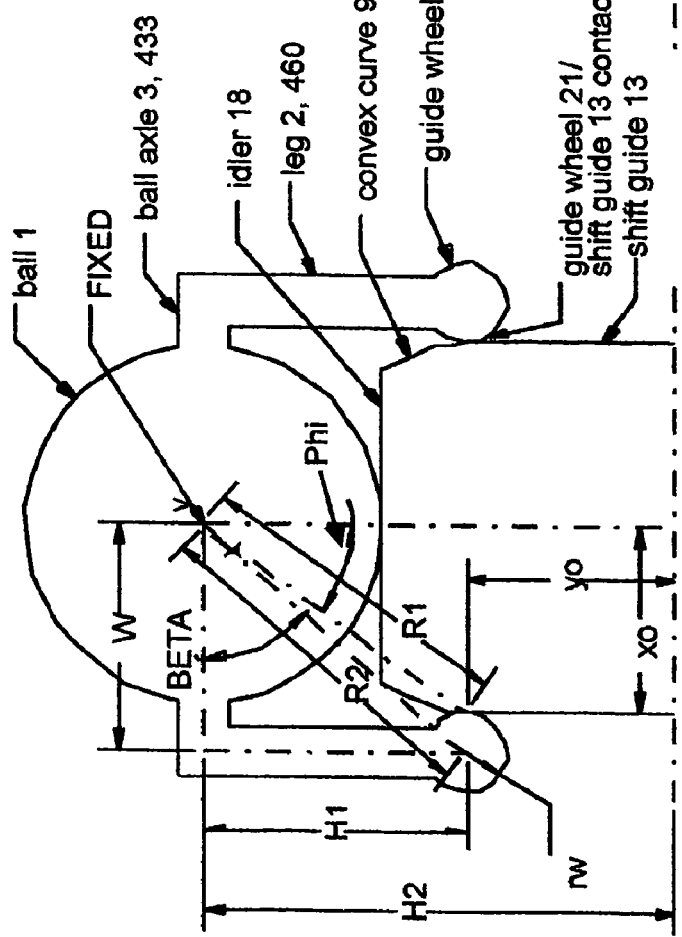
FIG. 25 is a schematic illustration of the ball and leg assembly showing applicable geometric relations used to create a convex curves for the shift guides of the transmissions of FIGS. 1 and 17.
Figure 27:
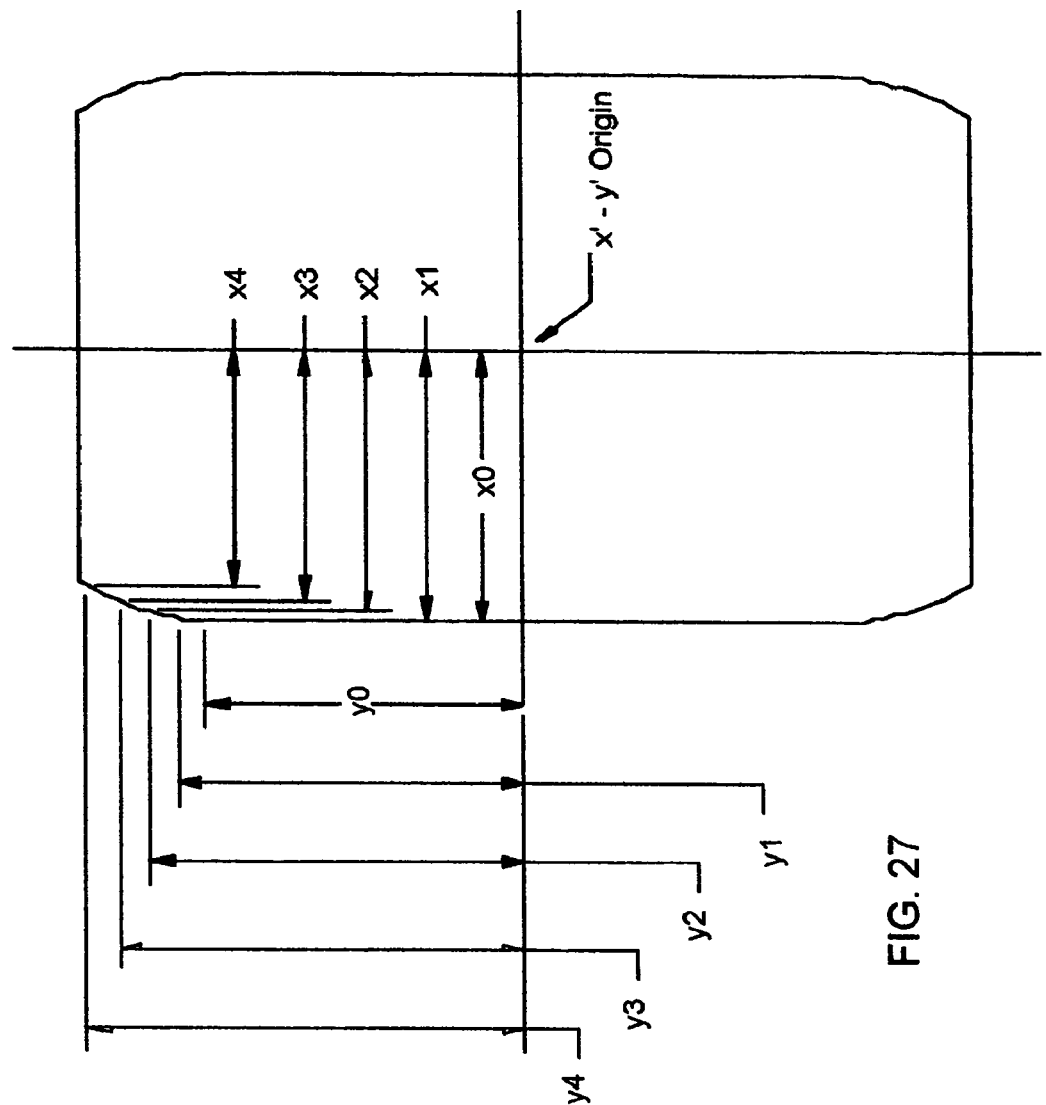
FIG. 27 is a schematic illustration of the convex curves illustrating certain geometric relations utilized to create a convex curve for the shift guides of the transmissions of FIGS. 1 and 17.

Referring to FIGS. 25–27, a graphical method for approximating the convex curve 97 on a shift guide 13 is disclosed. For the purpose of simplicity, the idler 18, the idler bearings 17, and the shift guides 13 are combined to simplify the analysis and illustration of the correct convex curves 97 of one embodiment of the shift guides 13. For the purpose of this analysis and description, the following assumptions are made:

1. The center of the ball 1 is fixed such that the ball 1 can rotate about its axis and such that its axis can rotate, but the ball 1 can have no displacement.
2. The ball 1, ball axle 3, 433, legs 2, and guide wheels 21 rotate as a rigid body.
3. The idler 18 can only move in the x direction.
4. The perimeter surface of the idler 18 is tangent to the circumference of the ball 1.
5. The sides of the shift guides 13 are tangent to the circumference of the guide wheels 21.
6. Angular rotation of the ball 1 causes linear movement of the shift guide 13, and vice-versa.
7. When the ball axle 3, 433 is horizontal or parallel to the longitudinal axis 11, the point of contact of each guide wheel 21 and its respective shift guide 13 is at the start of the convex curve 97 where the vertical wall on the shift guide 13 transitions to the convex curve 97. When the ball 1 is tilted, only one guide wheel 21 contacts the convex curve 97; the other guide wheel 21 contacting the vertical wall of its shift guide 13.

The goal of this analysis is to find the approximate coordinates of the point where the guide wheel 21 contacts the convex curve 97 on the shift guide 13 as a function of the angle of tilt of the axle of the ball 1. If these coordinates are plotted for various ball axle 3, 433 angles, a curve can be fit through the coordinate points that follow the path of the guide wheel 21/shift guide 13 contact points throughout the shifting range.

The coordinates begin at the original position of the guide wheel 21/shift guide 13 contact (xo, yo) when the angle of rotation is zero, and then at each incremental angular change during the tilting of the ball 1. By comparing these coordinates, the position of the guide wheel 21/shift guide 13 contact (xn, yn) as a function of the angle of ball 1 tilt (theta) can be determined.

From FIGS. 25 and 26, the known variables are:

1. H1: the vertical distance from the center of the ball 1 to the center of the guide wheels 21.
2. H2: the sum of the ball 1 radius and the idler 18 radius.
3. W: the horizontal distance from the center of the ball 1 to the center of the guide wheels 21.
4. rw: the guide wheel 21 radius.

From these known variables, the following relations can be identified:

$$R1 = [(W-rw)^2 + H1^2]^{(1/2)} \quad (1)$$

$$Phi = TAN^{-1}[(W-rw)/H1] \quad (2)$$

$$xo = W-rw \quad (3)$$

$$yo = H1-H2 \quad (4)$$

$$BETA = TAN^{-1}(H1/W) \quad (5)$$

$$R2 = [H1^2 + W^2]^{(1/2)} \quad (6)$$

At this point, assume the ball 1 is tilted by angle, THETA, which causes the shift guide 13 to move in the x direction (see FIG. 26). From this, the following can be found:

$$Nu = 90° - BETA - THETA \quad (7)$$

$$x2 = R2 * SIN(Nu) \quad (8)$$

$$x3 = x2 - rw \quad (9)$$

$$x\_shift\ guide = xo - x3 \quad (10)$$

This is the x distance the shift guide 13 moves for a given THETA.

$$x4 = R1 * SIN(Phi + THETA) \quad (11)$$

$$x\_guide\ wheel = x4 - xo \quad (12)$$

This is the x distance the guide wheel 21 moves for a given THETA.

At this point, it is convenient to define an x'-y' origin at the center of the idler 18. This useful for plotting the guide wheel 21/shift guide 13 contact coordinates.

$$x1 = xo - (x\_guide\ shift - x\_guide\ wheel) \quad (13)$$

By combining Equations (10), (12), and (13), $$x1 = x4 + x3 - xo \quad (14)$$

This is the x' position of the guide wheel 21/shift guide 13 contact.

Finding the y' position of the guide wheel 21/shift guide 13 contact is relatively simple, $$y2 = R1 * COS(Phi + THETA) \quad (15)$$

$$y1 = H2 - y2 \quad (16)$$

This is the y' position of the guide wheel 21/shift guide 13 contact.

Therefore, x1 and y1 can be determined and then plotted for various values of THETA. This is shown graphically in FIG. 27. With the coordinates in place, it is a simple matter for most CAD programs to fit a curve through them. Methods of curve fitting can include any suitable algorithm, such as for example linear regression, to determine the appropriate curve for such a relationship; although a direct function derived from the relationships described above can be developed as well.

Figure 28:
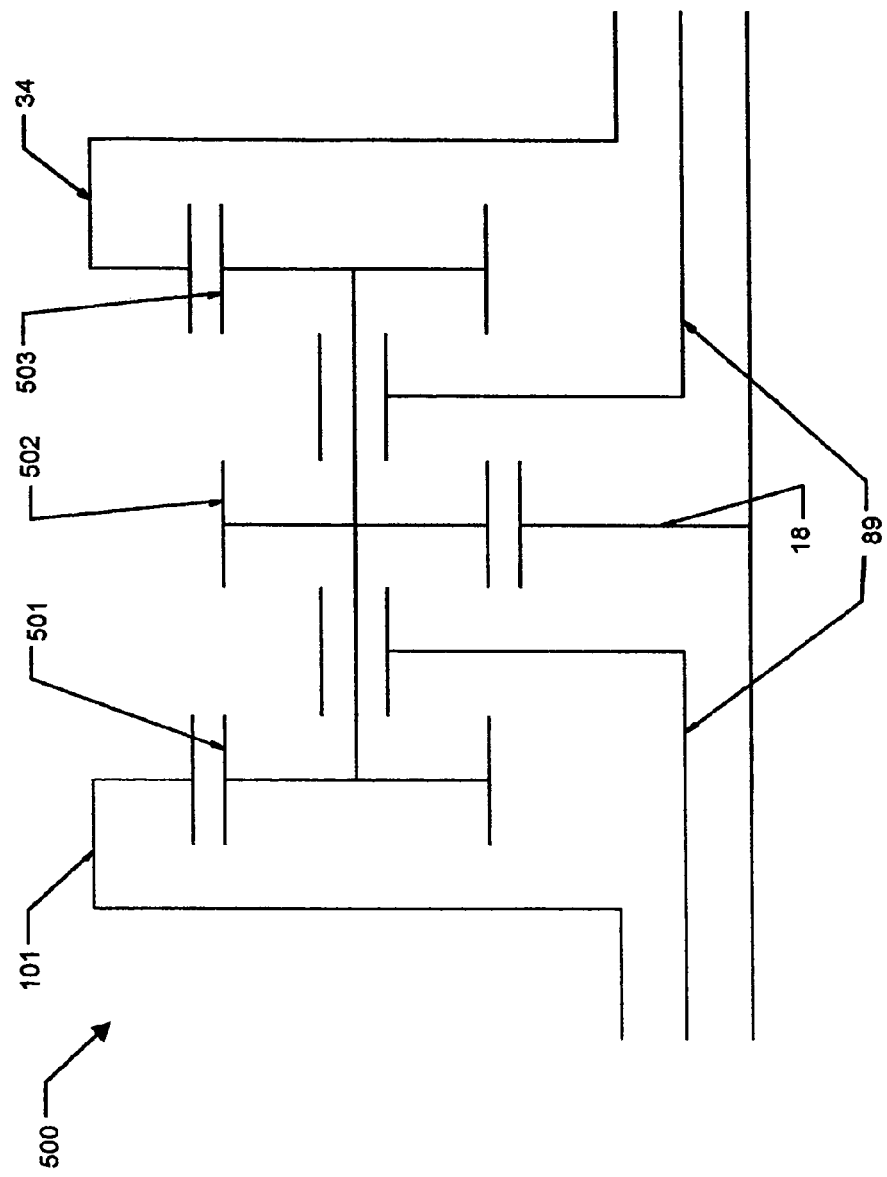
FIG. 28 is a schematic view of the transmission of FIG. 1 showing its function as a planetary gearset.

Referring now to FIGS. 1, 7, and 28, the transmission 100 can be used as a continuously variable planetary gearset 500. With reference to FIGS. 1 and 7, in such embodiments where the cage 89 is free to rotate about the longitudinal axis 11, the idler 18 functions as a sun gear, the balls 1 act as planet gears, the cage 89 holds the balls 1 and functions as a planet carrier, the input disc 34 is a first ring gear, and the output disc 101 is a second ring gear. Each ball 1 contacts the input disc 34, the output disc 101, and the idler 18 and is carried or held in radial position by the cage 89.

FIG. 28 is a skeleton drawing, or a schematic view, of a planetary gearset 500 where, for simplicity, only the top half of the planetary gearset 500 is shown. The drawing is cut off at the centerline of the planetary gearset 500, or on the longitudinal axis 11 of the transmission 100. The line of contact formed around each of the balls 1 by the output disc 101 forms a variable rolling diameter that allows that portion of each of the balls 1 to function as a first planet gear 501. The contact between the balls 1 and idler 18 create a variable rolling diameter, which allows that portion of each of the balls 1 to function as a second planet gear 502. The contact between the balls 1 and input disc 34 create a variable rolling diameter, which allows that portion of the balls 1 to function as a third planet gear 503.

In embodiments of the planetary gear set 500, those of skill in the art will recognize that various radial and thrust bearings can advantageously be utilized to maintain the positions of the input disc 34, output disc 101 and cage 89 with respect to one another. Those of skill in the art will also recognize that solid or hollow shafts can be utilized and attached to the input disc 34, the output disc 101, the cage 89 and/or the idler 18 as appropriate to fulfill the functions described herein and such modifications are well within the skill of those in the field of rotational power transmission.

Figure 29:
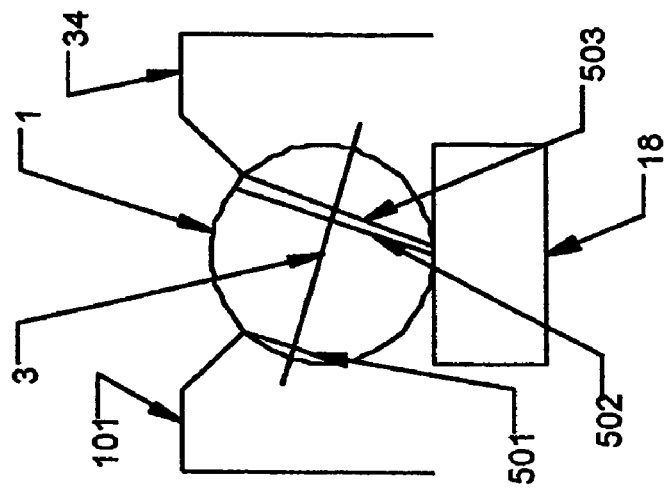
FIG. 29 is a schematic view of the transmission of FIG. 1 showing the three planet gears in a first ratio.
Figure 30:
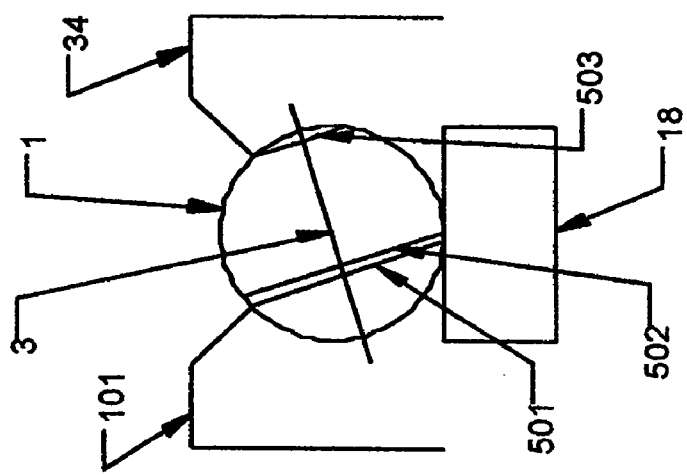
FIG. 30 is a schematic view of the transmission of FIG. 1 showing the three planet gears in a second ratio.
Figure 31:
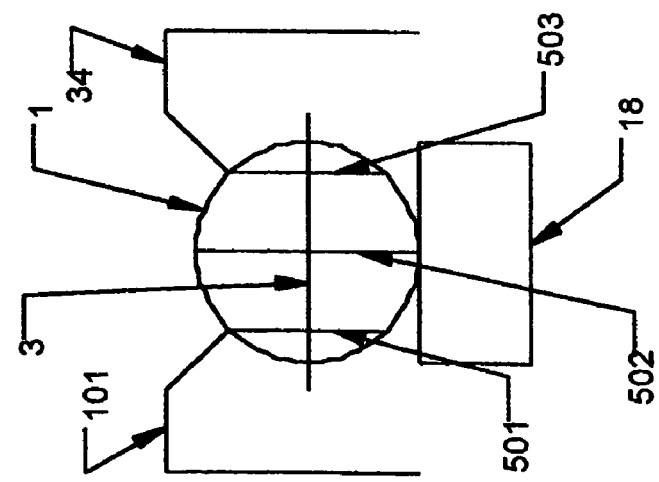
FIG. 31 is a schematic view of the transmission of FIG. 1 showing the three planet gears in a third ratio.

Referring now to FIGS. 29–31, the respective diameters of the first planet gear 501, second planet gear 502, and third planet gear 503 can be changed by shifting the transmission 100. FIG. 29 shows the transmission 100 with the first and third planet gears 501, 503 of equal diameter, and the second planet gear 502 at its maximum diameter. By tilting the balls 1 as previously described, the diameters of the planet gears 501, 502, 503 change, varying the input to output speed of the transmission 1700. FIG. 30 shows the balls 1 tilted so that the first planet gear 501 is increased in diameter, and the second and third planet gears 502 and 503 are decreased in diameter. FIG. 31 shows the balls tilted so that the third planet gear 503 is increased in diameter and the first and second planet gears 501 and 502 are decreased in diameter.

There are many different speed combinations possible by altering the source of torque between the input disc 34, the idler 18, and/or the cage 89. Additionally, some embodiments utilize more than one input. For example, the input disc 34 and the cage 89 can both provide input torque and can rotate at the same speed or different speeds. One or more sources of input torque can be capable of variable speed to increase the ratio possibilities of the transmission 100. A list is provided below of some of the combinations available by using the transmission 100 as a planetary gearset. In this list, a source of input torque, or an "input," is coded with an "I", an output is coded with an "O", a component that is fixed such that it does not rotate about the longitudinal axis 11 is coded with an "F", and if a component is allowed to rotate freely, it is coded with an "R." "Single In/Single Out" is used to indicate that there is one input and one output, "Dual In/Single Out" is used to indicate that there are two inputs and one output, "Single In/Dual Out" is used to indicate that there is one input and two outputs, "Dual In/Dual Out" is used to indicate that there are two inputs and two outputs, "Triple In/Single Out" is used to indicate that there are three inputs and one output, and "Single In/Triple Out" is used to indicate that there is one input and three outputs.

| Configuration | Input Disc (34) | Idler (18) | Cage (89) | Output Disc (101) |
| --- | --- | --- | --- | --- |
| Single In/Single Out | F | I | F | O |
| Single In/Single Out | R | I | F | O |
| Single In/Single Out | F | I | R | O |
| Single In/Single Out | R | I | R | O |
| Single In/Single Out | F | I | O | F |
| Single In/Single Out | R | I | O | F |
| Single In/Single Out | F | I | O | R |
| Single In/Single Out | R | I | O | R |
| Single In/Single Out | I | R | F | O |
| Single In/Single Out | I | F | R | O |
| Single In/Single Out | I | F | F | O |
| Single In/Single Out | I | R | R | O |
| Single In/Single Out | I | F | O | F |
| Single In/Single Out | I | F | O | R |
| Single In/Single Out | I | R | O | F |
| Single In/Single Out | I | R | O | R |
| Single In/Single Out | F | F | I | O |
| Single In/Single Out | F | R | I | O |
| Single In/Single Out | R | F | I | O |
| Single In/Single Out | R | R | I | O |
| Single In/Single Out | F | O | I | F |
| Single In/Single Out | R | O | I | F |
| Single In/Single Out | F | O | I | R |
| Single In/Single Out | R | O | I | R |
| Dual In/Single Out | I | I | F | O |
| Dual In/Single Out | I | I | R | O |
| Dual In/Single Out | I | I | O | F |
| Dual In/Single Out | I | I | O | R |
| Dual In/Single Out | I | O | I | F |
| Dual In/Single Out | I | O | I | R |
| Dual In/Single Out | I | F | I | O |
| Dual In/Single Out | I | R | I | O |
| Dual In/Single Out | F | I | I | O |
| Dual In/Single Out | R | I | I | O |
| Single In/Dual Out | I | O | F | O |
| Single In/Dual Out | I | O | R | O |
| Single In/Dual Out | I | F | O | O |
| Single In/Dual Out | I | R | O | O |
| Single In/Dual Out | I | O | O | F |
| Single In/Dual Out | I | O | O | R |
| Single In/Dual Out | F | I | O | O |
| Single In/Dual Out | R | I | O | O |
| Single In/Dual Out | F | O | I | O |
| Single In/Dual Out | R | O | I | O |
| Dual In/Dual Out | I | I | O | O |
| Dual In/Dual Out | I | O | I | O |
| Triple In/Single Out | I | I | I | O |
| Triple In/Single Out | I | I | O | I |
| Single In/Triple Out | I | O | O | O |

Figure 32:
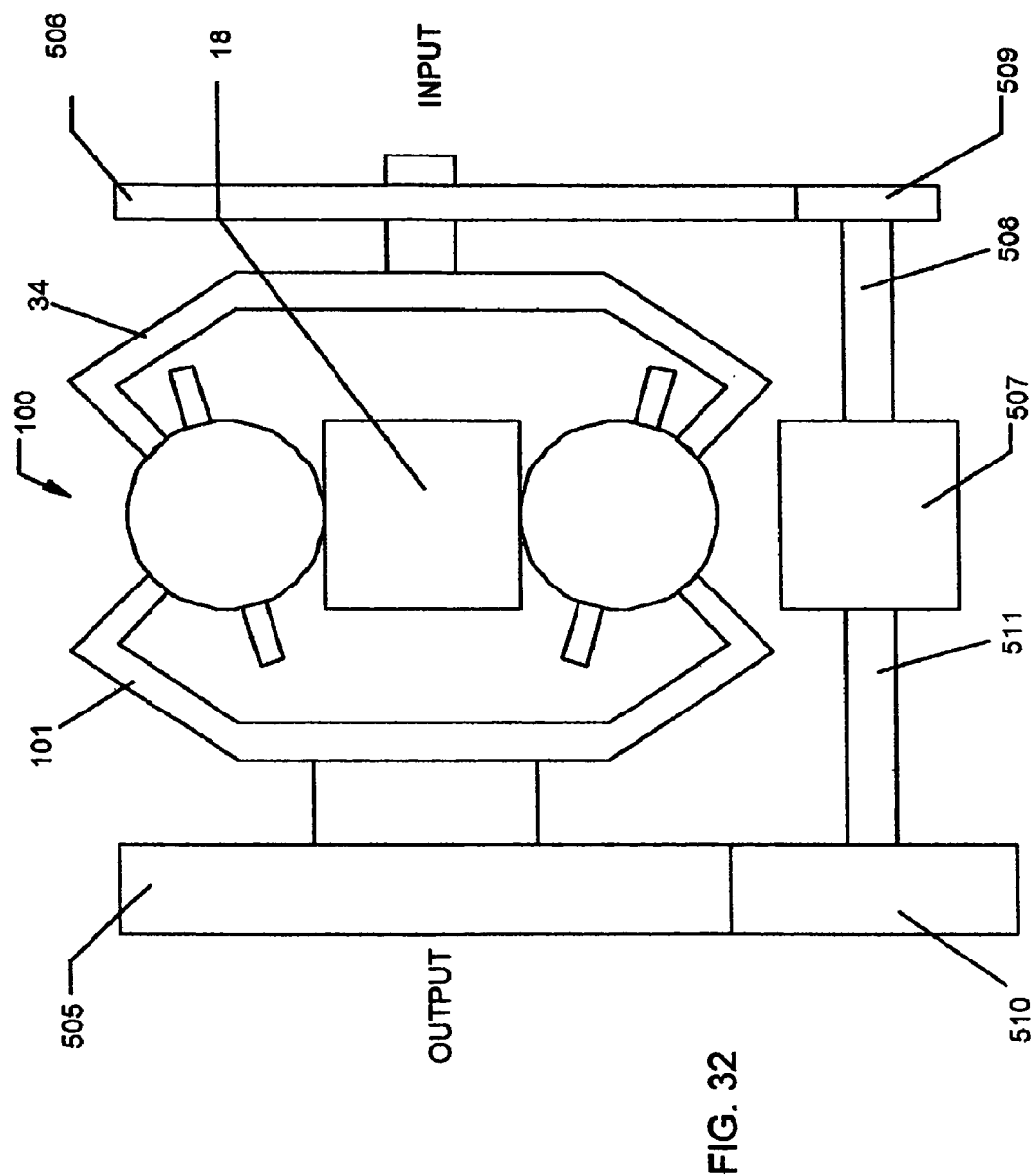
FIG. 32 is a schematic view of the transmission of FIG. 1 combined with a planetary gearset on the output side and a parallel power path.

Referring to FIG. 32, the transmission 100 may also be combined through a parallel power path with a planetary gearset 505 to produce many more speed combinations. A typical planetary gearset 505 is comprised of a sun gear in the center, multiple planet gears distributed around and engaging the sun gear that are all rotatably attached at their respective centers to a planet carrier, often simply referred to as the carrier, and a ring gear surrounding and engaging the planet gears. By switching the source of input torque and the output among the sun gear, carrier, and ring gear, many speed combinations can be obtained. The planetary gearset 505 combined with the transmission 100 provides for a very high number of speed combinations and in some cases an infinitely variable transmission can be obtained. In FIG. 32, the torque input of the transmission 100 is coupled both to the input disc 34 and to a first gear 506, which is generally coaxial with input disc 34 and contacts and rotates a second gear 509 to drive the parallel power path. The basic configuration of coupling both the input disc 34 of the transmission 100, or CVT 100, and the input of a parallel power path to a prime mover or other torque source such as a motor or other powering device, is termed "Input Coupled." By varying the diameters of the first gear 506 and the second gear 509, the input speed to the parallel power path can be varied. The second gear 509 is attached to and rotates a gear shaft 508, which in some embodiments rotates a gearbox 507. The gearbox 507, implemented as a design option in such embodiments, can further vary the rotation speed of the parallel power path and can be a conventional geared transmission. The gearbox 507 rotates a gearbox shaft 511, which rotates a third gear 510. In embodiments not utilizing the gearbox 507, the gear shaft 508 drives the third gear 510. The third gear 510 drives the sun, carrier, or ring of the planetary gearset 505 and is of a diameter designed to create a desirable speed/torque ratio. Alternatively, the third gear 510 can be eliminated and the gearbox shaft 508 can rotate the sun, carrier, or ring of the planetary gearset 505 directly. The planetary gearset 505 also has an input from the CVT 100 output, which drives another of the sun, carrier or ring.

In the following table, titled "Input Coupled," many, if not all, of the various input and output combinations that are possible with the basic arrangement as just described above are identified. In this table, "IT" represents the source of input torque into the CVT 100, "O" represents the component of the CVT coupled to the planetary gearset 505, "I1" represents the planetary gearset 505 component coupled to the CVT 100 output, "OV" represents the component of the planetary gearset 505 that is connected to the output of the vehicle or machine, "F" represents a component of the planetary gearset 505 or the transmission 100 that is fixed so as not to rotate about its axis, "I2" represents a component coupled to the parallel path, which is the third gear 509, and "R" represents a component that is free to rotate about its axis and therefore does not drive another component. For this table and the table that follows, entitled "Output Coupled," it is assumed that the ring gear is the only planeteary gearset 505 component that is being fixed, in order to reduce the overall number of tables that have to be provided herein. The sun gear or the planet carrier can also be fixed with corresponding input and output combinations for the other components and those combinations are not provided herein in order to reduce the size of this description, but are easily determined based upon the following two tables.

| Input Coupled | |
| --- | --- |
| CVT | Planetary Gearset |
| IT = Input | I1 = Coupled to CVT Output |
| O = Output to planetary input | OV = Output to vehicle/load |
| F = Fixed to ground | F = Fixed to ground |
| R = Rolling (free) | I2 = Coupled to parallel path |

| Variator | Input Disc (34) | Idler (18) | Cage (89) | Output Disc (101) | Ring | Carrier | Sun |
| --- | --- | --- | --- | --- | --- | --- | --- |
| Single In/Single Out | F | IT | F | O | I1 | I2 | OV |
| | F | IT | F | O | OV | I1 | I2 |
| | F | IT | F | O | I2 | OV | I1 |
| | F | IT | F | O | F | I1 | I2, OV |
| | F | IT | F | O | F | I2, OV | I1 |
| | F | IT | F | O | F | I2 | I1, OV |
| | F | IT | F | O | F | I1, OV | I2 |
| Single In/Single Out | R | IT | F | O | I1 | I2 | OV |
| | R | IT | F | O | OV | I1 | I2 |
| | R | IT | F | O | I2 | OV | I1 |
| | R | IT | F | O | F | I1 | I2, OV |
| | R | IT | F | O | F | I2, OV | I1 |
| | R | IT | F | O | F | I2 | I1, OV |
| | R | IT | F | O | F | I1, OV | I2 |
| Single In/Single Out | F | IT | R | O | I1 | I2 | OV |
| | F | IT | R | O | OV | I1 | I2 |
| | F | IT | R | O | I2 | OV | I1 |
| | F | IT | R | O | F | I1 | I2, OV |
| | F | IT | R | O | F | I2, OV | I1 |
| | F | IT | R | O | F | I2 | I1, OV |
| | F | IT | R | O | F | I1, OV | I2 |
| Single In/Single Out | R | IT | R | O | I1 | I2 | OV |
| | R | IT | R | O | OV | I1 | I2 |
| | R | IT | R | O | I2 | OV | I1 |
| | R | IT | R | O | F | I1 | I2, OV |
| | R | IT | R | O | F | I2, OV | I1 |
| | R | IT | R | O | F | I2 | I1, OV |
| | R | IT | R | O | F | I1, OV | I2 |
| Single In/Single Out | F | IT | O | F | I1 | I2 | OV |
| | F | IT | O | F | OV | I1 | I2 |
| | F | IT | O | F | I2 | OV | I1 |
| | F | IT | O | F | F | I1 | I2, OV |
| | F | IT | O | F | F | I2, OV | I1 |
| | F | IT | O | F | F | I2 | I1, OV |
| | F | IT | O | F | F | I1, OV | I2 |

-continued

| Variator | Input Disc (34) | Idler (18) | Cage (89) | Output Disc (101) | Ring | Carrier | Sun |
|---|---|---|---|---|---|---|---|
| Single In/Single Out | R | IT | O | F | I1 | I2 | OV |
|  | R | IT | O | F | OV | I1 | I2 |
|  | R | IT | O | F | I2 | OV | I1 |
|  | R | IT | O | F | F | I1 | I2, OV |
|  | R | IT | O | F | F | I2, OV | I1 |
|  | R | IT | O | F | F | I2 | I1, OV |
|  | R | IT | O | F | F | I1, OV | I2 |
| Single In/Single Out | F | IT | O | R | I1 | I2 | OV |
|  | F | IT | O | R | OV | I1 | I2 |
|  | F | IT | O | R | I2 | OV | I1 |
|  | F | IT | O | R | F | I1 | I2, OV |
|  | F | IT | O | R | F | I2, OV | I1 |
|  | F | IT | O | R | F | I2 | I1, OV |
|  | F | IT | O | R | F | I1, OV | I2 |
| Single In/Single Out | R | IT | O | R | I1 | I2 | OV |
|  | R | IT | O | R | OV | I1 | I2 |
|  | R | IT | O | R | I2 | OV | I1 |
|  | R | IT | O | R | F | I1 | I2, OV |
|  | R | IT | O | R | F | I2, OV | I1 |
|  | R | IT | O | R | F | I2 | I1, OV |
|  | R | IT | O | R | F | I1, OV | I2 |
| Single In/Single Out | IT | R | F | O | I1 | I2 | OV |
|  | IT | R | F | O | OV | I1 | I2 |
|  | IT | R | F | O | I2 | OV | I1 |
|  | IT | R | F | O | F | I1 | I2, OV |
|  | IT | R | F | O | F | I2, OV | I1 |
|  | IT | R | F | O | F | I2 | I1, OV |
|  | IT | R | F | O | F | I1, OV | I2 |
| Single In/Single Out | IT | F | R | O | I1 | I2 | OV |
|  | IT | F | R | O | OV | I1 | I2 |
|  | IT | F | R | O | I2 | OV | I1 |
|  | IT | F | R | O | F | I1 | I2, OV |
|  | IT | F | R | O | F | I2, OV | I1 |
|  | IT | F | R | O | F | I2 | I1, OV |
|  | IT | F | R | O | F | I1, OV | I2 |
| Single In/Single Out | IT | F | F | O | I1 | I2 | OV |
|  | IT | F | F | O | OV | I1 | I2 |
|  | IT | F | F | O | I2 | OV | I1 |
|  | IT | F | F | O | F | I1 | I2, OV |
|  | IT | F | F | O | F | I2, OV | I1 |
|  | IT | F | F | O | F | I2 | I1, OV |
|  | IT | F | F | O | F | I1, OV | I2 |
| Single In/Single Out | IT | R | R | O | I1 | I2 | OV |
|  | IT | R | R | O | OV | I1 | I2 |
|  | IT | R | R | O | I2 | OV | I1 |
|  | IT | R | R | O | F | I1 | I2, OV |
|  | IT | R | R | O | F | I2, OV | I1 |
|  | IT | R | R | O | F | I2 | I1, OV |
|  | IT | R | R | O | F | I1, OV | I2 |
| Single In/Single Out | IT | F | O | F | I1 | I2 | OV |
|  | IT | F | O | F | OV | I1 | I2 |
|  | IT | F | O | F | I2 | OV | I1 |
|  | IT | F | O | F | F | I1 | I2, OV |
|  | IT | F | O | F | F | I2, OV | I1 |
|  | IT | F | O | F | F | I2 | I1, OV |
|  | IT | F | O | F | F | I1, OV | I2 |
| Single In/Single Out | IT | F | O | R | I1 | I2 | OV |
|  | IT | F | O | R | OV | I1 | I2 |
|  | IT | F | O | R | I2 | OV | I1 |
|  | IT | F | O | R | F | I1 | I2, OV |
|  | IT | F | O | R | F | I2, OV | I1 |
|  | IT | F | O | R | F | I2 | I1, OV |
|  | IT | F | O | R | F | I1, OV | I2 |

-continued

| Variator | Input Disc (34) | Idler (18) | Cage (89) | Output Disc (101) | Ring | Carrier | Sun |
|---|---|---|---|---|---|---|---|
| Single In/Single Out | IT | R | O | F | I1 | I2 | OV |
|  | IT | R | O | F | OV | I1 | I2 |
|  | IT | R | O | F | I2 | OV | I1 |
|  | IT | R | O | F | F | I1 | I2, OV |
|  | IT | R | O | F | F | I2, OV | I1 |
|  | IT | R | O | F | F | I2 | I1, OV |
|  | IT | R | O | F | F | I1, OV | I2 |
| Single In/Single Out | IT | R | O | R | I1 | I2 | OV |
|  | IT | R | O | R | OV | I1 | I2 |
|  | IT | R | O | R | I2 | OV | I1 |
|  | IT | R | O | R | F | I1 | I2, OV |
|  | IT | R | O | R | F | I2, OV | I1 |
|  | IT | R | O | R | F | I2 | I1, OV |
|  | IT | R | O | R | F | I1, OV | I2 |
| Single In/Single Out | F | F | IT | O | I1 | I2 | OV |
|  | F | F | IT | O | OV | I1 | I2 |
|  | F | F | IT | O | I2 | OV | I1 |
|  | F | F | IT | O | F | I1 | I2, OV |
|  | F | F | IT | O | F | I2, OV | I1 |
|  | F | F | IT | O | F | I2 | I1, OV |
|  | F | F | IT | O | F | I1, OV | I2 |
| Single In/Single Out | F | R | IT | O | I1 | I2 | OV |
|  | F | R | IT | O | OV | I1 | I2 |
|  | F | R | IT | O | I2 | OV | I1 |
|  | F | R | IT | O | F | I1 | I2, OV |
|  | F | R | IT | O | F | I2, OV | I1 |
|  | F | R | IT | O | F | I2 | I1, OV |
|  | F | R | IT | O | F | I1, OV | I2 |
| Single In/Single Out | R | F | IT | O | I1 | I2 | OV |
|  | R | F | IT | O | OV | I1 | I2 |
|  | R | F | IT | O | I2 | OV | I1 |
|  | R | F | IT | O | F | I1 | I2, OV |
|  | R | F | IT | O | F | I2, OV | I1 |
|  | R | F | IT | O | F | I2 | I1, OV |
|  | R | F | IT | O | F | I1, OV | I2 |
| Single In/Single Out | R | R | IT | O | I1 | I2 | OV |
|  | R | R | IT | O | OV | I1 | I2 |
|  | R | R | IT | O | I2 | OV | I1 |
|  | R | R | IT | O | F | I1 | I2, OV |
|  | R | R | IT | O | F | I2, OV | I1 |
|  | R | R | IT | O | F | I2 | I1, OV |
|  | R | R | IT | O | F | I1, OV | I2 |
| Single In/Single Out | F | O | IT | F | I1 | I2 | OV |
|  | F | O | IT | F | OV | I1 | I2 |
|  | F | O | IT | F | I2 | OV | I1 |
|  | F | O | IT | F | F | I1 | I2, OV |
|  | F | O | IT | F | F | I2, OV | I1 |
|  | F | O | IT | F | F | I2 | I1, OV |
|  | F | O | IT | F | F | I1, OV | I2 |
| Single In/Single Out | R | O | IT | F | I1 | I2 | OV |
|  | R | O | IT | F | OV | I1 | I2 |
|  | R | O | IT | F | I2 | OV | I1 |
|  | R | O | IT | F | F | I1 | I2, OV |
|  | R | O | IT | F | F | I2, OV | I1 |
|  | R | O | IT | F | F | I2 | I1, OV |
|  | R | O | IT | F | F | I1, OV | I2 |
| Single In/Single Out | F | O | IT | R | I1 | I2 | OV |
|  | F | O | IT | R | OV | I1 | I2 |
|  | F | O | IT | R | I2 | OV | I1 |
|  | F | O | IT | R | F | I1 | I2, OV |
|  | F | O | IT | R | F | I2, OV | I1 |
|  | F | O | IT | R | F | I2 | I1, OV |
|  | F | O | IT | R | F | I1, OV | I2 |

-continued

| Variator | Input Disc (34) | Idler (18) | Cage (89) | Output Disc (101) | Ring | Carrier | Sun |
|---|---|---|---|---|---|---|---|
| Single In/Single Out | R | O | IT | R | I1 | I2 | OV |
| | R | O | IT | R | OV | I1 | I2 |
| | R | O | IT | R | I2 | OV | I1 |
| | R | O | IT | R | F | I1 | I2, OV |
| | R | O | IT | R | F | I2, OV | I1 |
| | R | O | IT | R | F | I2 | I1, OV |
| | R | O | IT | R | F | I1, OV | I2 |

Figure 33:
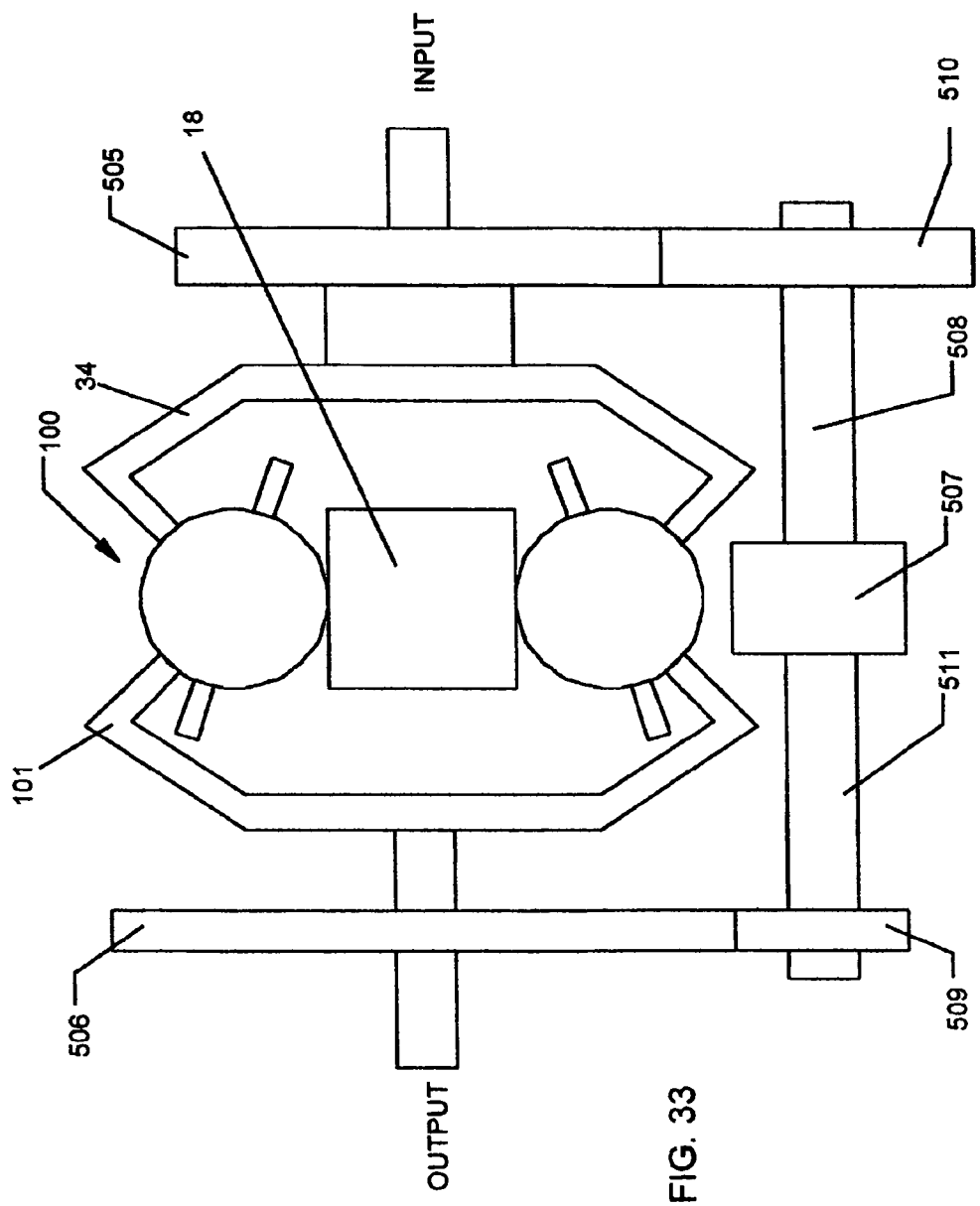
FIG. 33 is a schematic view of the transmission of FIG. 1 combined with a planetary gearset on the input side and a parallel power path.

Referring to the embodiment illustrated in FIG. 33, the source of torque input drives the planetary gearset 505, which is coupled as an input to the CVT 100. One or more components of the CVT 100 are coupled to a parallel power path and to the output of the transmission. The parallel power path in this embodiment is as follows: a component of the planetary gearset 505, either the sun, the carrier, or the ring, meshes with a third gear 510, which rotates the gear shaft 508, which in turn drives the previously described gearbox 507. The gearbox 507 rotates the gearbox shaft 511, which rotates the second gear 509, which in turn drives the first gear 506. The first gear 506 is then mounted on the output shaft of the transmission, which is also coupled to the output of the CVT 100. In this embodiment, the planetary gearset 505 is coupled to the source of torque to the transmission and then provides torque to both the parallel path and the CVT 100 and the torque from both of these paths is coupled at the output of the vehicle or equipment. If the planetary gearset 505 is coupled thusly to provide torque to the CVT 100 and to the fixed ratio parallel path, and both paths are coupled at the output, such as in a drive shaft, wheel, or other loaded device, the configuration can be referred to as "Output Coupled." In this basic configuration, the planetary gearset 505 combined with the CVT 100 provides for a very high number of speed combinations and in some cases an infinitely variable transmission can be obtained.

In the following table, titled "Output Coupled," many if not all of the possible combinations of the basic arrangement shown in FIG. 33 are provided and described. In this table, for the planetary gearset 505, "O1" refers to the component of the planetary gearset 505 coupled to the CVT 100, "I" refers to the input from the engine, human, or whatever source, "F" refers to a component that is fixed so as not to rotate about its own axis, and "O2" refers to the component coupled to the parallel path, via planetary gear 510. For the CVT 100, "I" refers to the component that is coupled to the planetary gearset 505, "O" refers to the component that is coupled to the output of the vehicle or machine, "F" refers to a fixed component as just described, and "R" refers to a component that is free to rotate about its axis, and therefore does not drive any other component.

Output Coupled

| Planetary Gearset | CVT |
|---|---|
| O1 = Coupled to CVT Input | I = Input from Planetary output |
| I = Input from engine | O = Output to vehicle/load |
| F = Fixed to ground | F = Fixed to ground |
| O2 = Coupled to parallel path | R = Rolling (free) |

| Variator | Ring | Carrier | Sun | Input Disc (34) | Idler (18) | Cage (89) | Output Disc (101) |
|---|---|---|---|---|---|---|---|
| Single In/Single Out | I | O1 | O2 | F | I | F | O |
| | O2 | I | O1 | F | I | F | O |
| | O1 | O2 | I | F | I | F | O |
| | F | I, O1 | O2 | F | I | F | O |
| | F | O2 | I, O1 | F | I | F | O |
| | F | I, O2 | O1 | F | I | F | O |
| | F | O1 | I, O2 | F | I | F | O |
| Single In/Single Out | I | O1 | O2 | R | I | F | O |
| | O2 | I | O1 | R | I | F | O |
| | O1 | O2 | I | R | I | F | O |
| | F | I, O1 | O2 | R | I | F | O |
| | F | O2 | I, O1 | R | I | F | O |
| | F | I, O2 | O1 | R | I | F | O |
| | F | O1 | I, O2 | R | I | F | O |
| Single In/Single Out | I | O1 | O2 | F | I | R | O |
| | O2 | I | O1 | F | I | R | O |
| | O1 | O2 | I | F | I | R | O |
| | F | I, O1 | O2 | F | I | R | O |
| | F | O2 | I, O1 | F | I | R | O |
| | F | I, O2 | O1 | F | I | R | O |
| | F | O1 | I, O2 | F | I | R | O |
| Single In/Single Out | I | O1 | O2 | R | I | R | O |
| | O2 | I | O1 | R | I | R | O |
| | O1 | O2 | I | R | I | R | O |
| | F | I, O1 | O2 | R | I | R | O |
| | F | O2 | I, O1 | R | I | R | O |
| | F | I, O2 | O1 | R | I | R | O |
| | F | O1 | I, O2 | R | I | R | O |
| Single In/Single Out | I | O1 | O2 | F | I | O | F |
| | O2 | I | O1 | F | I | O | F |
| | O1 | O2 | I | F | I | O | F |
| | F | I, O1 | O2 | F | I | O | F |
| | F | O2 | I, O1 | F | I | O | F |
| | F | I, O2 | O1 | F | I | O | F |
| | F | O1 | I, O2 | F | I | O | F |
| Single In/Single Out | I | O1 | O2 | R | I | O | F |
| | O2 | I | O1 | R | I | O | F |
| | O1 | O2 | I | R | I | O | F |
| | F | I, O1 | O2 | R | I | O | F |
| | F | O2 | I, O1 | R | I | O | F |
| | F | I, O2 | O1 | R | I | O | F |
| | F | O1 | 1, O2 | R | I | O | F |
| Single In/Single Out | I | O1 | O2 | F | I | O | R |
| | O2 | I | O1 | F | I | O | R |
| | O1 | O2 | I | F | I | O | R |
| | F | I, O1 | O2 | F | I | O | R |
| | F | O2 | I, O1 | F | I | O | R |
| | F | I, O2 | O1 | F | I | O | R |
| | F | O1 | I, O2 | F | I | O | R |

-continued

| Variator | Ring | Carrier | Sun | Input Disc (34) | Idler (18) | Cage (89) | Output Disc (101) |
|---|---|---|---|---|---|---|---|
| Single In/Single Out | I | O1 | O2 | R | I | O | R |
| | O2 | I | O1 | R | I | O | R |
| | O1 | O2 | I | R | I | O | R |
| | F | I, O1 | O2 | R | I | O | R |
| | F | O2 | I, O1 | R | I | O | R |
| | F | I, O2 | O1 | R | I | O | R |
| | F | O1 | I, O2 | R | I | O | R |
| Single In/Single Out | I | O1 | O2 | I | R | F | O |
| | O2 | I | O1 | I | R | F | O |
| | O1 | O2 | I | I | R | F | O |
| | F | I, O1 | O2 | I | R | F | O |
| | F | O2 | I, O1 | I | R | F | O |
| | F | I, O2 | O1 | I | R | F | O |
| | F | O1 | I, O2 | I | R | F | O |
| Single In/Single Out | I | O1 | O2 | I | F | R | O |
| | O2 | I | O1 | I | F | R | O |
| | O1 | O2 | I | I | F | R | O |
| | F | I, O1 | O2 | I | F | R | O |
| | F | O2 | I, O1 | I | F | R | O |
| | F | I, O2 | O1 | I | F | R | O |
| | F | O1 | I, O2 | I | F | R | O |
| Single In/Single Out | I | O1 | O2 | I | F | F | O |
| | O2 | I | O1 | I | F | F | O |
| | O1 | O2 | I | I | F | F | O |
| | F | I, O1 | O2 | I | F | F | O |
| | F | O2 | I, O1 | I | F | F | O |
| | F | I, O2 | O1 | I | F | F | O |
| | F | O1 | I, O2 | I | F | F | O |
| Single In/Single Out | I | O1 | O2 | I | R | R | O |
| | O2 | I | O1 | I | R | R | O |
| | O1 | O2 | I | I | R | R | O |
| | F | I, O1 | O2 | I | R | R | O |
| | F | O2 | I, O1 | I | R | R | O |
| | F | I, O2 | O1 | I | R | R | O |
| | F | O1 | I, O2 | I | R | R | O |
| Single In/Single Out | I | O1 | O2 | I | F | O | F |
| | O2 | I | O1 | I | F | O | F |
| | O1 | O2 | I | I | F | O | F |
| | F | I, O1 | O2 | I | F | O | F |
| | F | O2 | I, O1 | I | F | O | F |
| | F | I, O2 | O1 | I | F | O | F |
| | F | O1 | I, O2 | I | F | O | F |
| Single In/Single Out | I | O1 | O2 | I | F | O | R |
| | O2 | I | O1 | I | F | O | R |
| | O1 | O2 | I | I | F | O | R |
| | F | I, O1 | O2 | I | F | O | R |
| | F | O2 | I, O1 | I | F | O | R |
| | F | I, O2 | O1 | I | F | O | R |
| | F | O1 | I, O2 | I | F | O | R |
| Single In/Single Out | I | O1 | O2 | I | R | O | F |
| | O2 | I | O1 | I | R | O | F |
| | O1 | O2 | I | I | R | O | F |
| | F | I, O1 | O2 | I | R | O | F |
| | F | O2 | I, O1 | I | R | O | F |
| | F | I, O2 | O1 | I | R | O | F |
| | F | O1 | I, O2 | I | R | O | F |
| Single In/Single Out | I | O1 | O2 | I | R | O | R |
| | O2 | I | O1 | I | R | O | R |
| | O1 | O2 | I | I | R | O | R |
| | F | I, O1 | O2 | I | R | O | R |
| | F | O2 | I, O1 | I | R | O | R |
| | F | I, O2 | O1 | I | R | O | R |
| | F | O1 | I, O2 | I | R | O | R |
| Single In/Single Out | I | O1 | O2 | F | F | I | O |
| | O2 | I | O1 | F | F | I | O |
| | O1 | O2 | I | F | F | I | O |
| | F | I, O1 | O2 | F | F | I | O |
| | F | O2 | I, O1 | F | F | I | O |
| | F | I, O2 | O1 | F | F | I | O |
| | F | O1 | I, O2 | F | F | I | O |
| Single In/Single Out | I | O1 | O2 | F | R | I | O |
| | O2 | I | O1 | F | R | I | O |
| | O1 | O2 | I | F | R | I | O |
| | F | I, O1 | O2 | F | R | I | O |
| | F | O2 | I, O1 | F | R | I | O |
| | F | I, O2 | O1 | F | R | I | O |
| | F | O1 | I, O2 | F | R | I | O |
| Single In/Single Out | I | O1 | O2 | R | F | I | O |
| | O2 | I | O1 | R | F | I | O |
| | O1 | O2 | I | R | F | I | O |
| | F | I, O1 | O2 | R | F | I | O |
| | F | O2 | I, O1 | R | F | I | O |
| | F | I, O2 | O1 | R | F | I | O |
| | F | O1 | I, O2 | R | F | I | O |
| Single In/Single Out | I | O1 | O2 | R | R | I | O |
| | O2 | I | O1 | R | R | I | O |
| | O1 | O2 | I | R | R | I | O |
| | F | I, O1 | O2 | R | R | I | O |
| | F | O2 | I, O1 | R | R | I | O |
| | F | I, O2 | O1 | R | R | I | O |
| | F | O1 | I, O2 | R | R | I | O |
| Single In/Single Out | I | O1 | O2 | F | O | I | F |
| | O2 | I | O1 | F | O | I | F |
| | O1 | O2 | I | F | O | I | F |
| | F | I, O1 | O2 | F | O | I | F |
| | F | O2 | I, O1 | F | O | I | F |
| | F | I, O2 | O1 | F | O | I | F |
| | F | O1 | I, O2 | F | O | I | F |
| Single In/Single Out | I | O1 | O2 | R | O | I | F |
| | O2 | I | O1 | R | O | I | F |
| | O1 | O2 | I | R | O | I | F |
| | F | I, O1 | O2 | R | O | I | F |
| | F | O2 | I, O1 | R | O | I | F |
| | F | I, O2 | O1 | R | O | I | F |
| | F | O1 | I, O2 | R | O | I | F |
| Single In/Single Out | I | O1 | O2 | F | O | I | R |
| | O2 | I | O1 | F | O | I | R |
| | O1 | O2 | I | F | O | I | R |
| | F | I, O1 | O2 | F | O | I | R |
| | F | O2 | I, O1 | F | O | I | R |
| | F | I, O2 | O1 | F | O | I | R |
| | F | O1 | I, O2 | F | O | I | R |
| Single In/Single Out | I | O1 | O2 | R | O | I | R |
| | O2 | I | O1 | R | O | I | R |
| | O1 | O2 | I | R | O | I | R |
| | F | I, O1 | O2 | R | O | I | R |
| | F | O2 | I, O1 | R | O | I | R |
| | F | I, O2 | O1 | R | O | I | R |
| | F | O1 | I, O2 | R | O | I | R |

Referring to the embodiment illustrated in FIG. 32, the following table, titled "Input Coupled Dual Input Power paths," shows combinations in a basic input coupled arrangement with two sources of torque input into the planetary gearset 505. The reference letters provided in this table represent the same components as they did in the previous table except that for the planetary gearset 505, "I1" refers to the output of the CVT 100 and "I2" is the component that is coupled to the parallel path, which in this case is the planetary gear 510.

Input Coupled Dual Input Power paths

| CVT | Planetary Gearset |
|---|---|
| I = Input | I1 = Coupled to CVT Output |
| O = Output | O = Output to vehicle/load |
| F = Fixed to ground | F = Fixed to ground |
| R = Rolling (free) | I2 = Coupled to parallel path |

| Variator | Input Disc (34) | Idler (18) | Cage (89) | Output Disc (101) | Ring | Carrier | Sun |
|---|---|---|---|---|---|---|---|
| Dual In/ Single Out | I | I | F | O | I1 | I2 | O |
| | I | I | F | O | O | I1 | I2 |
| | I | I | F | O | I2 | O | I1 |
| | I | I | F | O | F | I1 | I2, O |
| | I | I | F | O | F | I2, O | I1 |
| | I | I | F | O | F | I2 | I1, O |
| | I | I | F | O | F | I1, O | I2 |
| Dual In/ Single Out | I | I | R | O | I1 | I2 | O |
| | I | I | R | O | O | I1 | I2 |
| | I | I | R | O | I2 | O | I1 |
| | I | I | R | O | F | I1 | I2, O |
| | I | I | R | O | F | I2, O | I1 |
| | I | I | R | O | F | I2 | I1, O |
| | I | I | R | O | F | I1, O | I2 |
| Dual In/ Single Out | I | I | O | F | I1 | I2 | O |
| | I | I | O | F | O | I1 | I2 |
| | I | I | O | F | I2 | O | I1 |
| | I | I | O | F | F | I1 | I2, O |
| | I | I | O | F | F | I2, O | I1 |
| | I | I | O | F | F | I2 | I1, O |
| | I | I | O | F | F | I1, O | I2 |
| Dual In/ Single Out | I | I | O | R | I1 | I2 | O |
| | I | I | O | R | O | I1 | I2 |
| | I | I | O | R | I2 | O | I1 |
| | I | I | O | R | F | I1 | I2, O |
| | I | I | O | R | F | I2, O | I1 |
| | I | I | O | R | F | I2 | I1, O |
| | I | I | O | R | F | I1, O | I2 |
| Dual In/ Single Out | I | O | I | F | I1 | I2 | O |
| | I | O | I | F | O | I1 | I2 |
| | I | O | I | F | I2 | O | I1 |
| | I | O | I | F | F | I1 | I2, O |
| | I | O | I | F | F | I2, O | I1 |
| | I | O | I | F | F | I2 | I1, O |
| | I | O | I | F | F | I1, O | I2 |
| Dual In/ Single Out | I | O | I | R | I1 | I2 | O |
| | I | O | I | R | O | I1 | I2 |
| | I | O | I | R | I2 | O | I1 |
| | I | O | I | R | F | I1 | I2, O |
| | I | O | I | R | F | I2, O | I1 |
| | I | O | I | R | F | I2 | I1, O |
| | I | O | I | R | F | I1, O | I2 |
| Dual In/ Single Out | I | F | I | O | I1 | I2 | O |
| | I | F | I | O | O | I1 | I2 |
| | I | F | I | O | I2 | O | I1 |
| | I | F | I | O | F | I1 | I2, O |
| | I | F | I | O | F | I2, O | I1 |
| | I | F | I | O | F | I2 | I1, O |
| | I | F | I | O | F | I1, O | I2 |
| Dual In/ Single Out | I | R | I | O | I1 | I2 | O |
| | I | R | I | O | O | I1 | I2 |
| | I | R | I | O | I2 | O | I1 |
| | I | R | I | O | F | I1 | I2, O |
| | I | R | I | O | F | I2, O | I1 |
| | I | R | I | O | F | I2 | I1, O |
| | I | R | I | O | F | I1, O | I2 |
| Dual In/ Single Out | F | I | I | O | I1 | I2 | O |
| | F | I | I | O | O | I1 | I2 |
| | F | I | I | O | I2 | O | I1 |
| | F | I | I | O | F | I1 | I2, O |
| | F | I | I | O | F | I2, O | I1 |
| | F | I | I | O | F | I2 | I1, O |
| | F | I | I | O | F | I1, O | I2 |
| Dual In/ Single Out | R | I | I | O | I1 | I2 | O |
| | R | I | I | O | O | I1 | I2 |
| | R | I | I | O | I2 | O | I1 |
| | R | I | I | O | F | I1 | I2, O |
| | R | I | I | O | F | I2, O | I1 |
| | R | I | I | O | F | I2 | I1, O |
| | R | I | I | O | F | I1, O | I2 |

Still referring to the embodiment illustrated in FIG. 32, the following table, titled "Input Coupled Triple Input" refers to embodiments utilizing three sources of input torque into the CVT 100. For this table, the CVT 100 reference letters refer to the same components as in the previous table and the planetary gearset 505 reference letters represent the same components except for "I2," which represents the component that is coupled to the parallel path.

Input Coupled Triple Input

| CVT | Planetary Gearset |
|---|---|
| I = Input | I1 = Coupled to CVT Output |
| O = Output | O = Output to vehicle/load |
| F = Fixed to ground | F = Fixed to ground |
| R = Rolling (free) | I2 = Coupled to parallel path |

| Variator | Input Disc (34) | Idler (18) | Cage (89) | Output Disc (101) | Ring | Carrier | Sun |
|---|---|---|---|---|---|---|---|
| Triple In/ Single Out | I | I | I | O | I1 | I2 | O |
| | I | I | I | O | O | I1 | I2 |
| | I | I | I | O | I2 | O | I1 |
| | I | I | I | O | F | I1 | I2, O |
| | I | I | I | O | F | I2, O | I1 |
| | I | I | I | O | F | I2 | I1, O |
| | I | I | I | O | F | I1, O | I2 |
| Triple In/ Single Out | I | I | O | I | I1 | I2 | O |
| | I | I | O | I | O | I1 | I2 |
| | I | I | O | I | I2 | O | I1 |
| | I | I | O | I | F | I1 | I2, O |
| | I | I | O | I | F | I2, O | I1 |
| | I | I | O | I | F | I2 | I1, O |
| | I | I | O | I | F | I1, O | I2 |

Figure 34:
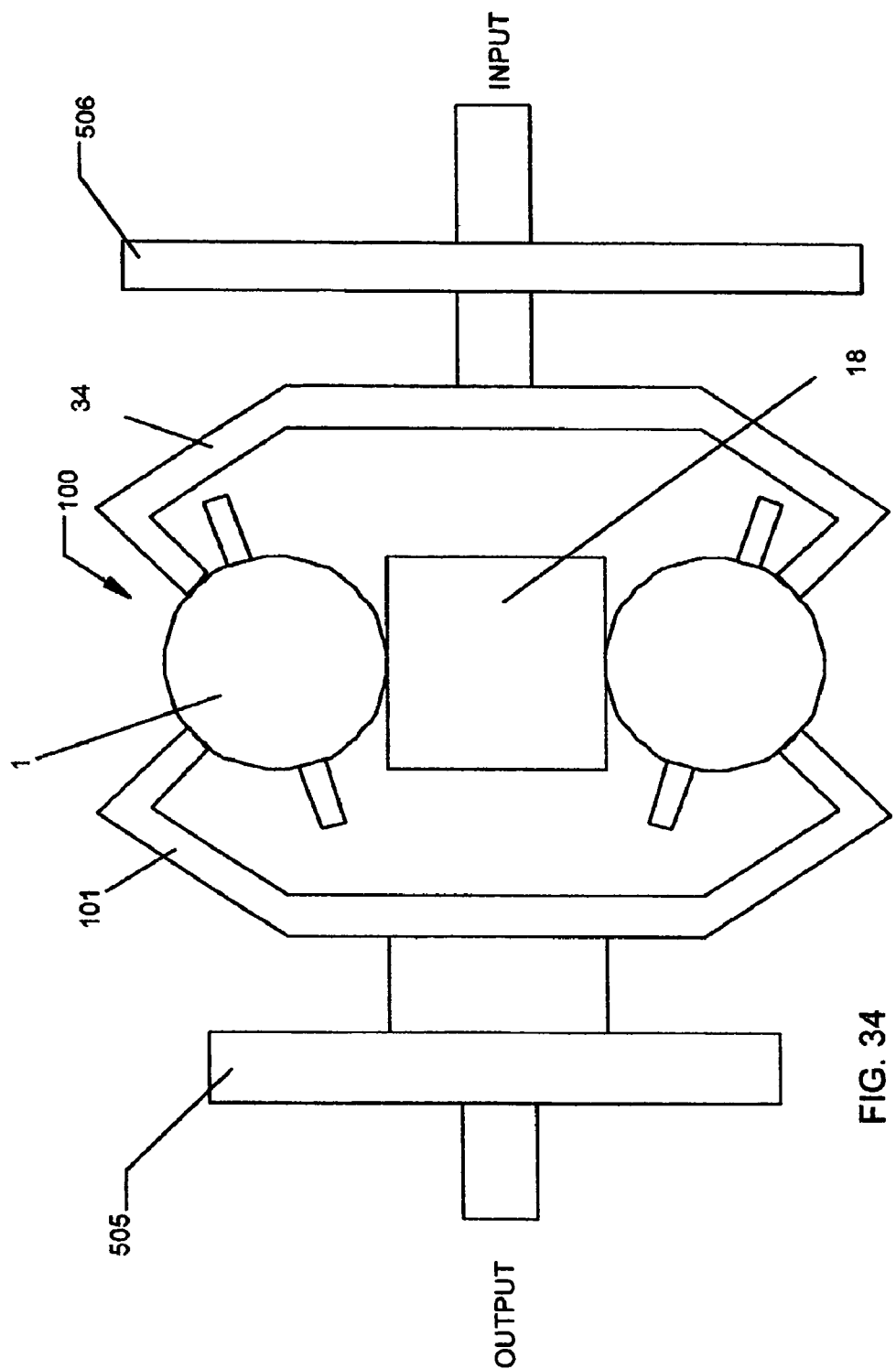
FIG. 34 is a schematic view of the transmission of FIG. 1 combined with a planetary gearset on the output side.

Referring now to the embodiment illustrated in FIG. 34, the parallel path can be eliminated due to the unique arrangement of the embodiments described herein. The parallel path is now combined into a collinear arrangement where various components of the CVT and the planetary gearset 505 are coupled to produce all of the combinations described above and below. In some embodiments, the planetary gearset 505 is coupled to the input of the CVT 100 or, as illustrated in FIG. 34, it can be coupled to the output of the CVT 100. The following table, titled "Input Coupled Dual Output Power paths" lists various combinations that are available where there are two outputs from the CVT 100 into the planetary gearset 505. The reference letters for the CVT 100 are the same as the previous table and the planetary gearset 505 reference letters represent the same components except for "I2," which is no longer coupled to the parallel path but is coupled to the second CVT 100 output.

Input Coupled Dual Output Power paths

| CVT | Planetary Gearset |
|---|---|
| I = Input | I1 = Coupled to CVT Output |
| O = Output | O = Output to vehicle/load |
| F = Fixed to ground | R = Free to Roll |
| R = Rolling (free) | I2 = Coupled to CVT output |

| Variator | Input Disc (34) | Idler (18) | Cage (89) | Output Disc (101) | Ring | Carrier | Sun |
|---|---|---|---|---|---|---|---|
| Single In/ Dual Out | I | O | F | O | I1 | I2 | O |
| | I | O | F | O | O | I1 | I2 |
| | I | O | F | O | I2 | O | I1 |
| | I | O | F | O | F | I1 | I2, O |
| | I | O | F | O | F | I2, O | I1 |
| | I | O | F | O | F | I2 | I1, O |
| | I | O | F | O | F | I1, O | I2 |
| Single In/ Dual Out | I | O | R | O | I1 | I2 | O |
| | I | O | R | O | O | I1 | I2 |
| | I | O | R | O | I2 | O | I1 |
| | I | O | R | O | F | I1 | I2, O |
| | I | O | R | O | F | I2, O | I1 |
| | I | O | R | O | F | I2 | I1, O |
| | I | O | R | O | F | I1, O | I2 |
| Single In/ Dual Out | I | R | O | O | I1 | I2 | O |
| | I | R | O | O | O | I1 | I2 |
| | I | R | O | O | I2 | O | I1 |
| | I | R | O | O | F | I1 | I2, O |
| | I | R | O | O | F | I2, O | I1 |
| | I | R | O | O | F | I2 | I1, O |
| | I | R | O | O | F | I1, O | I2 |
| Single In/ Dual Out | I | F | O | O | I1 | I2 | O |
| | I | F | O | O | O | I1 | I2 |
| | I | F | O | O | I2 | O | I1 |
| | I | F | O | O | F | I1 | I2, O |
| | I | F | O | O | F | I2, O | I1 |
| | I | F | O | O | F | I2 | I1, O |
| | I | F | O | O | F | I1, O | I2 |
| Single In/ Dual Out | I | O | O | F | I1 | I2 | O |
| | I | O | O | F | O | I1 | I2 |
| | I | O | O | F | I2 | O | I1 |
| | I | O | O | F | F | I1 | I2, O |
| | I | O | O | F | F | I2, O | I1 |
| | I | O | O | F | F | I2 | I1, O |
| | I | O | O | F | F | I1, O | I2 |

-continued

| Variator | Input Disc (34) | Idler (18) | Cage (89) | Output Disc (101) | Ring | Carrier | Sun |
|---|---|---|---|---|---|---|---|
| Single In/ Dual Out | I | O | O | R | I1 | I2 | O |
| | I | O | O | R | O | I1 | I2 |
| | I | O | O | R | I2 | O | I1 |
| | I | O | O | R | F | I1 | I2, O |
| | I | O | O | R | F | I2, O | I1 |
| | I | O | O | R | F | I2 | I1, O |
| | I | O | O | R | F | I1, O | I2 |
| Single In/ Dual Out | F | I | O | O | I1 | I2 | O |
| | F | I | O | O | O | I1 | I2 |
| | F | I | O | O | I2 | O | I1 |
| | F | I | O | O | F | I1 | I2, O |
| | F | I | O | O | F | I2, O | I1 |
| | F | I | O | O | F | I2 | I1, O |
| | F | I | O | O | F | I1, O | I2 |
| Single In/ Dual Out | R | I | O | O | I1 | I2 | O |
| | R | I | O | O | O | I1 | I2 |
| | R | I | O | O | I2 | O | I1 |
| | R | I | O | O | F | I1 | I2, O |
| | R | I | O | O | F | I2, O | I1 |
| | R | I | O | O | F | I2 | I1, O |
| | R | I | O | O | F | I1, O | I2 |
| Single In/ Dual Out | F | O | I | O | I1 | I2 | O |
| | F | O | I | O | O | I1 | I2 |
| | F | O | I | O | I2 | O | I1 |
| | F | O | I | O | F | I1 | I2, O |
| | F | O | I | O | F | I2, O | I1 |
| | F | O | I | O | F | I2 | I1, O |
| | F | O | I | O | F | I1, O | I2 |
| Single In/ Dual Out | R | O | I | O | I1 | I2 | O |
| | R | O | I | O | O | I1 | I2 |
| | R | O | I | O | I2 | O | I1 |
| | R | O | I | O | F | I1 | I2, O |
| | R | O | I | O | F | I2, O | I1 |
| | R | O | I | O | F | I2 | I1, O |
| | R | O | I | O | F | I1, O | I2 |

For the preceding two tables, the transmissions described could be inverted to provide an inverted result for each combination, but such reverse combinations are easily recognized and are not separately described herein for space considerations. For instance, for Output Coupled Dual Output, the inverse of Input Coupled/Dual Input, note that either planetary gearset 505 input could be coupled to either CVT 100 output.

Still referring to the embodiment illustrated in FIG. 34, the following table titled "Input Coupled Dual-Dual" provides various combinations available where there are two sources of torque input into the CVT 100 and two outputs from the CVT 100 into the planetary gearset 505.

Input Coupled Dual—Dual

| CVT | Planetary Gearset |
|---|---|
| I = Input | I1 = Coupled to CVT Output |
| O = Output | O = Output to vehicle/load |
| F = Fixed to ground | R = Free to Roll |
| R = Rolling (free) | I2 = Coupled to CVT output |

| Variator | Input Disc (34) | Idler (18) | Cage (89) | Output Disc (101) | Ring | Carrier | Sun |
|---|---|---|---|---|---|---|---|
| Dual In/ Dual Out | I | I | O | O | I1 | I2 | O |
| | I | I | O | O | O | I1 | I2 |
| | I | I | O | O | I2 | O | I1 |
| | I | I | O | O | F | I1 | I2, O |
| | I | I | O | O | F | I2, O | I1 |
| | I | I | O | O | F | I2 | I1, O |
| | I | I | O | O | F | I1, O | I2 |
| Dual In/ Dual Out | I | O | I | O | I1 | I2 | O |
| | I | O | I | O | O | I1 | I2 |
| | I | O | I | O | I2 | O | I1 |
| | I | O | I | O | F | I1 | I2, O |
| | I | O | I | O | F | I2, O | I1 |
| | I | O | I | O | F | I2 | I1, O |
| | I | O | I | O | F | I1, O | I2 |

Still referring to FIG. 34, the following table, titled "Internally Coupled Planetary on Output," provides many if not all of the combinations available when the planetary gearset 505 is coupled directly to components of the CVT 100. For the CVT 100, the reference letters "O1" indicate a component that is coupled to "I1" of the planetary gearset 505, "R" represents a component that is rolling free or a second input, "F" represents a component that is rigidly attached to a stationary component, such as a fixed casing or to a support structure for the transmission, and "O2" is coupled to "I2" of the planetary gearset 505. For the planetary gearset 505, "I1" refers to a component that is coupled to a first output component of the CVT 100, "O" refers to a component providing the output to a vehicle or other loaded device, "F" is fixed, and "I2" is coupled to a second CVT 100 output component. It should be noted that for the combinations illustrated in the following table, the input element could also be coupled to any one of the planetary elements with corresponding changes to the coupling arrangement of the other elements

Internally Coupled Planetary on Output

| CVT | Planetary Gearset |
|---|---|
| O1 = Coupled to Planetary I1 | I1 = Coupled to CVT Output |
| R = Rolling free or 2nd Input | O = Output to vehicle/load |
| F = Fixed to ground | F = Fixed to ground |
| O2 = Coupled to Planetary I2 | I2 = Coupled to Second CVT Output |

| Variator | Input Disc (34) | Idler (18) | Cage (89) | Output Disc (10) | Ring | Carrier | Sun |
|---|---|---|---|---|---|---|---|
| Single In/Dual Out | I | O1 | F | O2 | I1 | I2 | O |
| | I | O2 | F | O1 | I2 | I1 | O |
| | I | O1 | F | O2 | O | I1 | I2 |
| | I | O2 | F | O1 | O | I2 | I1 |
| | I | O1 | F | O2 | I2 | O | I1 |
| | I | O2 | F | O1 | I1 | O | I2 |
| | I | O1 | F | O2 | F | I1 | I2, O |
| | I | O2 | F | O1 | F | I2, O | I1 |
| | I | O1 | F | O2 | F | I2, O | I1 |
| | I | O2 | F | O1 | F | I1 | I2, O |
| | I | O1 | F | O2 | F | I2 | I1, O |
| | I | O2 | F | O1 | F | I1, O | I2 |
| | I | O1 | F | O2 | F | I1, O | I2 |
| | I | O2 | F | O1 | F | I2 | I1, O |
| Single In/Dual Out | I | O1 | R | O2 | I1 | I2 | O |
| | I | O2 | R | O1 | I2 | I1 | O |
| | I | O1 | R | O2 | O | I1 | I2 |
| | I | O2 | R | O1 | O | I2 | I1 |
| | I | O1 | R | O2 | I2 | O | I1 |
| | I | O2 | R | O1 | I1 | O | I2 |
| | I | O1 | R | O2 | F | I1 | I2, O |
| | I | O2 | R | O1 | F | I2, O | I1 |
| | I | O1 | R | O2 | F | I2, O | I1 |
| | I | O2 | R | O1 | F | I1 | I2, O |
| | I | O1 | R | O2 | F | I2 | I1, O |
| | I | O2 | R | O1 | F | I1, O | I2 |
| | I | O1 | R | O2 | F | I1, O | I2 |
| | I | O2 | R | O1 | F | I2 | I1, O |
| Single In/Dual Out | I | O1 | O2 | F | I1 | I2 | O |
| | I | O2 | O1 | F | I2 | I1 | O |
| | I | O1 | O2 | F | O | I1 | I2 |
| | I | O2 | O1 | F | O | I2 | I1 |
| | I | O1 | O2 | F | I2 | O | I1 |
| | I | O2 | O1 | F | I1 | O | I2 |
| | I | O1 | O2 | F | F | I1 | I2, O |
| | I | O2 | O1 | F | F | I2, O | I1 |
| | I | O1 | O2 | F | F | I2, O | I1 |
| | I | O2 | O1 | F | F | I1 | I2, O |
| | I | O1 | O2 | F | F | I2 | I1, O |
| | I | O2 | O1 | F | F | I1, O | I2 |
| | I | O1 | O2 | F | F | I1, O | I2 |
| | I | O2 | O1 | F | F | I2 | I1, O |
| Single In/Dual Out | I | O1 | O2 | R | I1 | I2 | O |
| | I | O2 | O1 | R | I2 | I1 | O |
| | I | O1 | O2 | R | O | I1 | I2 |
| | I | O2 | O1 | R | O | I2 | I1 |
| | I | O1 | O2 | R | I2 | O | I1 |
| | I | O2 | O1 | R | I1 | O | I2 |
| | I | O1 | O2 | R | F | I1 | I2, O |
| | I | O2 | O1 | R | F | I2, O | I1 |
| | I | O1 | O2 | R | F | I2, O | I1 |
| | I | O2 | O1 | R | F | I1 | I2, O |
| | I | O1 | O2 | R | F | I2 | I1, O |
| | I | O2 | O1 | R | F | I1, O | I2 |
| | I | O1 | O2 | R | F | I1, O | I2 |
| | I | O2 | O1 | R | F | I2 | I1, O |
| Single In/Dual Out | O1 | O2 | I | F | I1 | I2 | O |
| | O2 | O1 | I | F | I2 | I1 | O |
| | O1 | O2 | I | F | O | I1 | I2 |
| | O2 | O1 | I | F | O | I2 | I1 |
| | O1 | O2 | I | F | I2 | O | I1 |
| | O2 | O1 | I | F | I1 | O | I2 |
| | O1 | O2 | I | F | F | I1 | I2, O |
| | O2 | O1 | I | F | F | I2, O | I1 |
| | O1 | O2 | I | F | F | I2, O | I1 |
| | O2 | O1 | I | F | F | I1 | I2, O |
| | O1 | O2 | I | F | F | I2 | I1, O |
| | O2 | O1 | I | F | F | I1, O | I2 |
| | O1 | O2 | I | F | F | I1, O | I2 |
| | O2 | O1 | I | F | F | I2 | I1, O |
| Single In/Dual Out | O1 | O2 | I | R | I1 | I2 | O |
| | O2 | O1 | I | R | I2 | I1 | O |
| | O1 | O2 | I | R | O | I1 | I2 |
| | O2 | O1 | I | R | O | I2 | I1 |
| | O1 | O2 | I | R | I2 | O | I1 |
| | O2 | O1 | I | R | I1 | O | I2 |
| | O1 | O2 | I | R | F | I1 | I2, O |
| | O2 | O1 | I | R | F | I2, O | I1 |
| | O1 | O2 | I | R | F | I2, O | I1 |
| | O2 | O1 | I | R | F | I1 | I2, O |
| | O1 | O2 | I | R | F | I2 | I1, O |

-continued

| Variator | Input Disc (34) | Idler (18) | Cage (89) | Output Disc (10) | Ring | Carrier | Sun |
|---|---|---|---|---|---|---|---|
| | O2 | O1 | I | R | F | I1, O | I2 |
| | O1 | O2 | I | R | F | I1, O | I2 |
| | O2 | O1 | I | R | F | I2 | I1, O |
| Single In/Dual Out | I | F | O1 | O2 | I1 | I2 | O |
| | I | F | O2 | O1 | I2 | I1 | O |
| | I | F | O1 | O2 | O | I1 | I2 |
| | I | F | O2 | O1 | O | I2 | I1 |
| | I | F | O1 | O2 | I2 | O | I1 |
| | I | F | O2 | O1 | I1 | O | I2 |
| | I | F | O1 | O2 | F | I1 | I2, O |
| | I | F | O2 | O1 | F | I2, O | I1 |
| | I | F | O1 | O2 | F | I2, O | I1 |
| | I | F | O2 | O1 | F | I1 | I2, O |
| | I | F | O1 | O2 | F | I2 | I1, O |
| | I | F | O2 | O1 | F | I1, O | I2 |
| | I | F | O1 | O2 | F | I1, O | I2 |
| | I | F | O2 | O1 | F | I2 | I1, O |
| Single In/Dual Out | I | R | O1 | O2 | I1 | I2 | O |
| | I | R | O2 | O1 | I2 | I1 | O |
| | I | R | O1 | O2 | O | I1 | I2 |
| | I | R | O2 | O1 | O | I2 | I1 |
| | I | R | O1 | O2 | I2 | O | I1 |
| | I | R | O2 | O1 | I1 | O | I2 |
| | I | R | O1 | O2 | F | I1 | I2, O |
| | I | R | O2 | O1 | F | I2, O | I1 |
| | I | R | O1 | O2 | F | I2, O | I1 |
| | I | R | O2 | O1 | F | I1 | I2, O |
| | I | R | O1 | O2 | F | I2 | I1, O |
| | I | R | O2 | O1 | F | I1, O | I2 |
| | I | R | O1 | O2 | F | I1, O | I2 |
| | I | R | O2 | O1 | F | I2 | I1, O |
| Single In/Dual Out | F | O1 | I | O2 | I1 | I2 | O |
| | F | O2 | I | O1 | I2 | I1 | O |
| | F | O1 | I | O2 | O | I1 | I2 |
| | F | O2 | I | O1 | O | I2 | I1 |
| | F | O1 | I | O2 | I2 | O | I1 |
| | F | O2 | I | O1 | I1 | O | I2 |
| | F | O1 | I | O2 | F | I1 | I2, O |
| | F | O2 | I | O1 | F | I2, O | I1 |
| | F | O1 | I | O2 | F | I2, O | I1 |
| | F | O2 | I | O1 | F | I1 | I2, O |
| | F | O1 | I | O2 | F | I2 | I1, O |
| | F | O2 | I | O1 | F | I1, O | I2 |
| | F | O1 | I | O2 | F | I1, O | I2 |
| | F | O2 | I | O1 | F | I2 | I1, O |
| Single In/Dual Out | R | O1 | I | O2 | I1 | I2 | O |
| | R | O2 | I | O1 | I2 | I1 | O |
| | R | O1 | I | O2 | O | I1 | I2 |
| | R | O2 | I | O1 | O | I2 | I1 |
| | R | O1 | I | O2 | I2 | O | I1 |
| | R | O2 | I | O1 | I1 | O | I2 |
| | R | O1 | I | O2 | F | I1 | I2, O |
| | R | O2 | I | O1 | F | I2, O | I1 |
| | R | O1 | I | O2 | F | I2, O | I1 |
| | R | O2 | I | O1 | F | I1 | I2, O |
| | R | O1 | I | O2 | F | I2 | I1, O |
| | R | O2 | I | O1 | F | I1, O | I2 |
| | R | O1 | I | O2 | F | I1, O | I2 |
| | R | O2 | I | O1 | F | I2 | I1, O |

Figure 35:
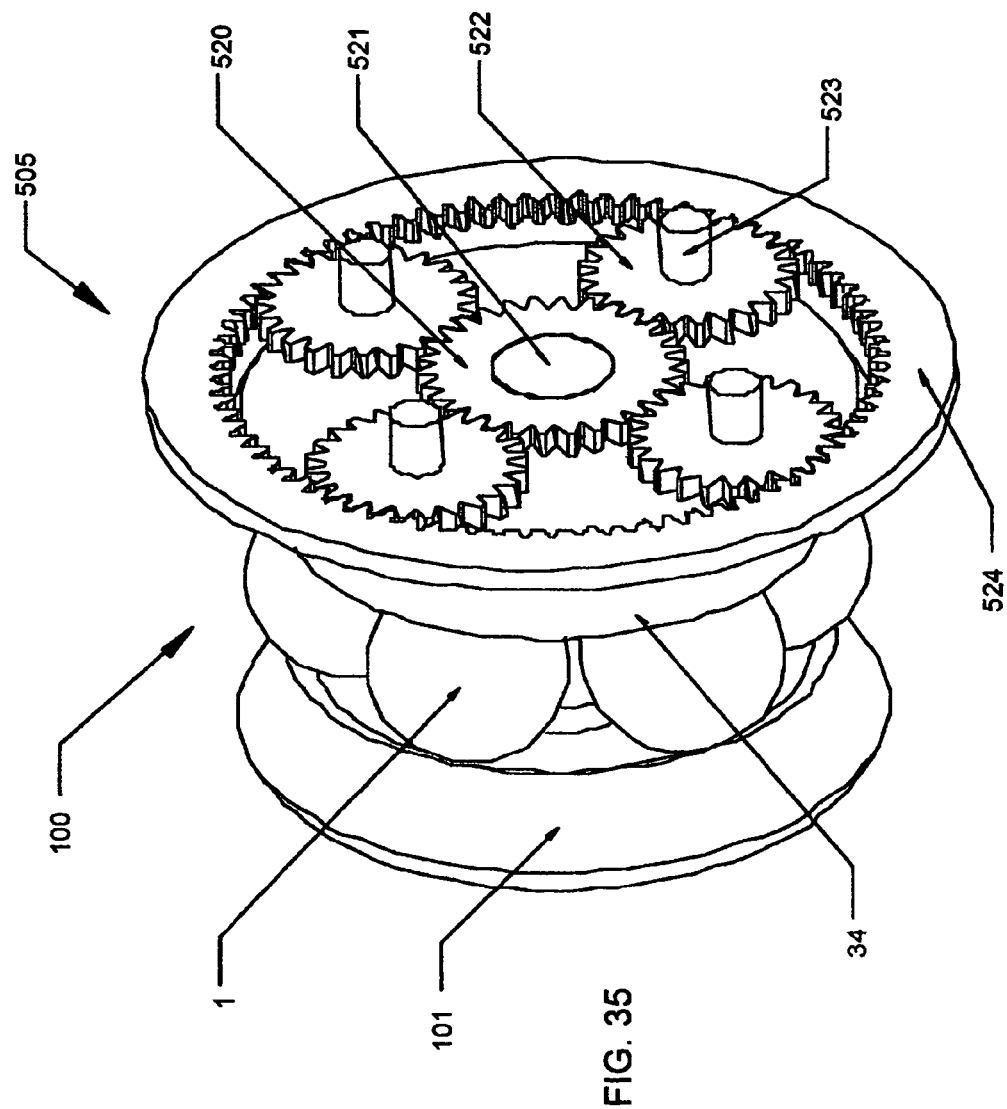
FIG. 35 is a schematic perspective view of the transmission of FIG. 1 combined with a planetary gearset on the input side.

FIG. 35 illustrates a perspective view of an embodiment of the transmission 100 combined with a planetary gearset 505 in an output-coupled arrangement. In this output-coupled arrangement, the parallel path is eliminated and one or more sources of input torque are coupled to the planetary gearset 505. The planetary gearset 505 then has one or two outputs coupled with corresponding one or two of the components of the CVT 100. For example, in one configuration, the ring gear 524 is rigidly attached to the case 40 (not shown), multiple planet gears 522 are operatively attached to the input disc 34 through their planet shafts 523, and the input is coupled to a planet carrier (not shown), which connects the planet shafts 523. The planet gears 522 rotate the sun gear 520 in this arrangement, and the sun gear 520 is also attached to a cage shaft 521, which rotates the cage 89 (not shown). The sun gear 520 rotates once each time the planet gears 522 orbit the sun gear 520 and it is also rotated further by the planet gears 522 rotating about their respective axes 523. Therefore, the sun gear 520 and the cage 89 (not shown) rotate faster than the planet carrier (not shown) and the input disc 34.

Due to the fact that the cage 89 is rotating faster than the input disc 34 in this configuration, the balls 1 rotate in the reverse direction of the input and the orientation of the variating components for the speed range of the CVT 100 is reversed; the orientation for low speed of other embodiments provides high speed here, and the orientation for high speed provides low speed here. As the idler 18 (not shown) moves toward the input side of the CVT 100, output speed can be decreased to zero and the output disc 101 will not rotate. In other words, this condition occurs when a transmission is fully engaged with a rotating input but the output does not rotate. Such a condition can be obtained by adjusting the tooth count of the planet gears 522 and sun gear 520. For example, if the sun gear 520 is twice the size of the planet gears 522, the sun gear 520 and the cage 89 will rotate at twice the speed of the planet carrier and the input disc 34. By increasing the cage 89 speed relative to the input disc 34 speed, a range can be produced where the output disc 101 rotates in reverse at one end of the shift range of the CVT 100, and where somewhere between this end and the midpoint of the shift range of the CVT 100, the output disc 101 speed is zero. The point in the shift range of the CVT 100 where the output disc 101 speed is zero can be plotted by dividing the speed of the sun gear 520 into the speed of the planet carrier, assuming that all other factors that determine the shift range that provides a zero output speed are constant.

The following table, titled "Internally Coupled Planetary on Input," shows most if not all of the combinations that can be achieved by varying the embodiment illustrated in FIG. 35. For reference to the components of the planetary gearset 505, "I1 refers to an output component that is coupled to a first CVT 100 input "I1," "I2" refers to a second output component that is coupled to a second CVT 100 input component "I2 ," and "F" refers to a component that is fixed for both the planetary gearset 505 and the CVT 100. For the CVT 100, "R" refers to a component that is either free to rotate or is a second output of torque. In this table and the preceding table, only the planetary ring gear is shown as fixed and any of the planetary elements could be the fixed element, which structure would result in more combinations. Such additional combinations are not shown herein to save space. Furthermore, in the table that follows, only one input from a prime mover (engine) is shown. This configuration has the capacity to accept two independent inputs thru the planetary, as in a parallel hybrid vehicle, but these combinations have not been illustrated separately in order to attempt to conserve space and it is understood that those in the art would apprehend these additional embodiments from the illustrated examples and this statement. It should also be noted that any configuration from the following table could be combined with any configuration from the preceding table, either with single or dual cavity CVTs, to produce a set of configurations using two planetaries, one on the input and one on the output.

Internally Coupled Planetary on Input

| Planetary Gearset | CVT |
|---|---|
| I1 = Coupled to CVT I1 | I1, I2 = Inputs from Planetary Gearset |
| IT = Coupled to Input Torque from prime mover | O = Output to vehicle or equipment |
| F = Fixed to ground | F = Fixed to ground |
| I2 = Coupled to CVT I2 | R = Rolling free or 2nd output |

| Variator | Ring | Carrier | Sun | Input Disc (34) | Idler (18) | Cage (89) | Output Disc (101) |
|---|---|---|---|---|---|---|---|
| Dual In/Single Out | I1 | I2 | IT | I1 | I2 | F | O |
| | I1 | I2 | IT | I2 | I1 | F | O |
| | IT | I1 | I2 | I1 | I2 | F | O |
| | IT | I1 | I2 | I2 | I1 | F | O |
| | I2 | IT | I1 | I1 | I2 | F | O |
| | I1 | IT | I2 | I2 | I1 | F | O |
| | F | I1 | I2, IT | I1 | I2 | F | O |
| | F | I2 | I2, IT | I2 | I1 | F | O |
| | F | I2, IT | I1 | I1 | I2 | F | O |
| | F | I2, IT | I2 | I2 | I1 | F | O |
| | F | I2 | I1, IT | I1 | I2 | F | O |
| | F | I2 | I1, IT | I2 | I1 | F | O |
| | F | I1, IT | I2 | I1 | I2 | F | O |
| | F | I1, IT | I2 | I2 | I1 | F | O |
| Dual In/Single Out | I1 | I2 | IT | I1 | I2 | R | O |
| | I1 | I2 | IT | I2 | I1 | R | O |
| | IT | I1 | I2 | I1 | I2 | R | O |
| | IT | I1 | I2 | I2 | I1 | R | O |
| | I2 | IT | I1 | I1 | I2 | R | O |
| | I1 | IT | I2 | I2 | I1 | R | O |
| | F | I1 | I2, IT | I1 | I2 | R | O |
| | F | I2 | I2, IT | I2 | I1 | R | O |
| | F | I2, IT | I1 | I1 | I2 | R | O |
| | F | I2, IT | I2 | I2 | I1 | R | O |
| | F | I2 | I1, IT | I1 | I2 | R | O |
| | F | I2 | I1, IT | I2 | I1 | R | O |
| | F | I1, IT | I2 | I1 | I2 | R | O |
| | F | I1, IT | I2 | I2 | I1 | R | O |
| Dual In/Single Out | I1 | I2 | IT | I1 | I2 | O | F |
| | I1 | I2 | IT | I2 | I1 | O | F |
| | IT | I1 | I2 | I1 | I2 | O | F |
| | IT | I1 | I2 | I2 | I1 | O | F |
| | I2 | IT | I1 | I1 | I2 | O | F |
| | I1 | IT | I2 | I2 | I1 | O | F |
| | F | I1 | I2, IT | I1 | I2 | O | F |
| | F | I2 | I2, IT | I2 | I1 | O | F |
| | F | I2, IT | I1 | I1 | I2 | O | F |
| | F | I2, IT | I2 | I2 | I1 | O | F |
| | F | I2 | I1, IT | I1 | I2 | O | F |
| | F | I2 | I1, IT | I2 | I1 | O | F |
| | F | I1, IT | I2 | I1 | I2 | O | F |
| | F | I1, IT | I2 | I2 | I1 | O | F |
| Dual In/Single Out | I1 | I2 | IT | I1 | I2 | O | R |
| | I1 | I2 | IT | I2 | I1 | O | R |
| | IT | I1 | I2 | I1 | I2 | O | R |
| | IT | I1 | I2 | I2 | I1 | O | R |
| | I2 | IT | I1 | I1 | I2 | O | R |
| | I1 | IT | I2 | I2 | I1 | O | R |
| | F | I1 | I2, IT | I1 | I2 | O | R |
| | F | I2 | I2, IT | I2 | I1 | O | R |
| | F | I2, IT | I1 | I1 | I2 | O | R |
| | F | I2, IT | I2 | I2 | I1 | O | R |
| | F | I2 | I1, IT | I1 | I2 | O | R |
| | F | I2 | I1, IT | I2 | I1 | O | R |
| | F | I1, IT | I2 | I1 | I2 | O | R |
| | F | I1, IT | I2 | I2 | I1 | O | R |
| Dual In/Single Out | I1 | I2 | IT | I1 | O | I2 | F |
| | I1 | I2 | IT | I2 | O | I1 | F |
| | IT | I1 | I2 | I1 | O | I2 | F |
| | IT | I1 | I2 | I2 | O | I1 | F |
| | I2 | IT | I1 | I1 | O | I2 | F |
| | I1 | IT | I2 | I2 | O | I1 | F |
| | F | I1 | I2, IT | I1 | O | I2 | F |
| | F | I2 | I2, IT | I2 | O | I1 | F |
| | F | I2, IT | I1 | I1 | O | I2 | F |
| | F | I2, IT | I2 | I2 | O | I1 | F |
| | F | I2 | I1, IT | I1 | O | I2 | F |
| | F | I2 | I1, IT | I2 | O | I1 | F |
| | F | I1, IT | I2 | I1 | O | I2 | F |
| | F | I1, IT | I2 | I2 | O | I1 | F |
| Dual In/Single Out | I1 | I2 | IT | I1 | O | I2 | R |
| | I1 | I2 | IT | I2 | O | I1 | R |
| | IT | I1 | I2 | I1 | O | I2 | R |
| | IT | I1 | I2 | I2 | O | I1 | R |
| | I2 | IT | I1 | I1 | O | I2 | R |
| | I1 | IT | I2 | I2 | O | I1 | R |
| | F | I1 | I2, IT | I1 | O | I2 | R |
| | F | I2 | I2, IT | I2 | O | I1 | R |
| | F | I2, IT | I1 | I1 | O | I2 | R |
| | F | I2, IT | I2 | I2 | O | I1 | R |
| | F | I2 | I1, IT | I1 | O | I2 | R |
| | F | I2 | I1, IT | I2 | O | I1 | R |
| | F | I1, IT | I2 | I1 | O | I2 | R |
| | F | I1, IT | I2 | I2 | O | I1 | R |
| Dual In/Single Out | I1 | I2 | IT | I1 | F | I2 | O |
| | I1 | I2 | IT | I2 | F | I1 | O |
| | IT | I1 | I2 | I1 | F | I2 | O |
| | IT | I1 | I2 | I2 | F | I1 | O |
| | I2 | IT | I1 | I1 | F | I2 | O |
| | I1 | IT | I2 | I2 | F | I1 | O |
| | F | I1 | I2, IT | I1 | F | I2 | O |
| | F | I2 | I2, IT | I2 | F | I1 | O |
| | F | I2, IT | I1 | I1 | F | I2 | O |
| | F | I2, IT | I2 | I2 | F | I1 | O |
| | F | I2 | I1, IT | I1 | F | I2 | O |
| | F | I2 | I1, IT | I2 | F | I1 | O |
| | F | I1, IT | I2 | I1 | F | I2 | O |
| | F | I1, IT | I2 | I2 | F | I1 | O |
| Dual In/Single Out | I1 | I2 | IT | I1 | R | I2 | O |
| | I1 | I2 | IT | I2 | R | I1 | O |
| | IT | I1 | I2 | I1 | R | I2 | O |
| | IT | I1 | I2 | I2 | R | I1 | O |
| | I2 | IT | I1 | I1 | R | I2 | O |
| | I1 | IT | I2 | I2 | R | I1 | O |
| | F | I1 | I2, IT | I1 | R | I2 | O |
| | F | I2 | I2, IT | I2 | R | I1 | O |
| | F | I2, IT | I1 | I1 | R | I2 | O |
| | F | I2, IT | I2 | I2 | R | I1 | O |
| | F | I2 | I1, IT | I1 | R | I2 | O |
| | F | I2 | I1, IT | I2 | R | I1 | O |
| | F | I1, IT | I2 | I1 | R | I2 | O |
| | F | I1, IT | I2 | I2 | R | I1 | O |

-continued

| Variator | Ring | Carrier | Sun | Input Disc (34) | Idler (18) | Cage (89) | Output Disc (101) |
|---|---|---|---|---|---|---|---|
| Dual In/Single Out | I1 | I2 | IT | F | I1 | I2 | O |
|  | I1 | I2 | IT | F | I2 | I1 | O |
|  | IT | I1 | I2 | F | I1 | I2 | O |
|  | IT | I1 | I2 | F | I2 | I1 | O |
|  | I2 | IT | I1 | F | I1 | I2 | O |
|  | I1 | IT | I2 | F | I2 | I1 | O |
|  | F | I1 | I2, IT | F | I1 | I2 | O |
|  | F | I2 | I2, IT | F | I2 | I1 | O |
|  | F | I2, IT | I1 | F | I1 | I2 | O |
|  | F | I2, IT | I2 | F | I2 | I1 | O |
|  | F | I2 | I1, IT | F | I1 | I2 | O |
|  | F | I2 | I1, IT | F | I2 | I1 | O |
|  | F | I1, IT | I2 | F | I1 | I2 | O |
|  | F | I1, IT | I2 | F | I2 | I1 | O |
| Dual In/Single Out | I1 | I2 | IT | R | I1 | I2 | O |
|  | I1 | I2 | IT | R | I2 | I1 | O |
|  | IT | I1 | I2 | R | I1 | I2 | O |
|  | IT | I1 | I2 | R | I2 | I1 | O |
|  | I2 | IT | I1 | R | I1 | I2 | O |
|  | I1 | IT | I2 | R | I2 | I1 | O |
|  | F | I1 | I2, IT | R | I1 | I2 | O |
|  | F | I2 | I2, IT | R | I2 | I1 | O |
|  | F | I2, IT | I1 | R | I1 | I2 | O |
|  | F | I2, IT | I2 | R | I2 | I1 | O |
|  | F | I2 | I1, IT | R | I1 | I2 | O |
|  | F | I2 | I1, IT | R | I2 | I1 | O |
|  | F | I1, IT | I2 | R | I1 | I2 | O |
|  | F | I1, IT | I2 | R | I2 | I1 | O |

In the preceding tables, it is assumed that only one CVT 100 and only one planetary gearset 505 are being utilized. It is known in the art to utilize more planetary gearsets to develop additional combinations. Due to the fact that the CVT 100 described in the tables can be implemented in a similar manner to a planetary gearset, it is easy for those of skill in the art to combine the CVT 100 with a planetary gearset on both its input and output ends in order to create substantially more combinations, which combinations are known in the art and cannot reasonably be listed herein. However, such combinations are fully within the capabilities of those of skill in the art and are also to be considered as part of this description.

EXAMPLES

Figure 36A:
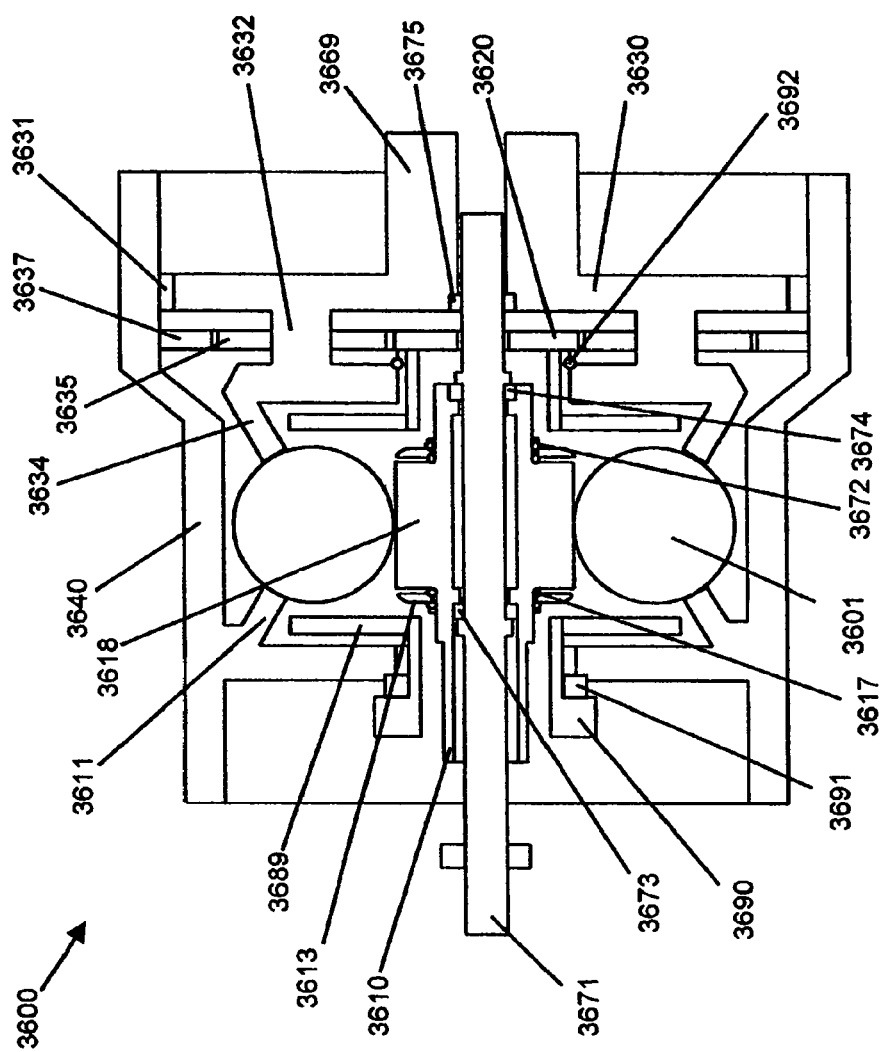
FIGS. 36a, b, and c are a cross-sectional side view, a perspective endview, and a schematic skeleton diagram, respecitvely, of an embodiment of an infinitely variable transmission utilizing one torque input and providing two sources of torque output.

Each of these variations may have advantageous characteristics for particular applications. The variations can be modified and controlled as necessary to achieve the goals for any particular application. Specific embodiments will now be described and illustrated that employ some of the variations described herein and/or listed in the above tables. FIGS. 36*a*, *b*, and *c* illustrate one embodiment of a transmission 3600 that is a variation having one source of torque input and that supplies two sources of torque output. As before, only the significant differences between the embodiment illustrated in FIGS. 36*a*, *b* and *c* and the previously illustrated and described embodiments will be described. Furthermore, the components illustrated are being provided to illustrate to one of skill in the art how to provide power paths and torque output sources that have not been previously illustrated. It is fully understood that many additional components can and will be utilized for operational embodiments, however for simplification of the drawing, many such components have been omitted or are represented schematically as boxes.

Referring to FIG. 36*a*, Torque is input through a drive shaft 3669 as in previously described embodiments. The drive shaft 3669 of this embodiment is a hollow shaft having two ends and engaging on a first end whatever prime mover is providing torque to the transmission 3600 and engaging at the second end a planet carrier 3630. The planet carrier 3630 is a disc positioned coaxial with the longitudinal axis of the transmission 3600 that interfaces at its center with the drive shaft 3669 and extends radially to a radius near that of the inner side of the case 3640 of the transmission 3600. In this embodiment, the case 3640 is stationary and is fixed to some supporting structure of the vehicle or equipment upon which it is utilized. A radial carrier bearing 3631 is located between the inner surface of the case 3640 and the outer edge of the planet carrier 3630. The carrier bearing 3631 of some embodiments is a radial bearing that provides radial support to the planet carrier 3630. In other embodiments, the carrier bearing 3631 is a compound bearing providing both radial and axial support to the planet carrier preventing cocking as well as radial or axial movement.

A plurality of planet shafts 3632 extend from the planet carrier 3630 from a radial position between the center and the outer edge of the planet carrier 3630. The planet shafts 3632 extend axially toward the output end of the transmission 3600 and are generally cylindrical shafts that connect the planet carrier 3630 to the input disc 3634 and each form an axis about which a respective planet gear 3635 rotates. The planet shafts 3632 can be formed into the input side of the input disc 3634 or the planet carrier 3630 or can be threaded into either the input disc 3634 or the planet carrier or can be attached by fasteners or otherwise. The planet gears 3635 are simple rotary gears that are supported by and rotate about the planet shafts 3632 and many embodiments utilize bearings between the planet gears 3635 and the planet shafts 3632. They can have straight teeth or helical teeth, however where helical gears are used, thrust bearings are used to absorb the axial thrust developed by the transmission of torque by the planet gears 3635.

Still referring to the embodiment illustrated in FIG. 36*a*, the planet gears 3635 engage at two areas along their respective circumferences at any one time as they rotate about their respective axes. At a first circumferential position located farthest away from the longitudinal axis of the transmission 36, each planet gear 3635 engages a ring gear 3637. The ring gear 3637 is an internal gear formed on or attached to the inner surface of the case 3640. In some embodiments, the ring gear 3637 is a set of radial teeth formed on the inner surface of the ring gear 3637 and extending radially inward such that the planet gears 3635 can engage with its teeth and ride along the inner surface of the ring gear 3637 as they orbit the longitudinal axis of the transmission 3600. At a circumferential point of the planet gears 3635 generally opposite the radially outward most part, the ring gears 3635 engage a sun gear 3620. The sun gear 3620 is a radial gear that is mounted coaxially about the longitudinal axis of the transmission 3600 at the center of the planet gears 3635 and engages all of the planet gears 3635. As the planet carrier 3630 rotates the planet gears 3635 about the sun gear 3620, the planet gears 3635 are rotated about their respective planet shafts 3632 by their engagement with the ring gear 3637 and therefore both orbit the sun gear 3620 and rotate on their own shafts as they orbit. This results in a rotational energy that is transmitted to the sun gear 3620 that is at a greater speed than the speed input by the drive shaft 3669.

In the embodiment illustrated in FIG. 36*a*, the drive shaft 3669 also drives the input disc 3634 via the planet carrier 3630 and the planet shafts 3632. However, the planet gears 3635 also drive the sun gear 3620 so that the power from the planet carrier is distributed to the input disc 3634 and the sun gear 3620. The sun gear 3620 is rigidly connected to and rotates the cage 3689 of this embodiment. The cage 3689 is similar to the embodiments described above, and therefore not all of the components have been illustrated to simplify the drawing and improve the understanding of this description. The cage 3689, as in other embodiments, positions the balls 3601 about the longitudinal axis of the transmission 3600 and because the cage 3689 of this embodiment rotates about its axis, it causes the balls 3601 to orbit the longitudinal axis of the transmission 3600. The input disc 3634, which is similar to those described above provides an input torque to the balls 3601 in the same manner as in previous embodiments. However the sun gear 3620 also provides an input torque to the balls 3601 by rotating the cage 3689, which is added to the input from the input disc 3634. In this embodiment, the output disc 3611 is rigidly fixed to the case 3640 and does not rotate about its axis. Therefore, the balls 3601 roll along the surface of the output disc 3611 as they orbit the longitudinal axis of the transmission 3600 and rotate about their respective axes.

Figure 36B:
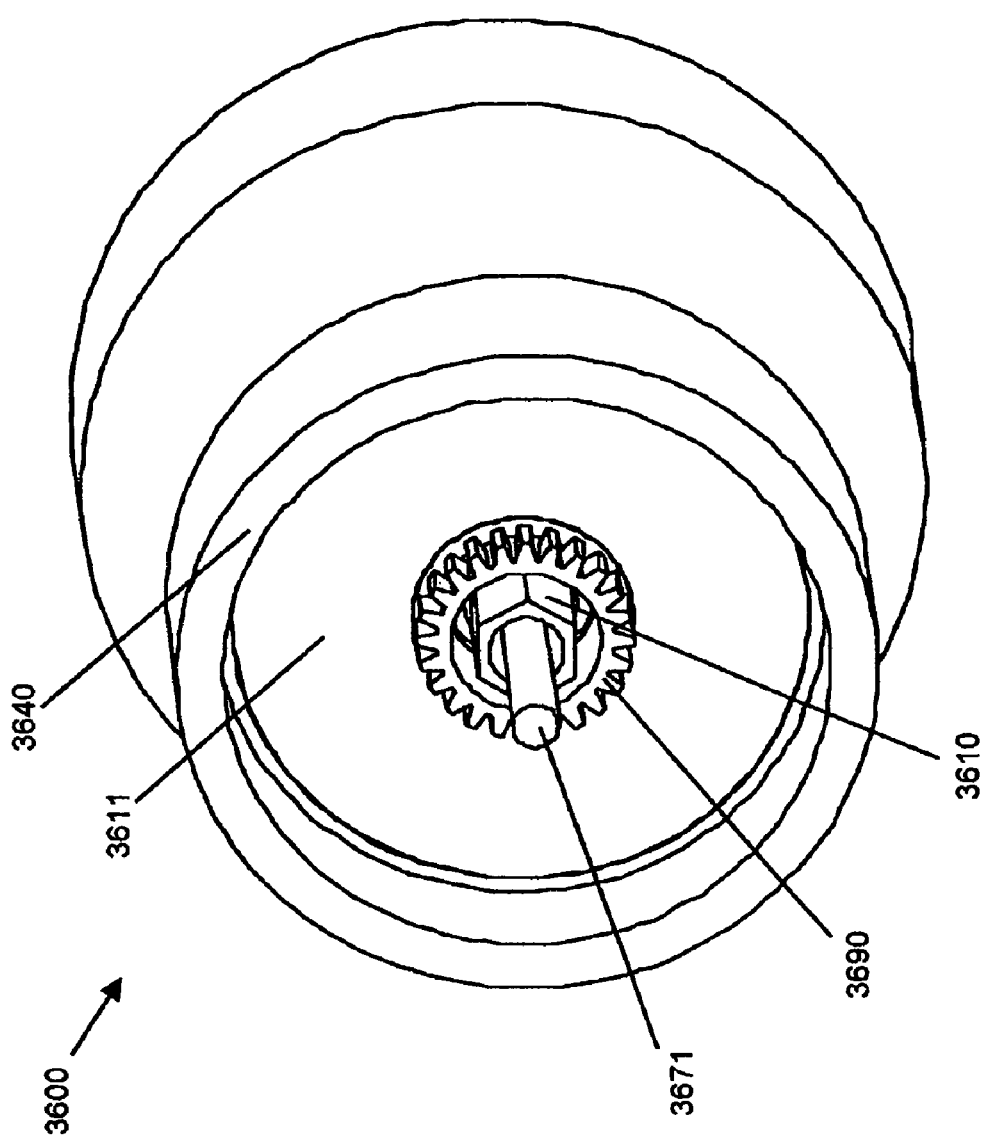

The balls 3601 cause the idler 3618 to rotate about its axis as in other embodiments, however in this embodiment, the idler 3618 includes an idler shaft 3610 that extends out beyond the whole formed by the inner diameter of the output disc 3611. The balls 3601 drive the idler 3618, which in turn drives the idler shaft 3610, which provides the first torque output from the transmission 3600. As illustrated in FIG. 36b, the idler shaft 3610 can be of a cross-sectional shape that lends itself to easier coupling with devices that would take power from the idler shaft 3610 and in some embodiments, as illustrated, the shape is hexagonal, although any such shape can be used. It is noted that due to axial movement of the idler 3618 during shifting as described below, the idler shaft 3610 moves axially during shifting of the transmission 3600. This means that the couple between the idler shaft 3610 and the output device (not shown) of this design allows for axial motion of the idler shaft 3618. This can be accomplished by allowing a slightly larger output device shaft such that the idler shaft 3610 is free to move within the output device, or by the use of a splined output idler shaft 3610, such as by ball spline. Alternatively the idler 3618 can be splined to the idler shaft 3610 in order to maintain the axial position of the idler shaft 3610.

Still referring to FIGS. 36a and 36b, the cage 3689 can provide an output power source as well. As illustrated, the cage 3689 can be connected on its inner diameter on the output side to a cage shaft 3690. In the illustrated embodiment, the cage shaft 3690 is formed at its end into an output gear or spline to engage and supply power as a second output source.

As illustrated in FIG. 36a, various bearings can be implemented to maintain the axial and radial position of various components in the transmission 3600. The cage 3689 can be supported in its place by cage output bearings 3691, which are either radial bearings to provide radial support or are preferably combination bearings to maintain both axial and radial position of the cage with respect to the case 3640. The cage output bearings 3691 are assisted by cage input bearings 3692 which are also radial or preferably combination radial-thrust bearings and position the cage 3689 relative to the input disc 3634. In embodiments utilizing an axial force generator where the input disc 3634 is subject to slight axial movement or deformation, the cage input bearings 3692 are designed to allow for such movement by any mechanism known in the industry. One embodiment utilizes an outer bearing race that is splined to the inner diameter of the input disc 3634, by a ball spline for example, in order that the input disc 3634 can move axially slightly relative to the outer race of the cage input bearing 3692.

The shifting mechanism of the embodiment illustrated in FIG. 36a is slightly varied from the embodiments illustrated to allow for the output torque supplied by the idler 3618. In this embodiment, the idler 3618 initiates the shifting by being moved axially upon actuation by the shift rod 3671 and in turn moves the shift guides 3613 axially causing the shifting mechanism to change the axes of the balls 3601 as described above. The shift rod 3671 does not thread into the idler 3618 in this embodiment, however and only contacts the idler 3618 via idler input bearings 3674 and idler output bearings 3673. The idler input and output bearings 3674, 3673, respectively, are combination thrust and radial bearings that position the idler 3618 both radially and axially along the longitudinal axis of the transmission 3600.

When the shift rod 3671 is moved axially toward the output end, the input idler bearing 3674 apply axial force to the idler, thereby moving the idler axially to the output end and initiating a change in the transmission ratio. The shift rod 3671 of the illustrated embodiment extends beyond the idler 3618 through an inner diameter formed in the center of the sun gear 3620 and into the second end of the drive shaft 3669 where it is held in radial alignment within the drive shaft 3669 by an idler end bearing 3675. The shift rod 3671 moves axially within the drive shaft 3669 however and therefore the idler end bearing 3675 of many embodiments allows for this motion. As described before, many such embodiments utilize a splined outer race that engages a mating spline formed on the inner surface of the drive shaft 3669. This splined race allows the race to slide along the inner surface of the drive shaft 3669 as the shift rod 3671 is moved axially back and forth and still provides the radial support used to assist in radially aligning the shift rod 3671. The inner bore of the sun gear 3620 can also be supported radially with respect to the shift rod 3671 by a bearing (not illustrated) located between the shift rod 3671 and the sun gear 3620. Again either the inner or outer race could be splined to allow for the axial motion of the shift rod 3671.

When the idler 3618 of the embodiment illustrated in FIG. 36a is moved axially to shift the transmission 3600, the idler 3618 moves the shift guides 3613. In the illustrated embodiment, the shift guides 3613 are annular rings coaxially mounted about each end of the idler 3618. The illustrated shift guides 3613 are each held in radial and axial position by an inner shift guide bearing 3617 and an outer shift guide bearing 3672. The inner and outer shift guide bearings of this embodiment are combination bearings providing both axial and radial support to the shift guides 3613 in order to maintain the axial and radial alignment of the shift guides 3613 in relation to the idler 3618. Each of the shift guides 3613 can have a tubular sleeve (not shown) that extends away from the idler 3618 so that the shift guide bearings 3617 and 3672 can be further apart to provide additional support to the shift guides 3613, as needed. The shift rod 3671 can be moved axially by any known mechanism for causing axial motion such as an acme threaded end acting as a lead screw or a hydraulically actuated piston or other know mechanisms.

Figure 36C:
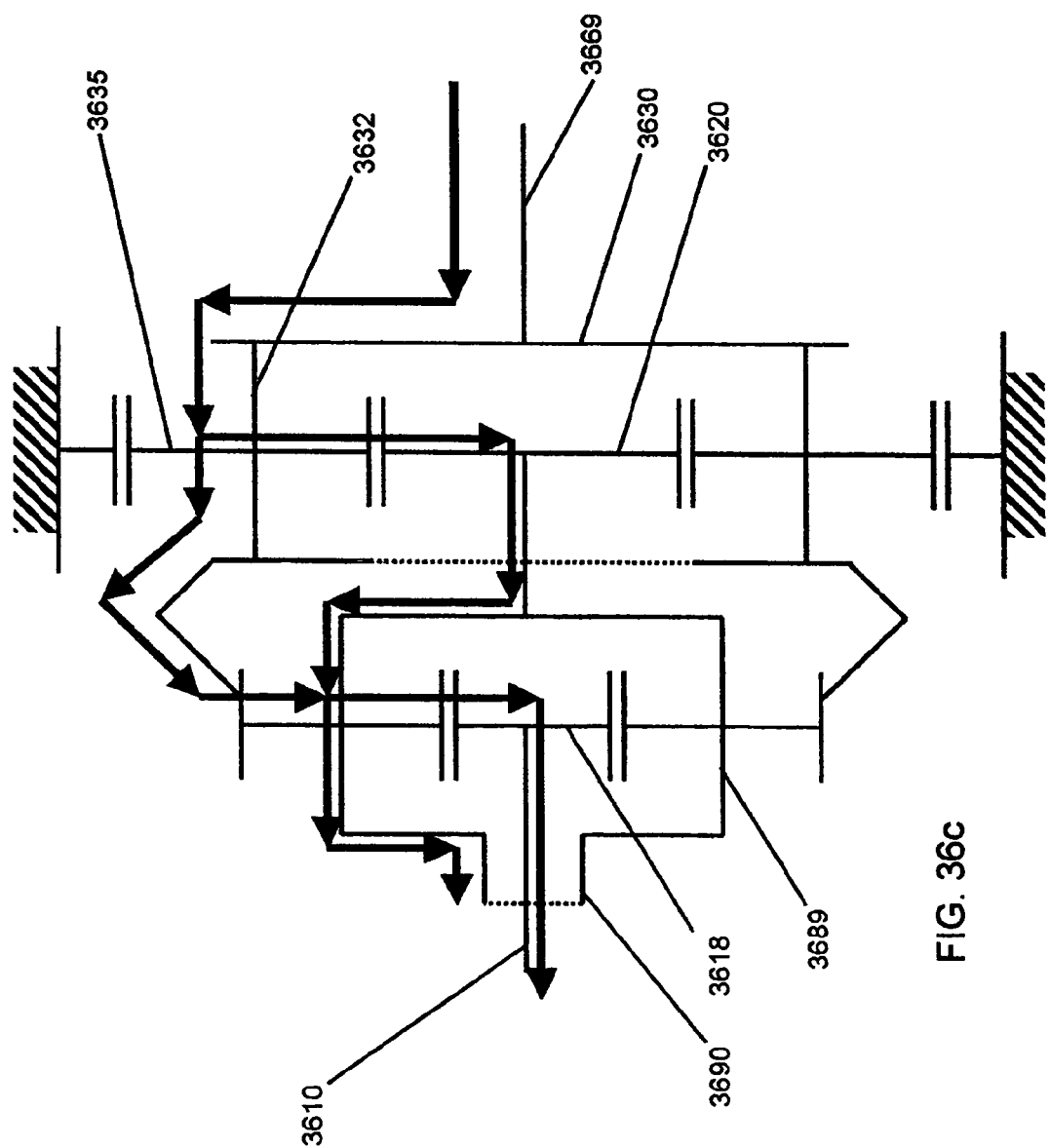

Referring to FIGS. 36a and b and mainly to FIG. 36c, the paths of power through the transmission 3600 follow to parallel and coaxial paths. Initially, power enters the transmission 3600 via the drive shaft 3669. The power is then split and transmitted through the planet carrier 3630 both to the input disc 3634 and to the sun gear 3620 via the planet gears 3635. The latter power path is then transmitted from the sun gear 3620 to the cage 3689 and out of the transmission 3600 via the cage shaft 3689. This power path provides a fixed transmission ratio from the drive shaft based upon the dimensions of the sun gear 3620 and the planet gears 3635. The second power path is from the planet carrier 3630 through the planet shafts 3632 and to the input disc 3634. This power path continues from the input disc 3634 to the balls 3601 and from the balls 3601 to the idler shaft 3618 and out of the transmission 3600 through the idler shaft 3610. This unique arrangement allows the two power paths to be transmitted through the transmission 3600 not only in parallel paths but through coaxial paths. This type of power transmission allows for a smaller cross-sectional size for the same torque transmission and leads to significant size and weight reductions into a much simpler design compared to other IVTs.

The embodiment illustrated in FIGS. 36a, b and c, illustrates to one of skill in the art how the idler 3618 can be used as a power output as listed in the tables above and how to combine the planetary gear set with the CVT as described above. It is expected that variations of this design can be utilized while achieving the various combinations described, and such alternate designs cannot all be illustrated herein due to the overwhelming number of combinations listed that are available. It is also understood that the axial force generators provided herein can also be utilized with this embodiment, but for simplification these devices are not illustrated. For embodiments utilizing one of the axial force generators described herein, or another, it is expected that the components of the axial force generator can be implemented between where the planet shafts 3632 connect to the input disc 3634, although other arrangements can be employed as well. In such embodiments, the parallel path described in FIGS. 32 and 33 is moved in to be coaxial with the axis of the transmission 3600 allowing for a much smaller transmission 3600 for the same torque transmission and thereby leading to reduced weight and space of such embodiments. FIGS. 36a, b and c illustrate one combination in order to show how rotational power might be taken from the various components of the transmission in various embodiments. Obviously, those of skill in the art will easily understand how other configurations provided herein can be achieved by varying the connections, and it would be unnecessarily burdensome and voluminous to illustrate all or even more combinations for the simple purpose of illustrating the combinations described. The embodiments shown in FIGS. 35 and 36a can therefore be modified as necessary to produce any of the variations listed above or below without the need for a separate non-coaxial parallel power path.

Figure 37A:
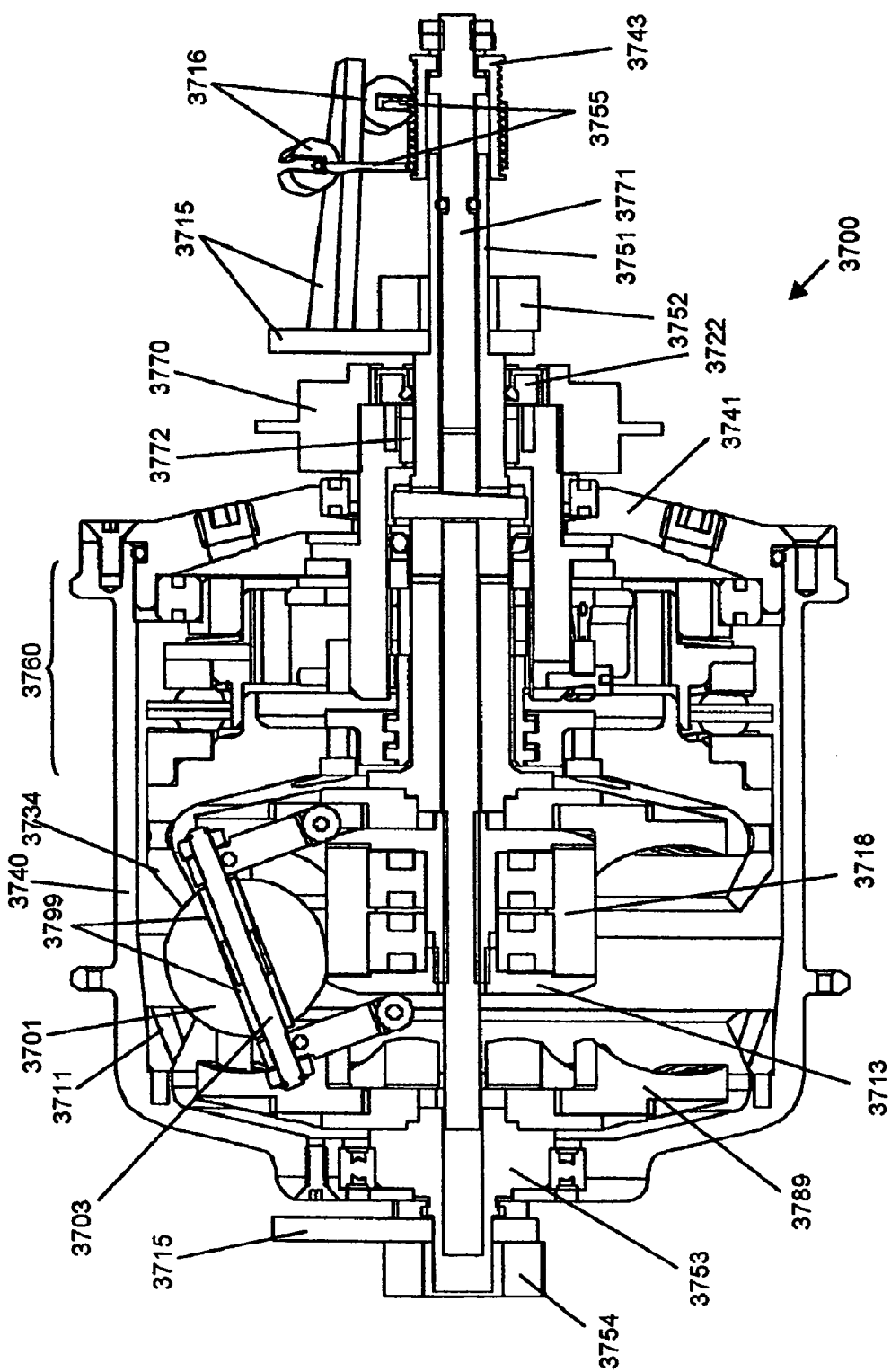
FIG. 37a is a cross-sectional side view of an alternative embodiment of a continuously variable transmission where the output disc is part of a rotating hub.

Referring now to FIG. 37a, an alternative embodiment of a transmission 3700 is illustrated. In this embodiment, the output disc 3711 is formed as part of the case of previous embodiments to form a rotating hub shell 3740. Such an embodiment is suited well for applications such as motorcycles or a bicycle. As mentioned before, only the substantial differences between this embodiment and the previously described embodiments will be described in order to reduce the size of this description. In this embodiment, the input torque is supplied to an input wheel 3730, which can be a pulley for a belt or a sprocket for a chain or some similar device. The input wheel 3770 is then attached to the outside of a hollow drive shaft 3769 by press fitting or splining or some other suitable method of maintaining angular alignment of the two rotary components. The drive shaft 3769 passes through a removable end of the hub shell 3740 called the end cap 3741. The end cap is generally an annularly shaped disc having a bore through its center to allow passage of the drive shaft 3769 into the inside of the transmission 3700 and having an outer diameter that mates with the inner diameter of the hub shell 3740. The end cap 3741 can be fastened to the end cap 3740 or it can be threaded into the hub shell to encapsulate the inner components of the transmission 3700. The end cap 3741 of the illustrated embodiment has a bearing surface and corresponding bearing on the inside of its outer diameter for positioning and supporting the axial force generator 3760 and has a bearing surface and corresponding bearing at its inner diameter that provides support between the end cap 3741 and the drive shaft 3769.

The drive shaft 3769 fits over and rotates about an input axle 3751, which is a hollow tube that is anchored to the vehicle frame 3715 by a frame nut 3752 and that provides support for the transmission 3700. The input axle 3751 contains the shift rod 3771, which is similar to the shift rods described in previous embodiments, such as that illustrated in FIG. 1. The shift rod 3771 of this embodiment is actuated by a shift cap 3743 threaded over the end of the input axle 3751 that extends beyond the vehicle frame 3715. The shift cap 3743 is a tubular cap with a set of internal threads formed on its inner surface that mate with a complimentary set of external threads formed on the outer surface of the input axle 3751. The end of the shift rod 3771 extends through a hole formed in the input end of the shift cap 3743 and is itself threaded allowing the shift cap 3743 to be fastened to the shift rod 3771. By rotating the shift rod 3771 its threads, which may be acme threads or any other threads, cause it to move axially and because the shift rod 3771 is fastened to the shift cap 3743, the shift rod 3771 is moved axially as well, actuating the movement of the shift guides 3713 and the idler 3718, thereby shifting the transmission 3700.

Still referring to the embodiment illustrated in FIG. 37a, the drive shaft 3769 rides on and is supported by the input axle 3751 and one or more shaft support bearings 3772, which can be needle bearings or other radial support bearings. The drive shaft 3769 provides torque to an axial force generator 3760 as in previous embodiments. Any of the axial force generators described herein can be used with this transmission 3700, and this embodiment utilizes a screw 3735 that is driven by the drive shaft 3769 by splining or other suitable mechanism that distributes torque to the drive disc 3734 and to a bearing disc 3760, as in the previous embodiments. In this embodiment, a drive seal 3722 is provided between the inner diameter of the input wheel 3770 and the outer diameter of the input axle 3751 beyond the end of the drive shaft 3769 in order to limit the amount of foreign material that is admitted to the inside of the transmission 3700. Another seal (not shown) can be used between the case cap 3742 and the input wheel to limit foreign particle infiltration from between the end cap 3741 and the drive shaft 3769. The drive seal 3722 can be an o-ring seal, a lip seal or any other suitable seal. The illustrated embodiment also utilizes a similar cage 3789 as previously described embodiments however, the illustrated transmission 3700 utilizes axle bearings 3799 to support the balls 1 on their axles 3703. The axle bearings 3799 can be needle bearings or other suitable bearings and reduce the friction between the balls and their axles 3703. Any of the various embodiments of balls and ball axles described herein or known to those of skill in the art can be used to reduce the friction that is developed.

Still referring to the embodiment illustrated in FIG. 37a, the cage 3789 and the shift rod 3771 are supported on the output side by an output axle 3753. The output axle 3753 is a somewhat tubular support member located in a bore formed in the output end of the hub shell 3740 and between the cage 3789 and the output side vehicle frame 3715. The output axle 3753 has a bearing race and bearing formed between its outer diameter and the inner diameter of the hub shell 3740 to allow for relative rotation of the two components as the output axle 3753 provides support to the output side of the transmission 3700. The output shaft is clamped to the vehicle frame 3715 by an output support nut 3754.

As is illustrated in FIG. 37*a*, this transmission 3700 is shifted by applying tension to the shifting cord 3755 that is wrapped around and which applies rotational force to the shift cap 3743. The shift cord 3755 is a tether capable of applying a tension force and is actuated by a shifter (not shown) used by the operator to shift the transmission 3700. In some embodiments the shift cord 3755 is a guide wire capable of both pulling and pushing so that only one coaxial guide line (not shown) needs to be run to the shifter from the transmission 3700. The shifting cord 3755 is conducted by housing stops 3716 to and from the shift cap from the shifter used by the operator. The housing stops 3716 are extensions from the vehicle frame 3715 that guide the shifting cord 3755 to the shift cap 3743. In the illustrated embodiment, the stop guides 3716 are somewhat cylindrically shaped extensions having a slot formed along their length through which the shifting cord 3755 passes and is guided. In other respects, the transmission 3700 illustrated in FIG. 37*a* is similar to other embodiments illustrated herein.

Figure 37B:
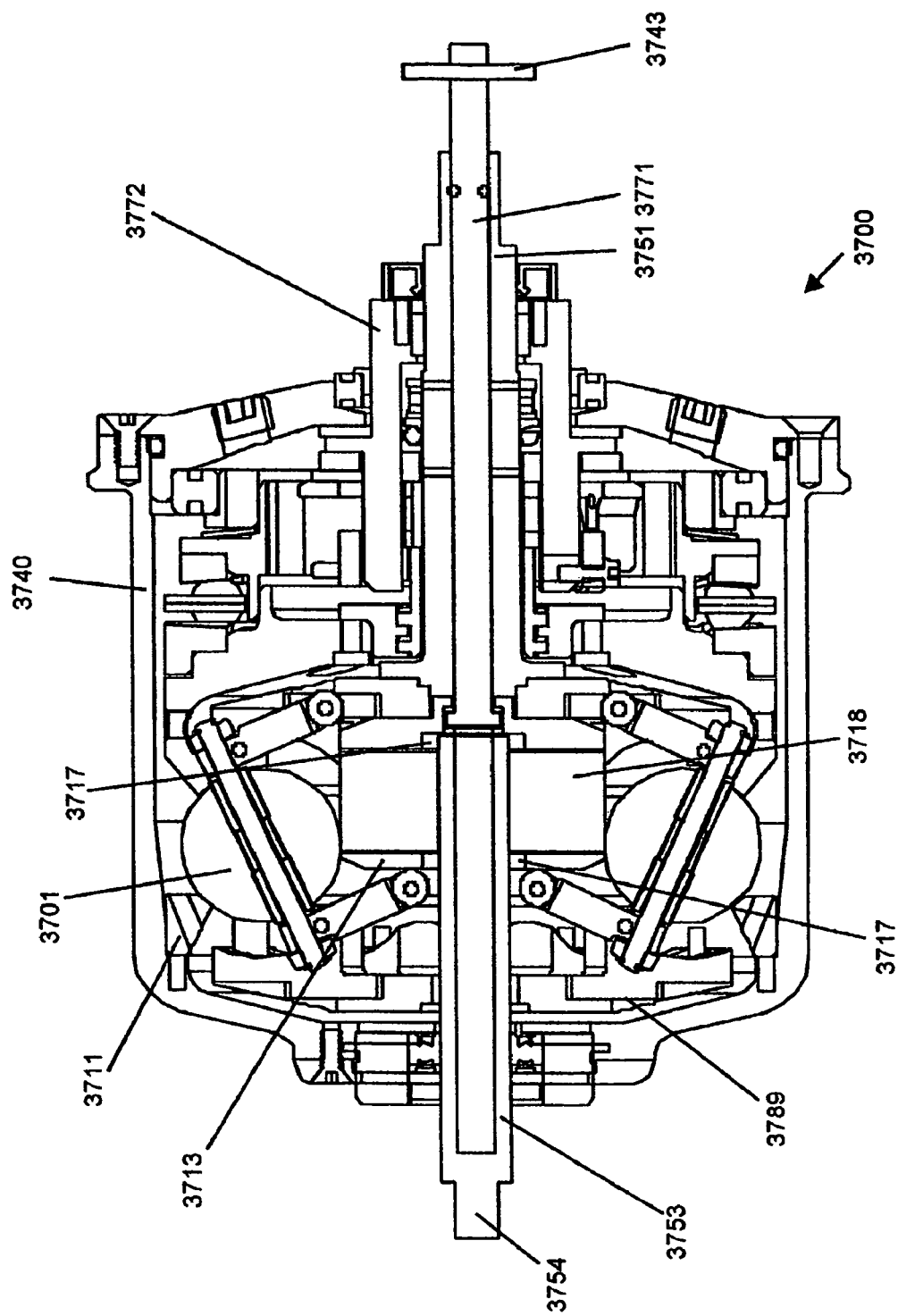
FIG. 37b is a cross-sectional side view of an alternative embodiment of a continuously variable transmission where the output disc is part of a stationary hub.

Another embodiment that is similar to the one illustrated in FIG. 37*a* is illustrated in FIG. 37*b*. In this embodiment, the output disc 3711 is also fixed to the case 3740, however, the case 3740 is fixed and does not rotate. In this embodiment, however, similar to the embodiment illustrated in FIG. 36*a*, the cage 3789 is free to rotate relative to the output disc 3711 and the case 3740. This means that the output is again through the idler 3718. In this embodiment the idler 3718 is attached to a moveable output shaft 3753 similar to that described in the embodiment of FIG. 36*a*. The output shaft 3753 terminates at the far end on the output side in an output spline 3754, which allows coupling of the moveable output shaft 3753 to whatever device is being supplied with torque by the transmission 3700. In this embodiment, torque is supplied to the transmission 3700 via the input shaft 3772 by a chain and sprocket (not shown), by an input gear (not shown) or by other known coupling means. The torque then passes through to the input disc 3734 as described in the preceding embodiment. However, as described, with reference to FIG. 37*a*, the balls 3701 ride along the surface of the output disc 3711 and transfer torque to the idler 3718.

Figure 39A:
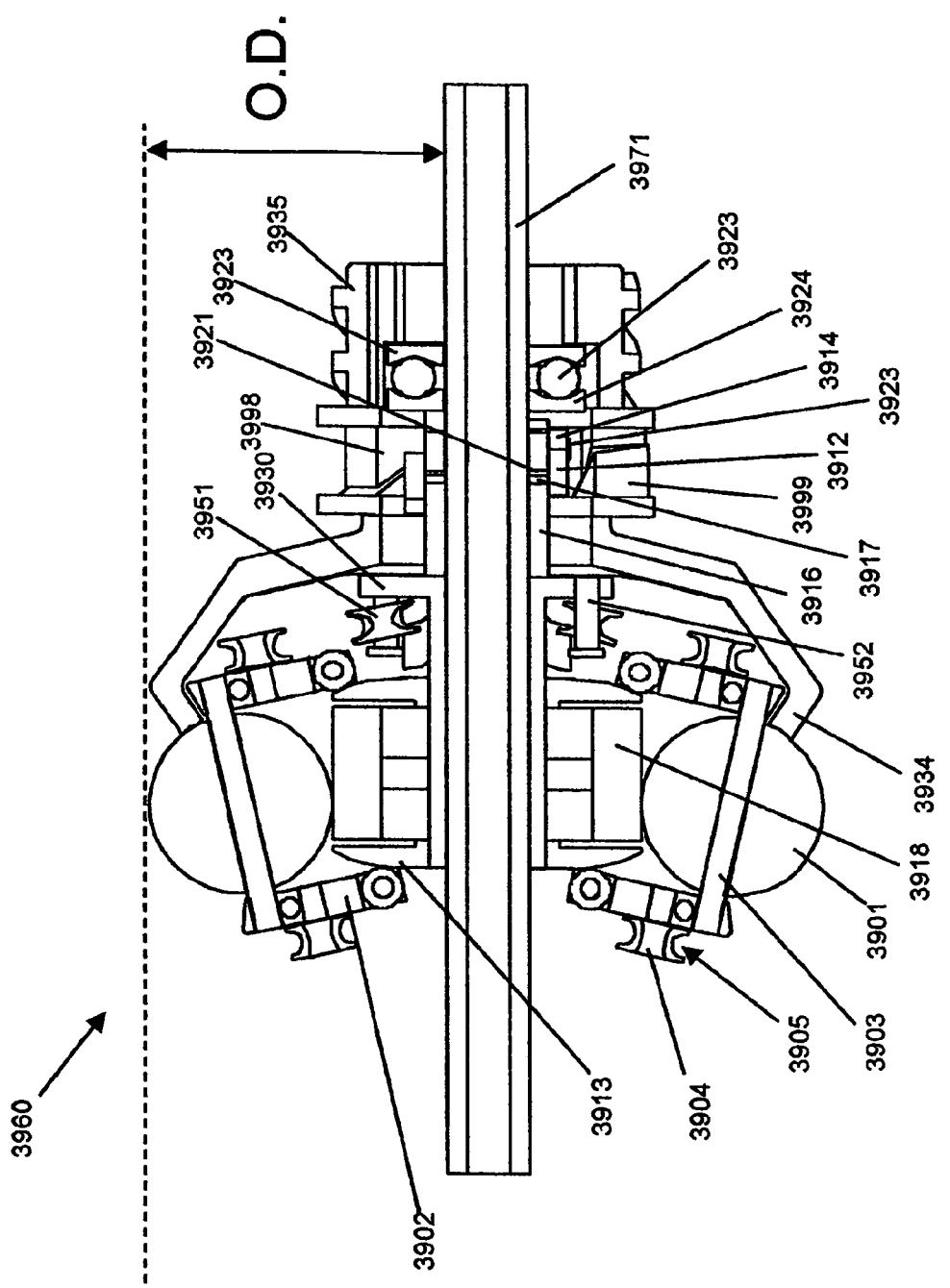
FIG. 39a is a cross-sectional side view of alternative axial force generator for any of the transmission embodiments described herein.

As with the embodiment illustrated in FIG. 36*a*, by supplying the torque output via the idler 3718, the shift guides 3713 of this embodiment are supported by bearings 3717 on the outer surface of the output shaft 3753. This transmission 3700 is shifted by moving the shift rod 3771 axially and is actuated by an actuator 3743. The actuator can be the shift cap of FIG. 37*a*, or a wheel or gear controlled by an actuating motor or manually, or the actuator 3743 can be any other mechanism for axially positioning the shift rod 3771, such as one or more hydraulic pistons. In some embodiments, the axial force generator 3960 and the shifting mechanism illustrated below in FIG. 39*a* is utilized. Through this embodiment, a very high transmission ratio can be achieved at a very high efficiency and with very little frictional losses when compared with other transmission types.

Figure 38:
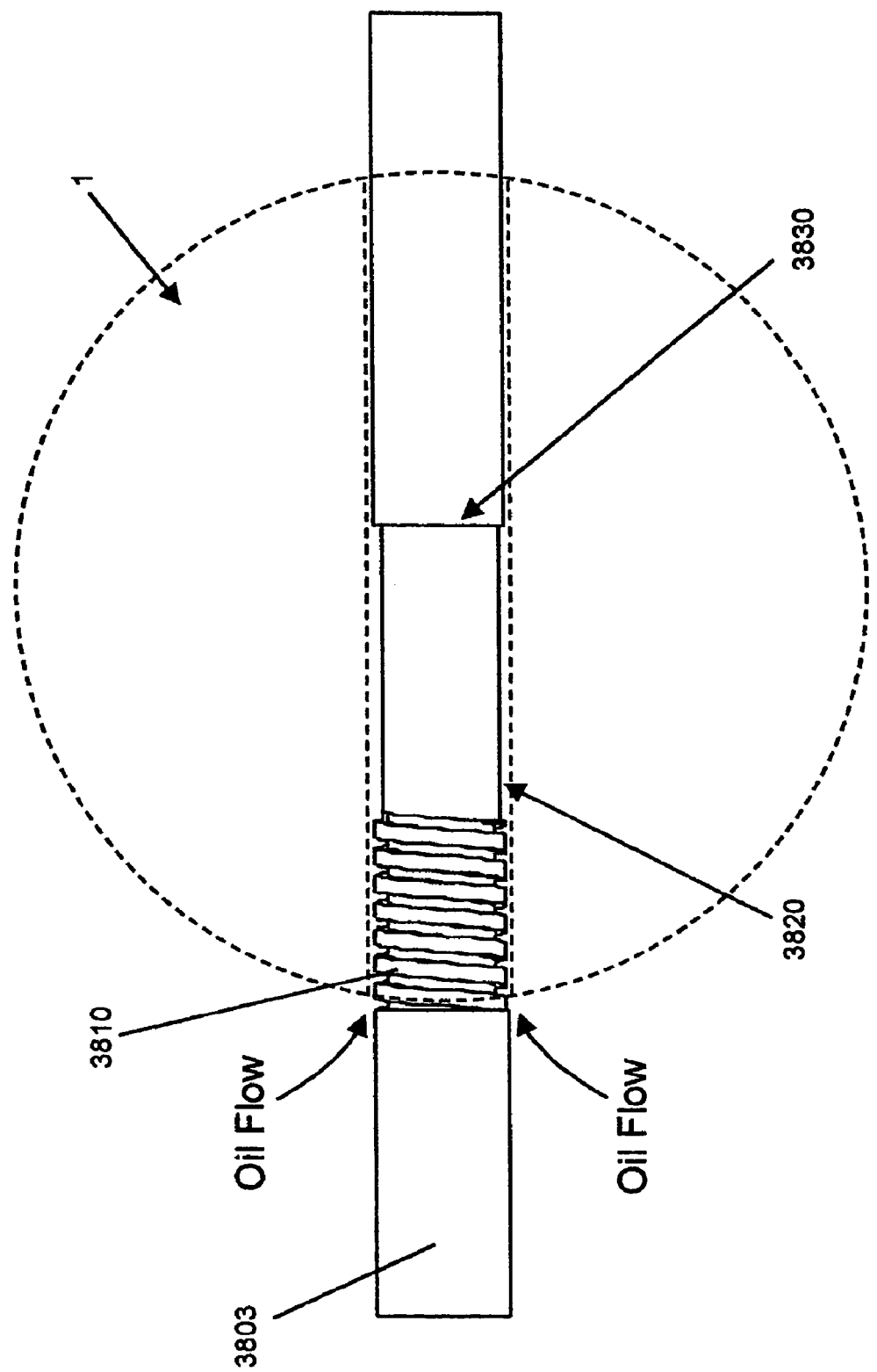
FIG. 38 is a side view of an alternative ball axle.

FIG. 38 illustrates an alternative embodiment of a ball axle 3803 that can be used with many of the transmission described herein. In this embodiment, oil is pumped into the bore in the ball 1 by threads 3810 formed in the outer diameter of the ball axle 3803. A layer of oil that is adhered to the surface of the ball 1 in the vicinity of the bore, it is drawn about the axle 3803 as the ball 1 rotates and travels about the axle 3803 at the same speed as the surface to which it is adhered; it additionally draws adjacent layers of oil that are bound at ever decreasing binding strength, depending on their respective distances from the surface layer, by the same attractive forces creating the viscosity of the oil. As these layers of oil are drawn about the axle, the leading edge of any particular volume of oil in a layer is sheared by the surface of a set of threads 3810 formed on the outer surface of the axle 3803. The threads 3810 can be acme threads or any other type of threads suitable for the pumping action described herein. As each volume of oil is sheared from the adjacent layer that is outside the radius of the threads 3810, it is displaced by a similar layer that is sheared subsequently by the same action. Because the threads 3810 are shaped so they lead into the bore of the ball 1, the volumes of oil that are sheared moved inside the ball 1 as they are continually displaced by further shearing action occurring behind them. As this continues, the oil is forced inside of the bore of the ball 1 by its own self-attractive forces and creates a sort of pumping action. This "pumping" action is therefore proportional to the viscosity of the oil. In order to facilitate this pumping effect, in many embodiments, lubricants are selected for use that act as Newtonian fluids in the shear rates experienced over the range of spin rates experienced by the balls 1 of any particular embodiment.

Still referring to FIG. 38, the threads 3810 begin at a point along the axis of the ball axle 3803 that is slightly outside the edge of the ball 1 in order to create the displacing shearing action that causes the oil to flow into the ball 1. The distance outside the ball 1 that the threads 3810 extends can be between 0.5 thousandths of an inch and 2 inches, while in other embodiments the distance can be from 10 thousandths of an inch to one inch, or more or less depending upon manufacturing costs and other considerations. The threads 3810 of the illustrated embodiment extend into the bore of the ball 1 and stop somewhere inside the ball in a reservoir 3820 formed by a longitudinal length of the ball axle 3803 that is of a smaller diameter than the rest of the ball axle 3803. This reservoir 3820 ends inside of the ball 1 at a reservoir end 3830 where the outer diameter of the ball axle again increases to near the inner diameter of the ball 1 so that the oil is forced to leak out of the ball 1 from the small gap between the ball axle 3803 and the inner surface of the ball 1 resulting in a high pressure oil supply for forming a lubricating film between the two components. In some embodiments, a reservoir 3820 is not present and the threads 3810 simply end in the vicinity of the middle of the bore.

An equilibrium can be developed between the amount of oil that leaks out and the amount that is pumped in to maintain a lubricating pressure in the bore of the ball 1 by controlling the size of the gap between the ball axle 3803 and the inner surface of the ball 1. This equilibrium is dependent upon the viscosity of the oil, the size of the gap and the rotation rate of the ball 1. Although the reservoir end 3830 is illustrated as being located near the middle of the ball 1, this is only for illustrative purposes and the reservoir 3820 can end closer to the other end of the ball 1 or nearer the threads 3810 depending upon the application. In other similar embodiments, this same orientation is formed by threads formed on the interior of the bore through the balls 1, similar to that illustrated in FIG. 23, except that threads 3810 are formed as described in the present embodiment that end in a reservoir 3820 formed near the middle of the ball 1 and ball axle 3803.

Referring now to FIGS. 39a, b and c, another alternative axial force generator 3960 is illustrated. In this embodiment the screw 3935 is located in the inner bore of the bearing disc (not shown) instead of the input disc 3934. In this embodiment, the screw 3935 is driven directly by the drive shaft (not shown) via splines 3975, which mate with matching splines from the drive shaft. The screw 3935 then distributes torque to the input disc 3934 via central screw ramps 3998 and central disc ramps 3999 and to the bearing disc via its threads 3976 and a corresponding set of internal threads (not shown) formed on the inner surface of the bore of the bearing disc. As the screw 3935 is rotated by the drive shaft, a set of central screw ramps 3998 that are formed on the output end of the screw 3935 are rotated and engage and rotate a complimentary set of central disc ramps 3999. The central disc ramps 3999 are formed on a thrust washer surface formed on the input side of the input disc 3934 near its inner diameter, and as they are rotated by the central screw ramps 3998, the central disc ramps 3999 begin to apply torque and axial force to the input disc 3934 from the reaction of the angled surfaces of the central ramps 3998, 3999. Additionally, the rotation of the screw 3935 causes its threads 3976 to engage with the threads of the bearing disc to begin to rotate the bearing disc.

Referring now to FIG. 39a in the illustrated embodiment, the axial force generator 3960 is directly affected by the position of the idler 3918. In this embodiment, the idler assembly has a tubular extension called a pulley stand 3930 that extends from the input side thrust guide 3713 and that ends near the input disc 3934 in an annular extension spreading radially outward. A linkage assembly made up of a fixed link 3916, a first link pin 3917, a short link 3912, a cam link 3914, a cam link pin 3915 and a stationary cam pin 3923 extends axially toward the screw 3935 from the pulley stand 3930 and positions the screw 3935 axially depending on the transmission ratio. The links 3916, 3912 and 3914 are generally elongated struts. The fixed link 3916 extends from the input end of the pulley stand 3930 toward the screw 3935 and is connected to the intermediate short link 3912 by the first link pin 3917. The first link pin 3917 forms a floating pin joint between the fixed link 3916 and the short link 3912 such that the short link 3912 can rotate about the first link pin 3917 as the two links 3916, 3912 move axially during shifting. The short link 3912 is then connected at its other end to the cam link 3914 by a cam link pin 3915 and thereby forms a floating pin joint. The cam link 3914 is fixed axially by a stationary cam pin 3923 that is fixed to the axle 3971 or another stationary component and forms a pin joint about which the cam link 3914 rotates as the idler 3918 moves axially.

In the following description, for simplification of the drawing, the bearing disc 60, ramp bearings 62, perimeter ramps 61 and input disc ramps 64 of FIG. 1 are not separately illustrated, but similar components can be utilized to fulfill similar functions in the present embodiment. When the axial force generator 3960 illustrated in FIGS. 39a, b and c is in a high transmission ratio, the idler 3918 is located at an axial position at its far input side and therefore the fixed link 3916 is also located its farthest axial point toward the input side. The first link pin 3917, the short link 3912 and the second link pin 3921 are all located towards the input side and therefore the cam link 3914 is oriented about the stationary cam pin 3923 such that its cam surface (not separately illustrated) is rotated away from the screw 3935. The cam link 3914 applies cam force to the screw 3935 when it is rotated about its fixed stationary cam pin 3923 axis to force the screw toward the output side when in low transmission ratios. However in low transmission ratios, as illustrated, the cam surface of the cam link 3914 is rotated away from the screw 3935. This allows the screw 3935 to settle at its farthest point towards the output side and results in the bearing disc rotating counter-clockwise, looking from the input side towards the output side, about the screw 3935 in order to maintain engagement with the screw threads 3976. As this occurs the bearing ramps are rotated counter-clockwise allowing the disc bearings (not illustrated here but similar to those previously described with respect to FIG. 1) to roll to a point between the bearing disc ramps and the ramps of the input disc 3934 where the bearings provide little or no axial force.

Meanwhile, due to the extreme position of the screw 3935 to the left as viewed in FIG. 39a, the central screw ramps 3998 are engaged with the central disc ramps 3999 fully such that the input disc 3934 is rotated clockwise slightly to allow the axial position of the screw 3935 in its farthest output side position. The rotation of the input disc 3934 in this manner means that the input disc ramps have rotated in an opposite direction of the bearing disc ramps thereby amplifying the effect of unloading the perimeter ramps and bearings. In such a situation, the majority or all of the axial force is being applied by the central ramps 3998, 3999 and little if any axial force is generated by the perimeter ramps.

As the idler 3918 moves toward the output side to shift to a lower transmission ratio, the linkage assembly becomes extended as the fixed link 3916 moves axially away from the screw 3935, and the cam link 3914 is rotated about the stationary cam pin 3923. As the cam link 3914 is rotated about the cam link pin 3923, the axial motion of the fixed link 3916 acts upon one end of the can link 3914, while the other end moves toward the screw 3935, thereby reversing the direction of the axial force applied by the fixed link 3916. By adjusting the lengths of where the various connections are made to the cam link 3914, the axial force applied by the fixed link 3916 can be diminished or magnified by lever action. The cam end of the cam link 3914 applies an axial force to a thrust washer 3924 on the output side of the screw 3935. The thrust washer 3924 engages a screw thrust bearing 3925 and a bearing race 3926 to supply the resultant axial force to the screw 3935. In response, the screw 3935 moves axially toward the input side and its threads 3976 rotate the bearing disc clockwise, looking from input side to output side, causing the perimeter ramps to rotate so that the ramp bearings are moved along the perimeter ramps to a position where they begin to develop axial force. At the same time, due to the axial movement of the screw 3935 toward the input side, the central screw ramps 3998 are disengaged from the central disc ramps 3999 and the input disc 3934 rotates, relative to the screw 3935, counter-clockwise, again aiding the movement of the perimeter ramp bearings to a position to generate axial force. Through this lever action of the linkage assembly, the axial force generator 3960 of this embodiment efficiently distributes the axial force and torque between the central ramps 3998, 3999 and the perimeter ramps.

Also illustrated in FIG. 39a is an alternative leg assembly to that of FIG. 5 that allows for a reduced overall size of the transmission. In the illustrated embodiment, the rollers 3904 are positioned radially inward on the legs 3902 as compared to the legs 2 of FIG. 5. Additionally, the input disc 34 and output disc (not shown) contact the balls 1 at a point closer to their axes which reduces the load on the idler 18 and enables the transmission to carry more torque. With these two modifications, the input disc 34 and output disc (not shown) of this embodiment can be reduced in total diameter to a diameter substantially the same as the farthest opposing points on two diametrically opposing balls 3901 of this embodiment as illustrated by the line "O.D."

Figures 39B, 39C:
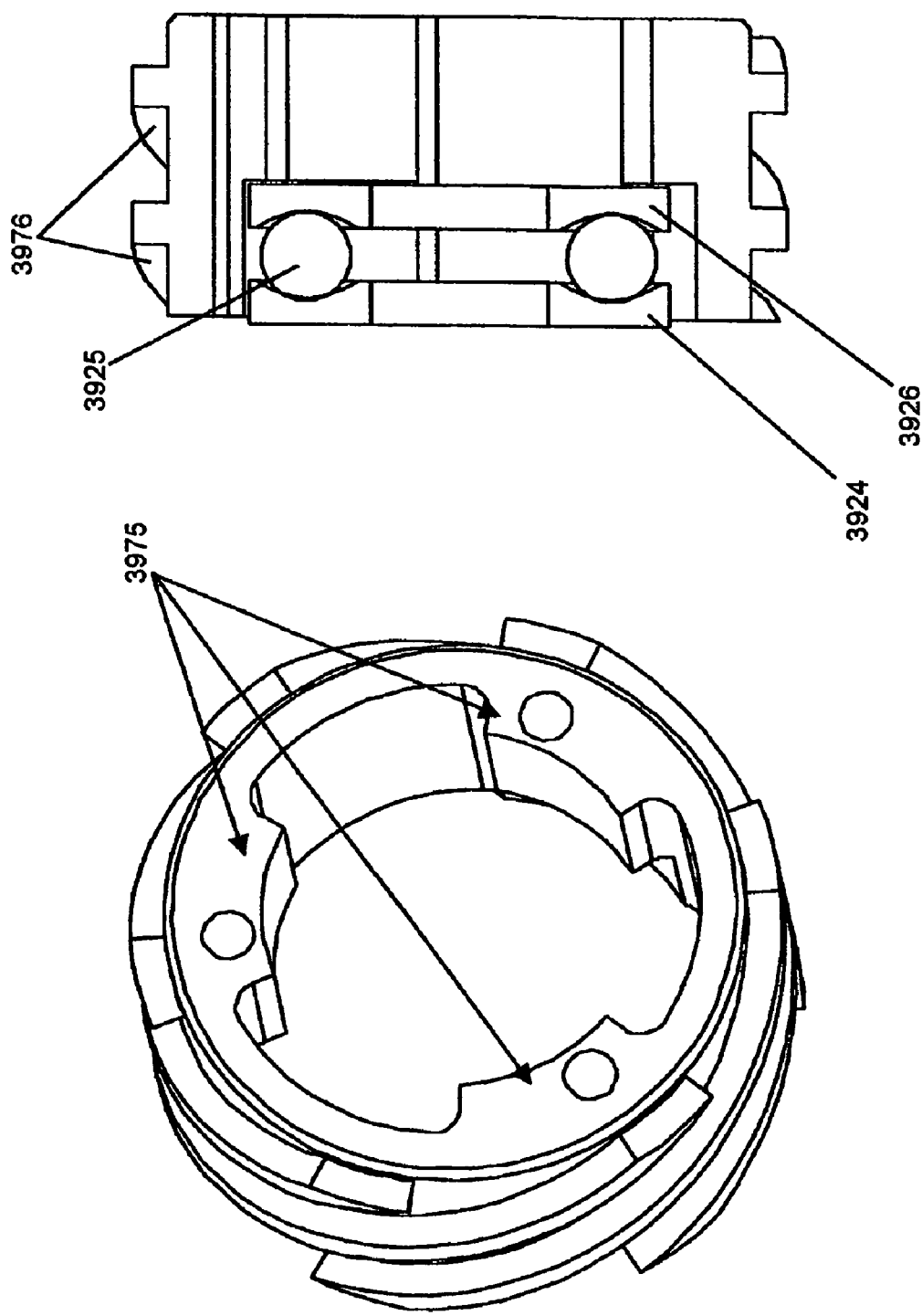
FIGS. 39b and c are a cross-sectional view and a perspective view, respectively, of a screw of the alternative axial force generator.

Another feature of the embodiment illustrated in FIG. 39a is a modified shifting assembly. The rollers 3904 of this embodiment are formed as pulleys each with a concave radius 3905 at its outer edge instead of a convex radius. This allows the rollers 3904 to fulfill their function of aligning the ball axles 3903 but also allows them to act as pulleys to change the axes of the ball axles 3903 and the balls 3901 in order to shift the transmission. The flexible cables 155 described with respect to FIGS. 1 and 6, or similar shifting cables can be wrapped around the rollers 3904 of one side so that when a tension is applied, those rollers 3904 come closer together, thereby shifting the transmission. The shifting cables (not illustrated in FIG. 39) can be guided through the cage (item 89 of FIG. 1) to the rollers 3904 by guide rollers 3951, which in the illustrated embodiment are also pulleys mounted on guide shafts 3952 to the output end of the pulley stand 3930.

In some embodiments, the guide rollers 3951 and the guide shafts 3952 are designed to allow the axis of the guide rollers 3951 to pivot in order to maintain a pulley-type alignment with the rollers 3904 as the ball axles 3903 change their angles with respect to the axis of the transmission. In some embodiments, this can be accomplished by mounting the guide shafts 3952 to the pulley stand 3930 with pivot joints or trunnions, or any other known method. In this embodiment, one shift cable can act on one set of rollers 3904 on either the input side or the output side of the balls 3901 and a spring (not shown) biases the ball axles 3903 to shift in the other direction. In other embodiments, two shifting cables are used with one on one side that draws the rollers 3904 on its side radially inward and another cable on the opposite end of the balls 3901 that draws the rollers 3904 on its respective side radially inward shifting the transmission thusly. In such an embodiment a second pulley stand 3930 or other suitable structure is formed on the output end of the shift guides 3913 and a corresponding set of guide shafts 3925 and guide rollers 3951 is mounted on that second pulley stand 3930. The cables (not shown) of such embodiments pass through holes or slots (not shown) formed in the axle 3971 and out of the transmission via the axle 3971. The cables can pass out of either or both of the ends of the axle 3971 or they can pass out of additional holes formed through the axle 3971 axially beyond either or both the input disc (not shown) and the output disc (also not shown), or the hub (not shown) it the output disc is a rotating hub. The holes and or slots through which the cables pass are designed to maximize the life of the cable material through the use of radiused edges and pulleys and such devices are used in various locations of the axle and transmission for conveyance of the cable.

Referring to FIGS. 39a, 40a and 40b, one embodiment of a linkage assembly 4000 of the axial force generator 3960 of FIG. 39a is illustrated. The illustrated linkage assembly 4000 is also made up of a fixed link 3916, a first link pin 3917, a short link 3912, a second link pin 3921, a cam link 3914, a cam link pin 3915 and a stationary cam pin. The fixed link 3916 of this embodiment is an elongated strut having a first end that is rigidly attached to the pulley stand 3930 of FIG. 39a, and a second end facing away from the first end that has a pin joint hole formed through it. The fixed link 3916 is generally parallel along side the axle 3971. The first link pin 3917 is placed within the hole in the second end of the fixed link 3916 joining the second end of the fixed link 3916 with a first end of the short link 3912, which has a corresponding pin joint hole formed therein. The sort link 3912 is also a strut having two ends, however it has holes formed in both its first and second end. A cam link pin 3915 is placed within the hole in the second end of the short link 3912 and joins the second end of the short link 3912 with the first end of the cam link 3914 via a pin joint hole formed in the cam link 3914. The cam link 3914 has two ends, a first end and an opposite cam end that has a cam surface 4020 formed upon its outer edge. The cam link 3914 also has a second pin joint hole formed midway between its first end and the cam end through which the stationary cam pin 3923. The stationary cam pin 3923 is fixed to a stationary part of the transmission such as the axle 3971 so that it forms an axis about which the cam link 3914 rotates.

FIG. 40a illustrates the linkage assembly 4000 in its contracted state corresponding to a very high transmission ratio, where the fixed link has moved all the way toward the input end of the transmission as described above for FIG. 39a. FIG. 40b illustrates the linkage assembly 4000 in an extended state corresponding to a low transmission ratio. As was described above, the cam link 3914 applies an axial force to the screw 3935 in order to shift the generation of the axial force from the central ramps 3998, 3999 to the perimeter ramps as the transmission is shifted from high to low. Additionally, when the transmission is shifted from low to high, the cam link 3914 reduces the amount of axial force that is applied to the screw 3935 allowing the screw 3935 to move axially toward the output end and thereby shift the axial force generation from the perimeter ramps in to the central ramps 3998, 3999.

As is illustrated in FIGS. 40a and b, the cam surface 4020 of the cam link 3914 can be designed to provide a great variety of loading and unloading profiles. In fact, in this embodiment, a second cam surface 4010 is provided on the first end of the cam link 3914. As illustrated in FIG. 40a, at a very high transmission ratio, the cam surface 4020 is fully unloaded applying a minimal amount of, if any at all, axial force to the screw 3935. However, in some embodiments, a higher amount of axial force may need to be applied at various speed ratios, and in this case, at the highest transmission ratio the second cam surface 4010 increases the axial force to the screw thereby transferring some axial force generation back to the perimeter discs to increase the amount of axial force that may be needed at that high transmission ratio. This is merely an example of the variations that can be included to vary the control of the generation of axial force by the axial force generator 4060 depending on the desired torque-speed profile of a particular application.

The embodiments described herein are examples provided to meet the descriptive requirements of the law and to provide examples. These examples are only embodiments that may be employed by any party and they are not intended to be limiting in any manner. Therefore, the invention is defined by the claims that follow and not by any of the examples or terms used herein,

What is claimed is:

1. A scooter comprising:
   a scooter chassis adapted to transport passengers;
   a plurality of wheels operationally coupled to the scooter chassis;
   a power train operationally coupled to the wheels, the power train comprising:

a planetary gearset mounted on a shaft, the shaft defining a longitudinal axis;
a variator comprising:
a plurality of balls, each ball having a tiltable axis about which it rotates;
a first disc in contact with the balls;
a second disc in contact with the balls; and
an idler in contact with the balls;
wherein the variator is mounted coaxially with the planetary gearset along the longitudinal axis; and
wherein the planetary gearset is operationally coupled to the variator.

2. The scooter of claim 1, further comprising a power source operationally coupled to the power train.

3. The scooter of claim 2, wherein the power source comprises an electric motor.

4. The scooter of claim 1, wherein the planetary gearset comprises:
a ring gear mounted coaxially about the longitudinal axis;
a plurality of planet gears in engagement with the ring gear, each planet gear having a planet shaft about which the planet gear rotates;
a sun gear mounted coaxially about the longitudinal axis and in engagement with the planet gears; and
a planet carrier mounted coaxially about the longitudinal axis and adapted to support and position the planet shafts.

5. The scooter of claim 4, wherein the planet carrier is operationally coupled to a drive shaft.

6. The scooter of claim 5, wherein the drive shaft receives an input torque from a sprocket, gear, or crank that is operationally coupled to a prime mover.

7. The scooter of claim 1, further comprising shift guide sleeves operationally coupled to the idler.

8. The scooter of claim 7, further comprising a shifting mechanism that shifts the transmission by axially moving the guide sleeves.

9. The scooter claim 4, further comprising a cage adapted to align the tiltable axes of the balls and to maintain the angular and radial positions of the balls.

10. The scooter of claim 9, wherein the cage is nonrotatable.

11. The scooter of claim 9, wherein the cage is adapted to rotate about the longitudinal axis.

12. The scooter of claim 9, wherein the idler or the cage provides a torque input to the planetary gearset.

13. The scooter of claim 9, wherein the planet carrier receives an input torque and is coupled to the first disc, wherein the sun gear is coupled to the cage, wherein the ring gear is fixed and does not rotate, and wherein the variator supplies an output torque via the second disc.

14. The scooter of claim 4, further comprising a force generator adapted to generate an axial force that increases the traction between the first and second discs, the balls, and the idler.

15. The scooter of claim 14, wherein the force generator produces an amount of axial force that is a function of a transmission ratio of the variator.

16. The scooter of claim 1, further comprising a shaft operationally connected to the idler and adapted to receive a torque from the idler and to transmit the torque out of the variator.

17. The scooter of claim 1, further comprising a force generator that comprises:
a third disc having a threaded bore;
a first set of ramps operably coupled to the third disc near an outer diameter of the third disc;
a plurality of bearings adapted to engage the first set of ramps; and
a second set of ramps, the second set of ramps operably coupled to the first disc and adapted to engage the bearings.

18. The scooter of claim 17, the force generator further comprising:
a rotatable screw adapted to engage the threaded bore;
a third set of ramps, the third set of ramps operably coupled to the screw; and
a fourth set of ramps, the fourth set of ramps operably coupled to the first disc and adapted to engage the third set of ramps.

19. The scooter of claim 18, the force generator further comprising:
a thrust bearing contacting the screw; and
a linkage assembly adapted to apply a force to the thrust bearing tending to move the screw away from the first disc in response to a shift in the transmission ratio.

20. The scooter of claim 19, wherein in response to a shift in the transmission ratio the linkage assembly varies the axial force applied to the thrust bearing as a function of the transmission ratio.

* * * * *